(12) United States Patent
Murphy et al.

(10) Patent No.: US 9,302,678 B2
(45) Date of Patent: Apr. 5, 2016

(54) ROBOTIC DRIVING SYSTEM

(75) Inventors: Karl Murphy, Rockville, MD (US); Alberto Lacaze, Germantown, MD (US); Mark Del Giorno, Westminster, MD (US)

(73) Assignees: ROBOTIC RESEARCH, LLC, Gaithersburg, MD (US); GENERAL DYNAMICS ROBOTIC SYSTEMS, Westminster, MD (US)

( * ) Notice: Subject to any disclaimer, the term of this patent is extended or adjusted under 35 U.S.C. 154(b) by 898 days.

(21) Appl. No.: 11/867,306

(22) Filed: Oct. 4, 2007

(65) Prior Publication Data
US 2008/0162027 A1 Jul. 3, 2008

Related U.S. Application Data

(60) Provisional application No. 60/882,706, filed on Dec. 29, 2006.

(51) Int. Cl.
*G06F 19/00* (2011.01)
*G06G 7/70* (2006.01)
*G06G 7/76* (2006.01)
*G06G 1/00* (2006.01)
*B60W 50/14* (2012.01)
*G05D 1/02* (2006.01)

(52) U.S. Cl.
CPC .............. *B60W 50/14* (2013.01); *G05D 1/024* (2013.01); *G05D 1/0246* (2013.01); *G05D 1/0274* (2013.01); *B60W 2550/20* (2013.01); *B60W 2550/402* (2013.01); *G05D 1/027* (2013.01); *G05D 1/0251* (2013.01); *G05D 1/0255* (2013.01); *G05D 1/0257* (2013.01); *G05D 1/0278* (2013.01); *G05D 2201/0213* (2013.01)

(58) Field of Classification Search
USPC .................................................. 701/117, 200
See application file for complete search history.

(56) References Cited

U.S. PATENT DOCUMENTS

| | | | | |
|---|---|---|---|---|
| 5,983,158 | A * | 11/1999 | Suzuki | G01C 21/3461 340/988 |
| 6,005,492 | A | 12/1999 | Tamura et al. | |
| 6,169,495 | B1 | 1/2001 | Koike | |
| 6,246,948 | B1 * | 6/2001 | Thakker | G08G 1/096725 123/351 |
| 7,042,345 | B2 | 5/2006 | Ellis | |
| 7,660,725 | B2 * | 2/2010 | Wahlbin | G06Q 40/08 705/2 |
| 2004/0130463 | A1 * | 7/2004 | Bloomquist | G08G 1/096716 340/907 |
| 2004/0193347 | A1 * | 9/2004 | Harumoto | B60T 8/1755 701/45 |
| 2005/0096838 | A1 * | 5/2005 | Jung | G05D 1/0246 701/532 |
| 2005/0187710 | A1 * | 8/2005 | Walker | B60Q 1/34 701/431 |
| 2006/0041372 | A1 * | 2/2006 | Kubota | G01C 21/3697 701/532 |
| 2006/0271275 | A1 | 11/2006 | Verma | |

(Continued)

*Primary Examiner* — Imran Mustafa
(74) *Attorney, Agent, or Firm* — Greenblum & Bernstein P.L.C.

(57) ABSTRACT

A system that enables a vehicle to follow a traffic rule when traveling in a road network includes a database that stores data relating to at least one feature of the road network, a location detector that detects a location of the vehicle relative to the road network, a sensor that senses at least one object in a vicinity of the vehicle, and a processing system that controls the vehicle to autonomously obey at least one traffic rule, or provides a notification to a driver of the vehicle to enable the driver to obey at least one traffic rule, based on the detected location of the vehicle, data retrieved from the database relating to at least one feature of the road network, and data relating to at least one object sensed by the sensor.

31 Claims, 104 Drawing Sheets

(56) References Cited

U.S. PATENT DOCUMENTS

| | | | |
|---|---|---|---|
| 2007/0032943 A1* | 2/2007 | Okabe | G60T 8/17558 701/532 |
| 2007/0035416 A1* | 2/2007 | Tanaka | B60T 7/18 340/906 |
| 2007/0067086 A1* | 3/2007 | Rothschild | B60K 31/185 701/93 |
| 2007/0088469 A1* | 4/2007 | Schmiedel | G05D 1/0274 701/23 |
| 2008/0042814 A1* | 2/2008 | Hurwitz | B60Q 9/008 340/435 |

* cited by examiner

|  | parking on right side of road | | parking on left side of road | |
| --- | --- | --- | --- | --- |
|  | curb | no curb | curb | no curb |
| Uphill | left | right | right | left |
| Downhill | right | right | left | left |
| Level | right | right | left | left |

* "left" and "right" refer to wheel orientation

Fig. 103

ROBOTIC DRIVING SYSTEM

CROSS-REFERENCE TO RELATED APPLICATIONS

The present application claims priority of U.S. Provisional Application No. 60/882,706, the disclosure of which is expressly incorporated by reference herein in its entirety.

BACKGROUND OF THE INVENTION

The present invention relates to a robotic driving system and, more particularly, to a robotic driving system that is capable of controlling a vehicle in accordance with traffic rules.

Traffic rules exist to maintain order and prevent accidents on roads and highways. These rules provide a baseline behavioral understanding among drivers and pedestrians and are based on constraints such as road signs, traffic signals, road and lane markings, and the actions of vehicles and pedestrians. Human drivers are capable of recognizing and comprehending these constraints, and, at the same time, controlling their vehicles to comply with traffic rules based on the present set of constraints.

The inventors have recognized the utility of a robotic driving system that is capable of driving a vehicle with limited intervention by a passenger. To ensure functionality with minimal intervention by a passenger, the robotic driving system must recognize and process driving constraints so that it may follow traffic rules, especially in an urban environment, where there is a large presence of road signs, traffic signals, vehicles and pedestrians.

SUMMARY OF THE INVENTION

A main feature of the present invention is a robotic driving system that is capable of controlling a vehicle to follow traffic rules.

To achieve this feature, a system that enables a vehicle to follow a traffic rule when traveling in a road network is provided. The system includes a database that stores data relating to at least one feature of the road network, a location detector that detects a location of the vehicle relative to the road network, a sensor that senses at least one object in a vicinity of the vehicle, and a processing system that controls the vehicle to autonomously obey at least one traffic rule, or provides a notification to a driver of the vehicle to enable the driver to obey at least one traffic rule, based on the detected location of the vehicle, data retrieved from the database relating to a feature of the road network, and data relating to at least one object sensed by the sensor.

A method of enabling a vehicle to automatically follow a traffic rule when traveling in a road network is also provided. The method includes detecting a location of the vehicle relative to the road network, retrieving data relating to at least one feature of the road network, sensing at least one object in a vicinity of the vehicle, and controlling the vehicle to autonomously obey at least one traffic rule, or provides a notification to a driver of the vehicle to enable the driver to obey at least one traffic rule, based on the detected location of the vehicle, the retrieved data relating to at least one feature of the road network and data relating to the at least one sensed object.

A computer-readable medium which stores an executable program for enabling a vehicle to automatically follow a traffic rule when traveling in a road network is also provided. The computer-readable medium includes a feature retrieval code segment that retrieves data relating to at least one feature of the road network from a database, and a vehicle control segment that controls the vehicle to autonomously obey at least one traffic rule, or provides a notification to a driver of the vehicle to enable the driver to obey at least one traffic rule, based on a location of the vehicle, the retrieved data relating to at least one feature of the road network, and data relating to at least one object sensed in a vicinity of the vehicle.

The at least one traffic rule may include a traffic rule relating to a right of way, a traffic rule relating to a roundabout, a traffic rule relating to a mountain road, a traffic rule relating to a traffic light or a road sign, a traffic rule relating to a dangerous intersection or alley, a traffic rule relating to a railroad crossing, a traffic rule relating to a pedestrian or an animal, a traffic rule relating to a traffic lane, a traffic rule relating to turning, and/or a traffic rule relating to parking.

The data retrieved from the database may relate to the detected location of the vehicle and may include at least one of a location of a potential pedestrian crossing, a sidewalk, a road, a driveway, an alley, a stop sign, a yield sign, an intersection, a roundabout, a traffic signal, a traffic lane and a railroad crossing.

The sensed object may be at least one of a pedestrian, a sidewalk, a pedestrian crossing light, a vehicle, a bicycle, an intersection, a roundabout, a traffic signal, a road sign, a school bus, a traffic lane, a weather condition, a railroad crossing, an animal, a bicycle lane, a curb and a slope of a road.

The processing system may include a road planner module, a moving obstacle detection and prediction module, a static obstacle detection module, a street feature retrieve/store module, and a traffic rule enforcement module.

Other exemplary embodiments and advantages of the present invention may be ascertained by reviewing the present disclosure and the accompanying drawings.

BRIEF DESCRIPTION OF THE DRAWINGS

The present invention is described in the detailed description that follows, with reference to the following noted drawings that illustrate non-limiting examples of embodiments of the present invention, and in which like reference numerals represent similar parts throughout the drawings.

FIG. 103 shows an exemplary table listing rules for parking the vehicle;

DETAILED DESCRIPTION OF THE INVENTION

The particulars shown herein are given as examples and are for the purposes of illustrative discussion of the embodiments of the present invention only and are presented in the cause of providing what is believed to be the most useful and readily understood description of the principles and conceptual aspects of the present invention.

Figure 1:
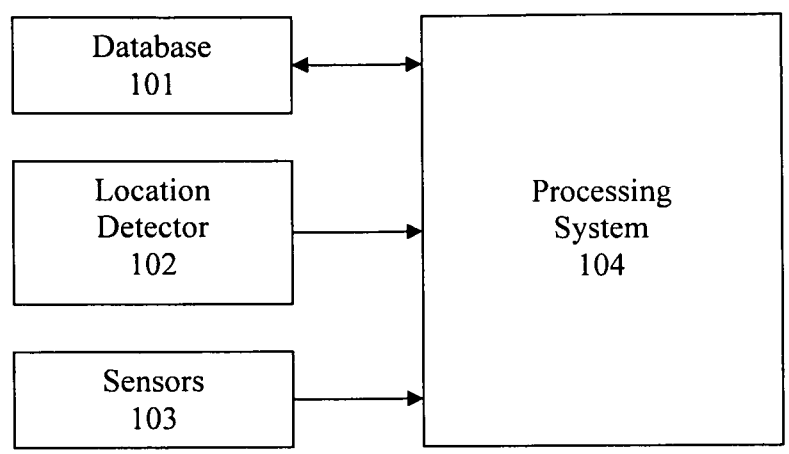
FIG. 1 shows a robotic driving system according to an aspect of the present invention.

FIG. 1 illustrates a robotic driving system 100 that enables a vehicle to automatically follow traffic rules when traveling in a road network according to an aspect of the present invention. System 100 may be utilized in any vehicle (e.g., cars, busses, trucks, motorcycles) operating in a road network that is required to follow traffic rules. System 100, as shown in FIG. 1, includes a database 101 that stores data relating to features of a road network, a location detector 102 that detects a location of a vehicle within the road network, one or more sensors 103 that have the ability to sense an object in the vicinity of the vehicle, and a processing system 104 that controls operations of the vehicle.

The database 101 may be stored internally in the vehicle that is controlled by the system 100. Alternatively, the database 101 may be stored external to the vehicle, and accessed, for example, via wireless communication. The database 101 stores data identifying the relative and/or absolute location of features within or around a road network, including, but not limited to, roads, curves, street signs, crossings, walkways, train crossings, number of lanes in the road, types of lanes in the road, color, curbs, etc.

The location detector 102 detects the real-time location of the vehicle that is controlled by the system 100. The location detector 102 is provided on the vehicle and may be implemented, for example, by a global positioning satellite (GPS) system, and/or an inertial navigation system.

The sensors 103 are provided on or around the vehicle to sense objects, features, or any other item of interest in the vicinity of the vehicle and may be implemented, for example, with any combination of the following: a ladar device, a video camera, a stereo vision device, a radar device, an audio sensor, an ultrasonic sensor, etc. The sensors 103 are capable of independently or, through the use of some algorithm utilizing the sensors' data, recognizing objects such as, but not limited to, pedestrians, other vehicles, and road features such as curves.

The processing system 104 is provided in the vehicle controlled by the system 100 and enables the vehicle to comply with traffic rules by autonomously driving the vehicle or by providing warnings that enable the driver of the vehicle to obey traffic rules. The processing system 104 may determine a right of way precedence, a separation distance, a stopping distance, a following speed, etc., in order to enable the vehicle to comply with applicable traffic rules.

Figure 2:
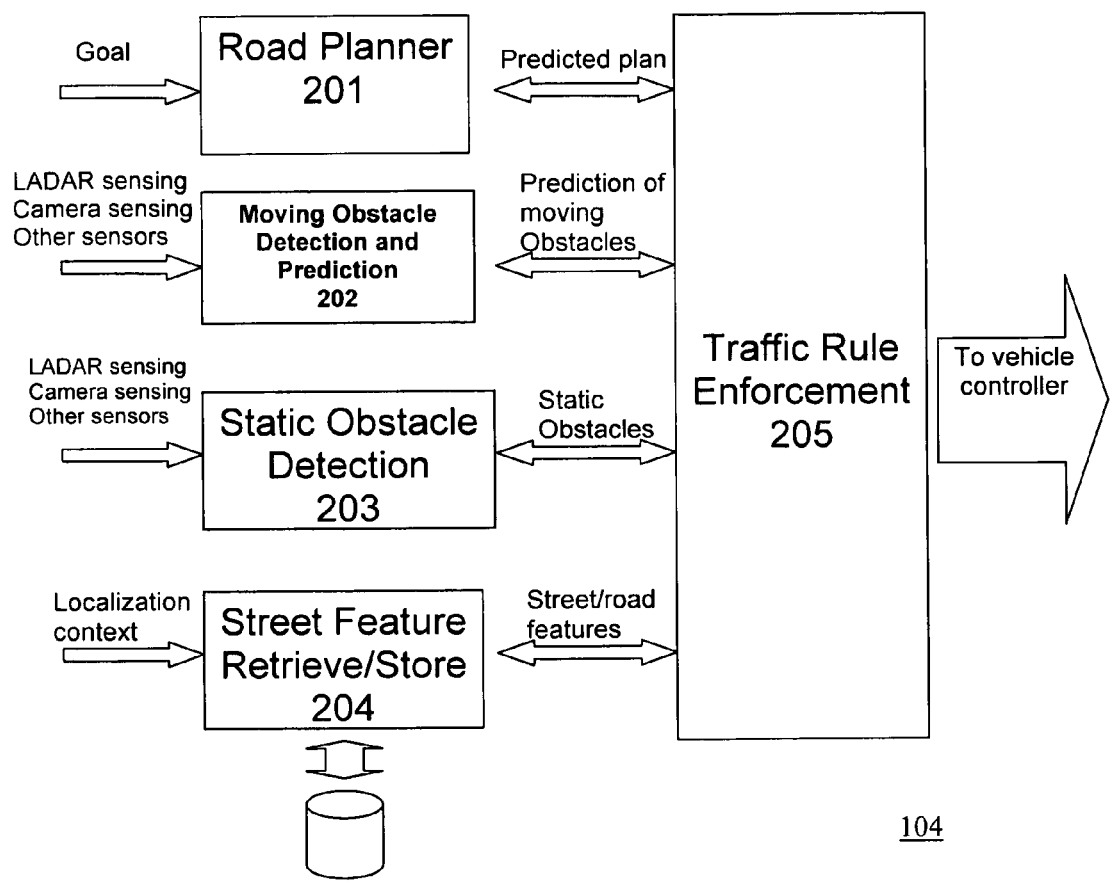
FIG. 2 shows a system diagram of a processing system of the robotic driving system.

FIG. 2 shows a system diagram of the processing system 104 according to one potential embodiment of the present invention. As shown in FIG. 2, the processing system 104 includes a road planner module 201, a moving obstacle detection and prediction module 202, a static obstacle detection module 203, a street feature retrieve/store module 204, and a traffic rule enforcement module 205. These modules may be implemented with separate processors, or using a single processor. It is understood that variations in computational hardware that has the same goal as the robotic driving system does not constitute a new invention, but rather falls under the scope and/or spirit of the invention described herein.

The road planner module 201 is used to map a route to a desired destination. The road planner module 201 may include, but is not limited to, a real-time navigation system that uses a GPS system or other similar device to monitor the current location of the vehicle.

The moving obstacle detection and prediction module 202 and the static obstacle detection module 203 receive signals from the sensors 103 to detect the presence or absence of objects within the vicinity of the vehicle. The moving obstacle detection and prediction module 202 also predicts a future path of a moving obstacle, such as, but not limited to, by using techniques or methods known to those skilled in the art, such as, but not limited to, those described in one of the following articles, which are hereby incorporated by reference in their entireties:
(1) R. Madhavan et al., "Moving Object Prediction for Off-road Autonomous Navigation", Intelligent Systems Division, Manufacturing Engineering Laboratory, NIST;
(2) Luis Navarro-Serment et al., "Predictive Mover Detection and Tracking in Cluttered Environments," The Robotics Institute, Carnegie Mellon University;
(3) R. Manduchi et al., "Obstacle Detection and Terrain Classification for Autonomous Off-Road Navigation," Source Autonomous Robots archive, Volume 18, Issue 1 (January 2005), pp. 81-102; and
(4) T. Hong et al., "Obstacle Detection and Mapping System," Intelligent Systems Division, NIST, http://www.isd.mel.nist.gov/documents/hong/obstacle_detection.pdf.

The street feature retrieve/store module 204 receives a current location of the vehicle from the location detector 102, and retrieves data from the database 101 relating to features of the road network in the vicinity of the vehicle's current or desired location.

Data from the road planner module 201, the moving obstacle detection and prediction module 202, the static obstacle detection module 203, and the street feature retrieve/store module 204 are output to the traffic rule enforcement module 205 for processing. The traffic rule enforcement module 205 may run a main program that calls specialized subroutines based on any data it receives as inputs. The subroutines contain algorithms relating to traffic rules, and based on the algorithms, the traffic rule enforcement module 205 generates commands that are output to a vehicle controller. The vehicle controller may control the movement of the vehicle based on the commands or may merely output warnings to a driver of the vehicle based on the commands.

Examples of "right of way" traffic rules that the system 100 is capable of causing a vehicle to follow are described below with reference to FIGS. 3-23.

Figure 3:
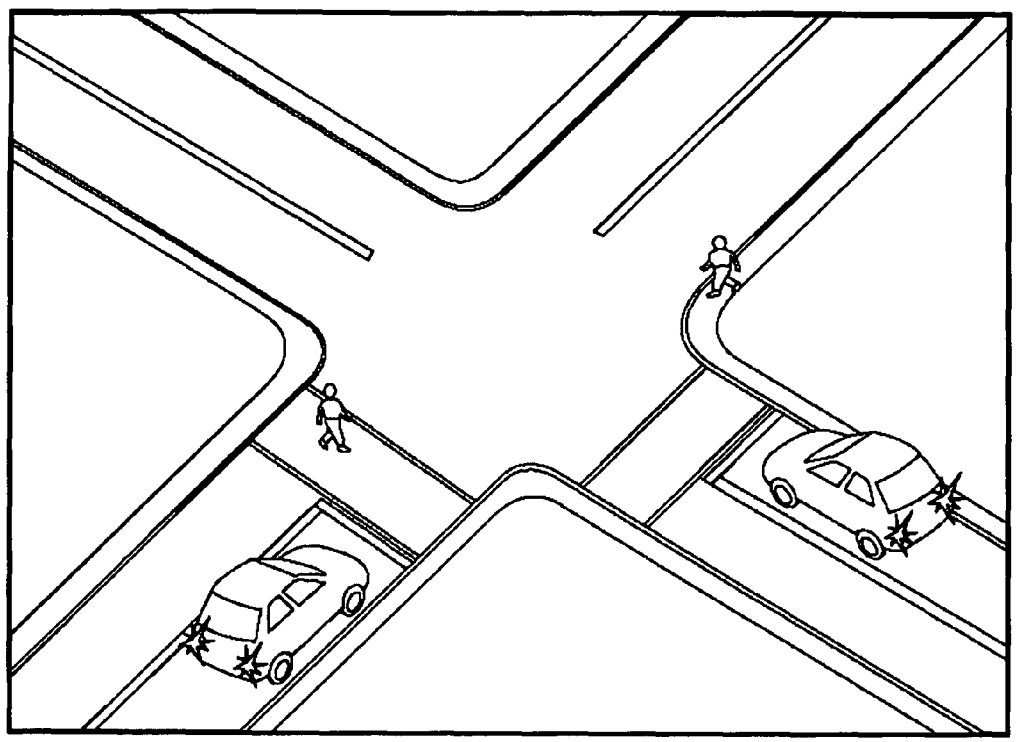
FIG. 3 shows a situation in which pedestrians are crossing or approaching a pedestrian crossing.
Figure 4:
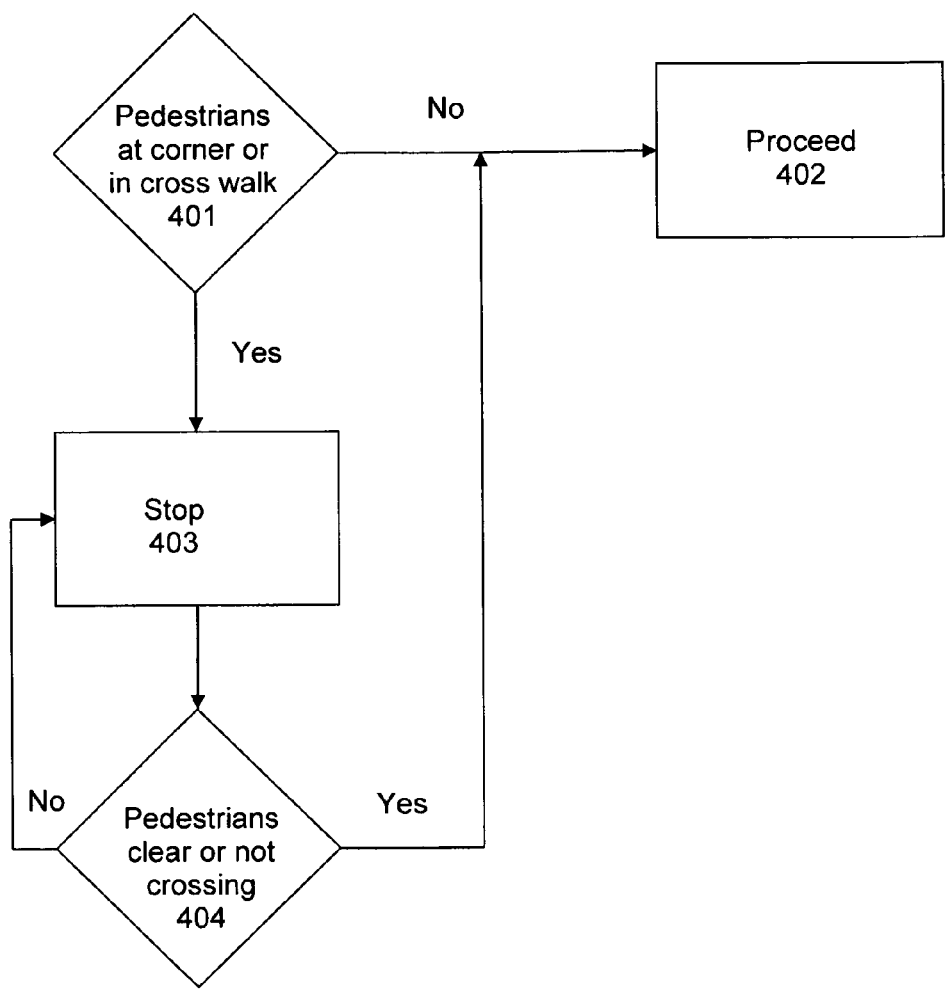
FIG. 4 shows an exemplary process performed by the system in the situation shown in FIG. 3.

FIG. 3 illustrates a situation in which pedestrians are crossing or approaching pedestrian crossings, and FIG. 4 illustrates an example of a process performed by the system 100 in such a situation. In this situation, the system 100 recognizes a pedestrian crossing and stops the vehicle until the pedestrian has cleared the crossing. The database 101 may store the locations of crosswalks and other potential pedestrian crossings, such as corners. Based on the location of the vehicle, the street feature retrieve/store module 204 will retrieve data from the database 101 identifying the pedestrian crossings. The moving obstacle detection and prediction module 202 will detect whether a pedestrian is at a corner or in a pedestrian crossing (step 401). If no pedestrian is at a corner or in a pedestrian crossing, the traffic rule enforcement module 205 allows the vehicle to proceed (step 402). However, if a pedestrian is at a corner or in a pedestrian crossing, the traffic rule enforcement module 205 causes the vehicle to stop (step 403). The moving obstacle detection and prediction module 202 detects whether a pedestrian has cleared the pedestrian crossing (step 404), and when the pedestrian has cleared the crossing, the traffic rule enforcement module 205 allows the vehicle to proceed (step 402).

Figure 5:
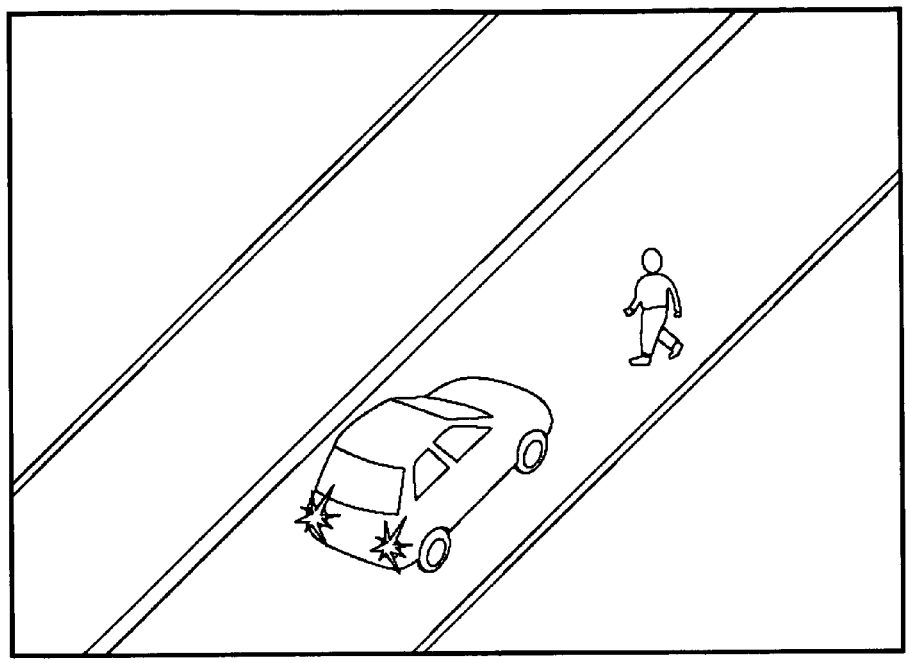
FIG. 5 shows a situation in which a pedestrian is crossing a road illegally.
Figure 6:
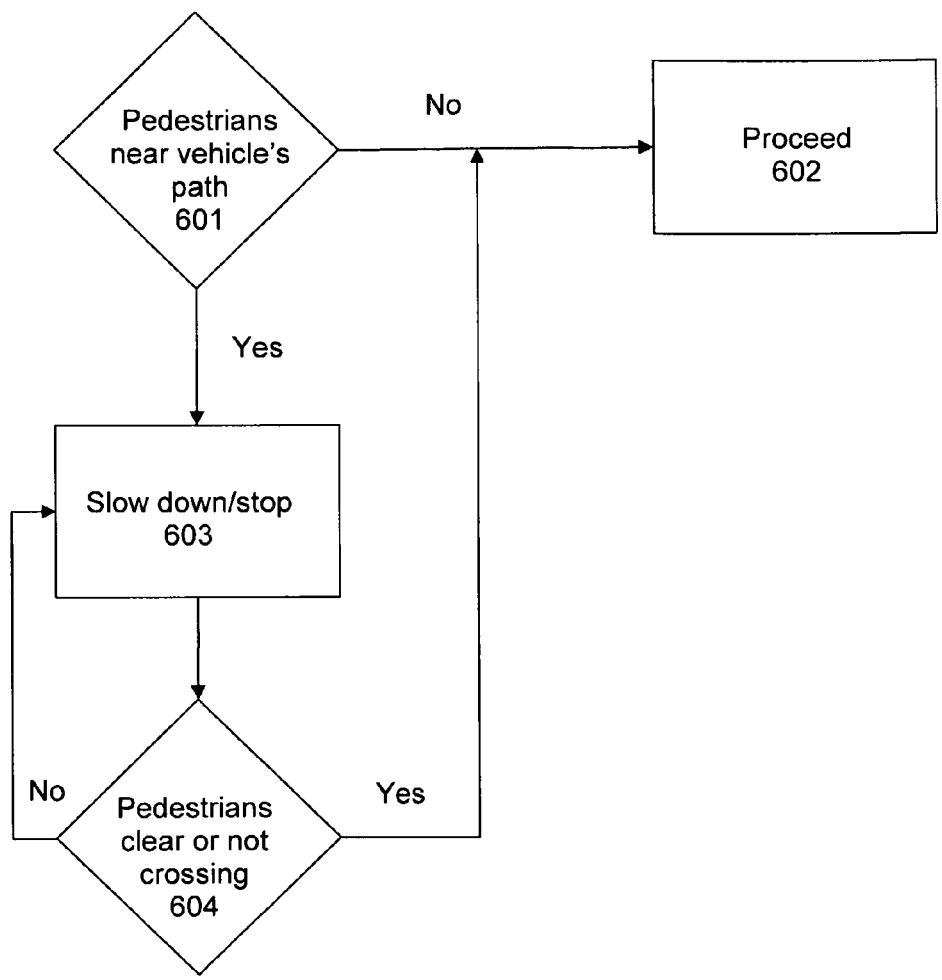
FIG. 6 shows an exemplary process performed by the robotic driving system in the situation shown in FIG. 5.

FIG. 5 illustrates a situation in which a pedestrian is crossing a road illegally, and FIG. 6 illustrates an example of a process performed by the system 100 in such a situation. In this situation, the system 100 recognizes a pedestrian, and instructs the vehicle to slow down or stop when there is a probability that the pedestrian will intersect the path of the vehicle. The moving obstacle detection and prediction module 202 will recognize the pedestrian and predict its motion, even when the pedestrian is crossing the road illegally (step 601). If the predicted path of the pedestrian is likely to intersect the path the vehicle has planned to take (via the road planner module 201), the traffic rule enforcement module 205 causes the vehicle to slow down or stop to avoid the pedestrian (step 603). When the moving obstacle detection and prediction module 202 detects that the pedestrian has cleared the crossing (step 604), the traffic rule enforcement module 205 allows the vehicle to proceed (step 602).

Figure 7:
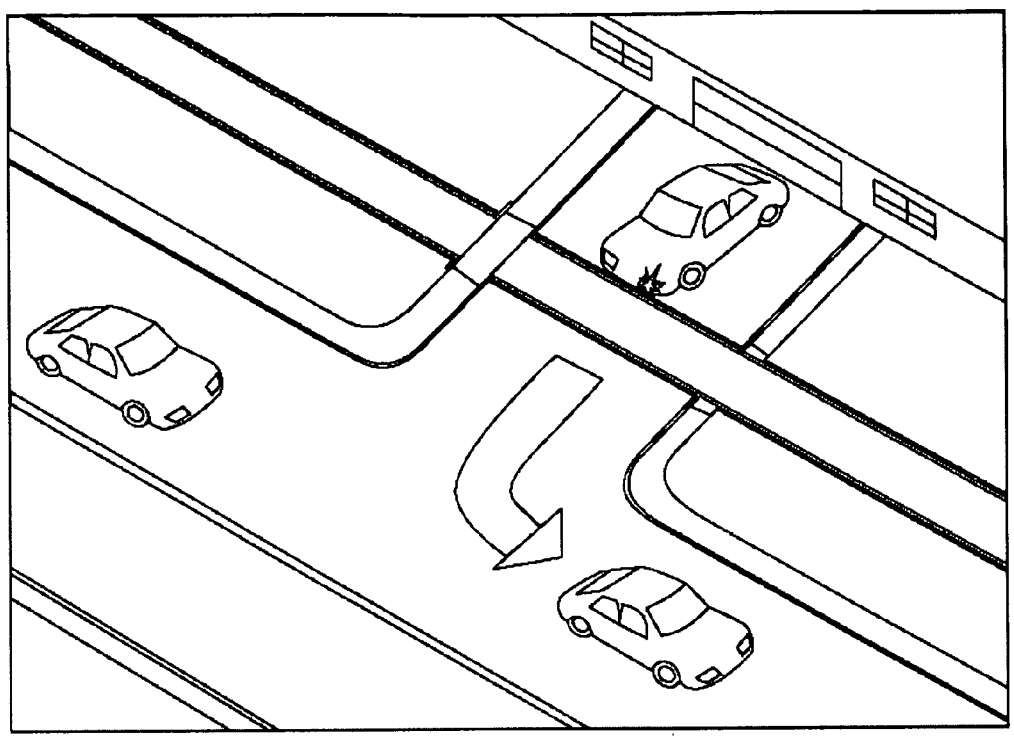
FIG. 7 shows a situation in which the robotic driving system detects a sidewalk.
Figure 8:
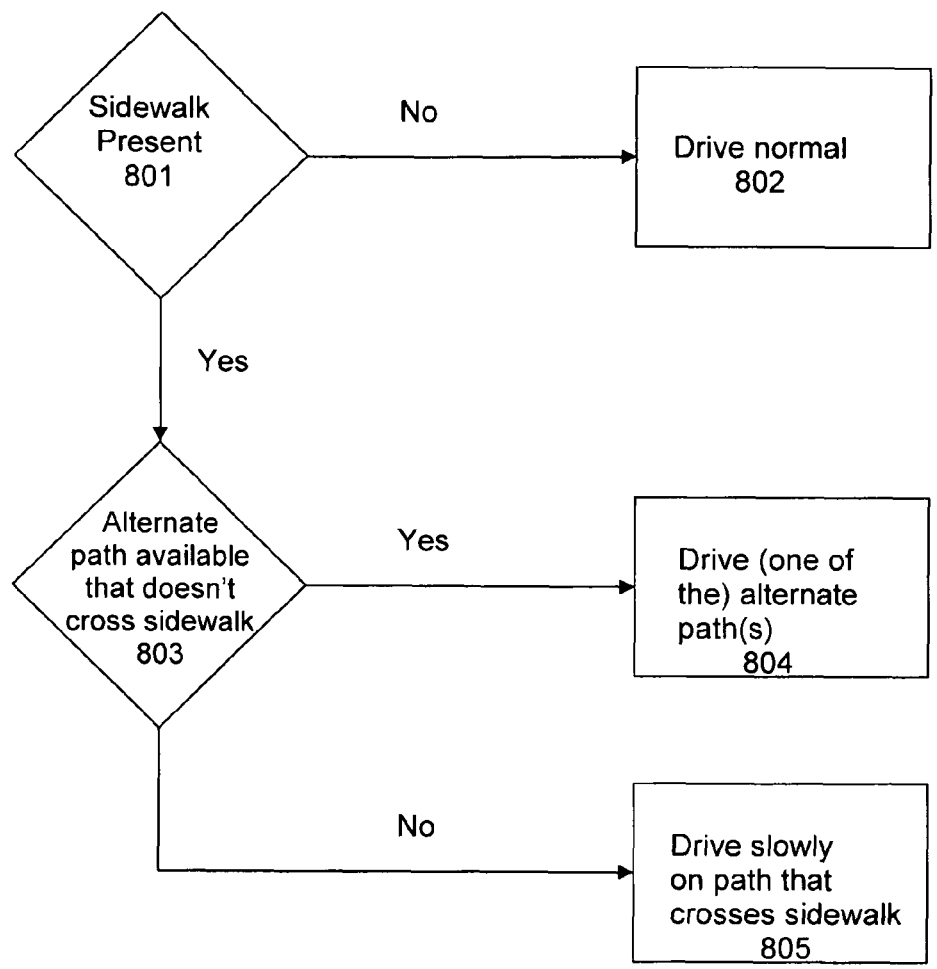
FIG. 8 shows an exemplary process performed by the robotic driving system in the situation shown in FIG. 7.

FIG. 7 illustrates a situation in which the system 100 detects a sidewalk, and FIG. 8 illustrates an example of a process performed by the system 100 in such a situation. In this situation, the system 100 commands the vehicle to avoid driving on sidewalks, except to cross over in a driveway, alley, or other such legal area. The vehicle will only cross a sidewalk when the sidewalk crosses the path of certain types of roadways, such as when the vehicle enters or leaves a driveway or an alley. The database 101 may store the locations of sidewalks, roads, driveways, alleys and the like. The system 100 determines whether a sidewalk is present (step 801), and if no sidewalk is present, the system 100 allows the vehicle to drive normally (step 802). However, if a sidewalk is present, the system 100 determines whether an alternate path is available that does not cross the sidewalk (step 803). If an alternate path is available, the system 100 commands the vehicle to take the alternate path (step 804). However, if an alternate path is not available, the system 100 commands the vehicle to drive slowly across the sidewalk (step 805).

Figure 9:
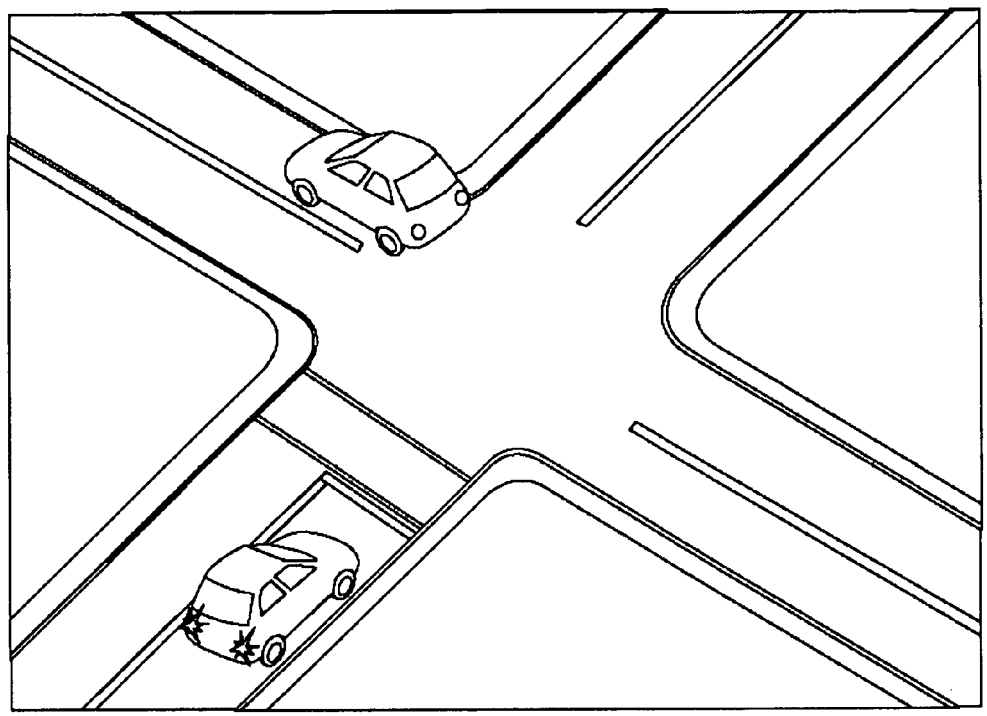
FIG. 9 shows a situation in which the robotic driving system detects a crosswalk as the vehicle comes to a stop.
Figure 10:
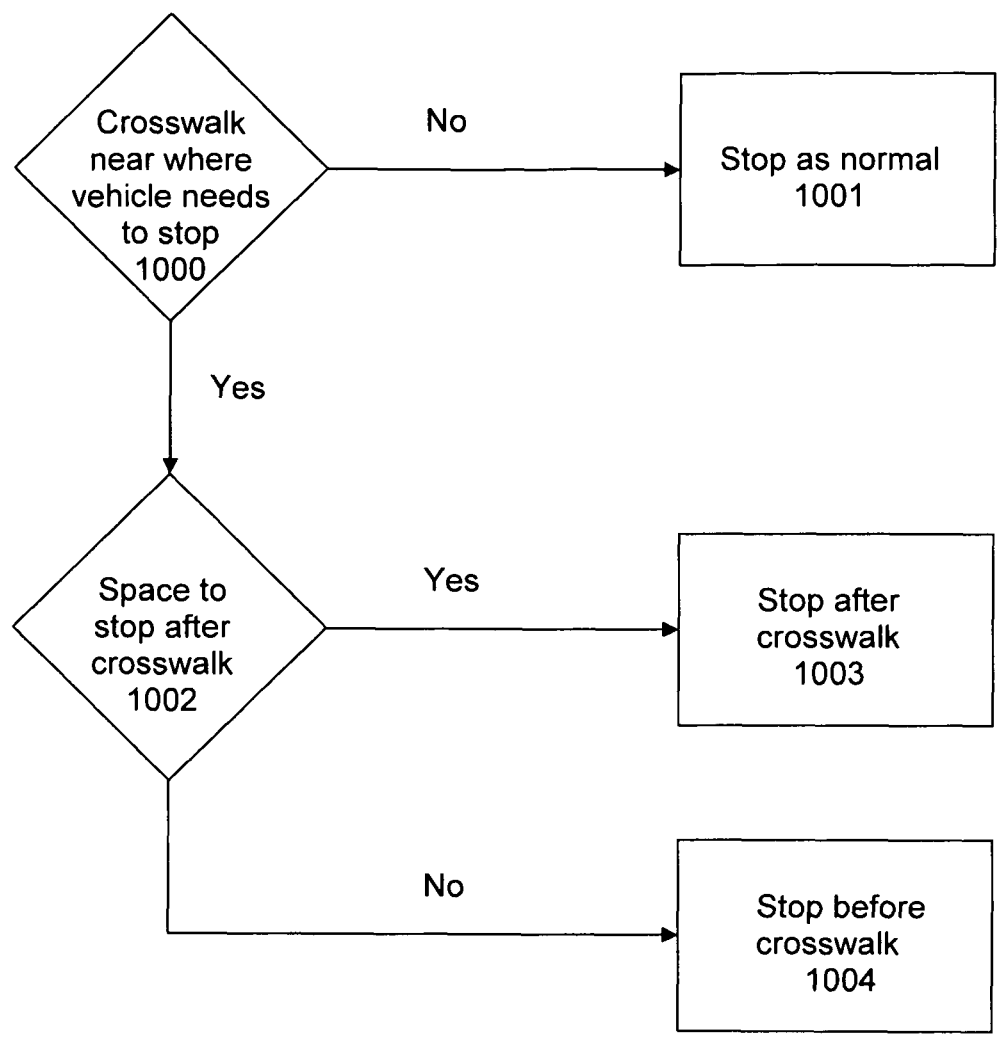
FIG. 10 shows an exemplary process performed by the robotic driving system in the situation shown in FIG. 9.

FIG. 9 illustrates a situation in which the system 100 detects a crosswalk as the vehicle is coming to stop, and FIG. 10 illustrates an example of a process performed by the system 100 in such a situation. In this situation, the system 100 commands the vehicle to avoid stopping on the detected crosswalk, even if no pedestrians are present. The crosswalk may be detected by the sensors 103. Alternatively or additionally, the database 101 may store the locations of crosswalks, and the detected crosswalk may be recognized based on the position of the vehicle. When the vehicle is coming to a stop, the system 100 determines whether a crosswalk is in its vicinity (step 1000). If no crosswalk is in the vicinity, the vehicle stops normally (step 1001). However, if a crosswalk is in the vicinity of the vehicle, the system 100 determines whether there is space for the vehicle to stop after the crosswalk (step 1002). If there is space for the vehicle to stop after the crosswalk, the system 100 commands the vehicle to stop after the crosswalk (step 1003). However, if there is not enough space for the vehicle to stop after the crosswalk, the system 100 commands the vehicle to stop before the crosswalk (step 1004).

Figure 11:
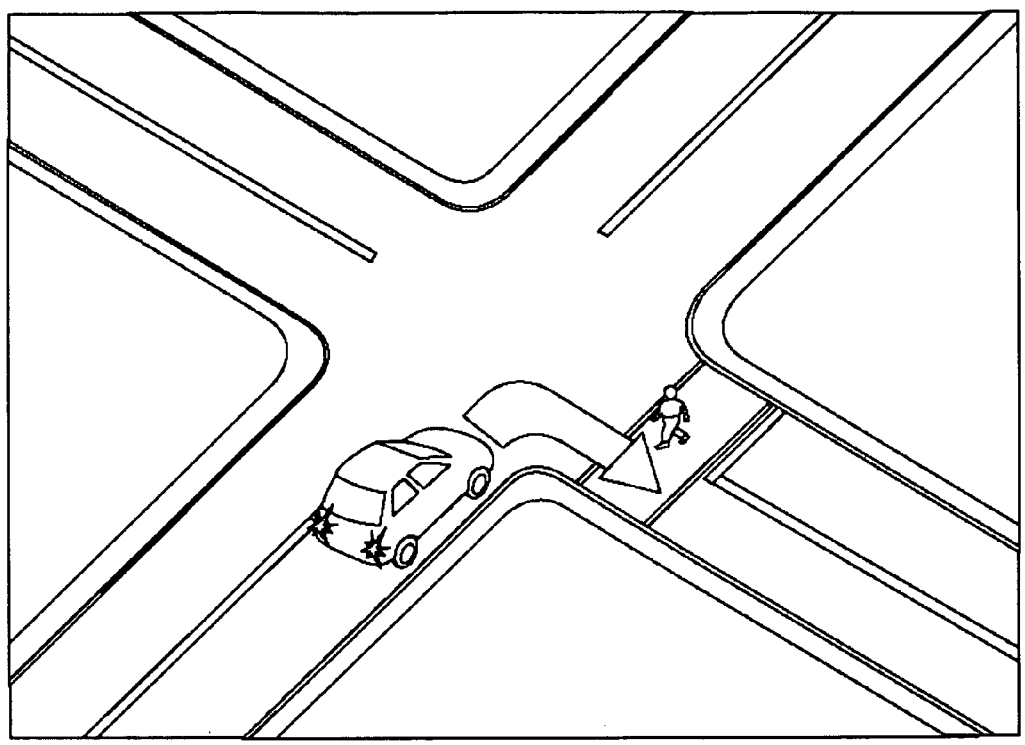
FIG. 11 shows a situation in which the vehicle is preparing to make a turn.
Figure 12:
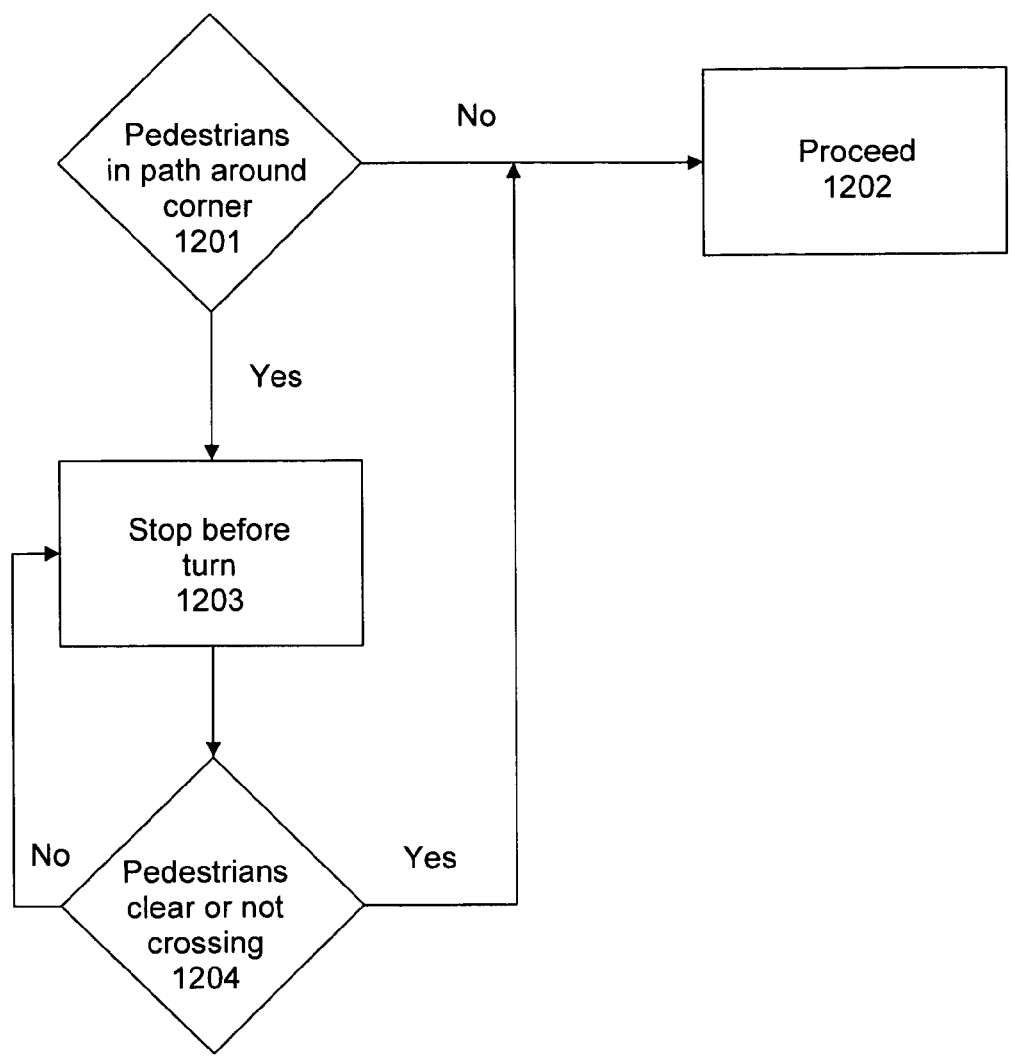
FIG. 12 shows an exemplary process performed by the robotic driving system in the situation shown in FIG. 11.

FIG. 11 illustrates a situation in which the vehicle is preparing to make a turn, and FIG. 12 illustrates an example of a process performed by the system 100 in such a situation. In this situation, when the moving obstacle detection and prediction module 202 detects a pedestrian, the traffic rule enforcement module 205 makes sure the street is clear before allowing the vehicle to make a turn. The traffic rule enforcement module 205 commands the vehicle to stop before an intersection if a pedestrian is in any crosswalk which crosses a planned trajectory of the vehicle. The moving obstacle detection and prediction module 202 first determines whether a pedestrian is in a crosswalk crossing a street the vehicle will be turning on (step 1201). If a pedestrian is not in the crosswalk, the traffic rule enforcement module 205 allows the vehicle to turn (step 1202). However, if a pedestrian is in the crosswalk, the traffic rule enforcement module 205 commands the vehicle to stop (step 1203). The moving obstacle detection and prediction module 202 determines whether a pedestrian is in the crosswalk (step 1204), and when it determines that the crosswalk is clear, the traffic rule enforcement module 205 allows the vehicle to proceed (step 1202).

Figure 13:
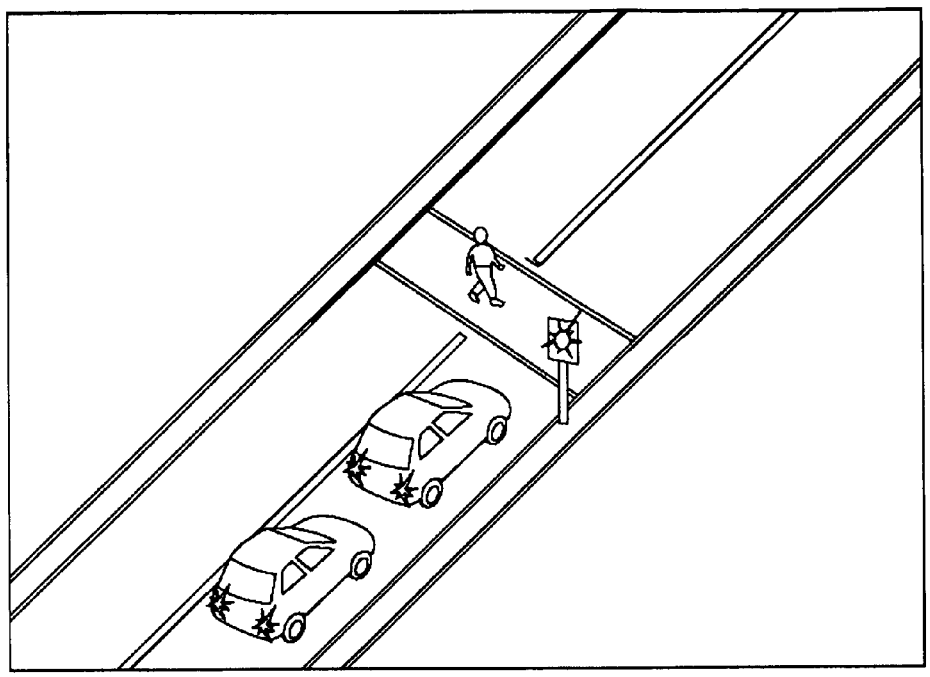
FIG. 13 shows a situation in which the vehicle approaches a pedestrian crossing with a flashing yellow light.
Figure 14:
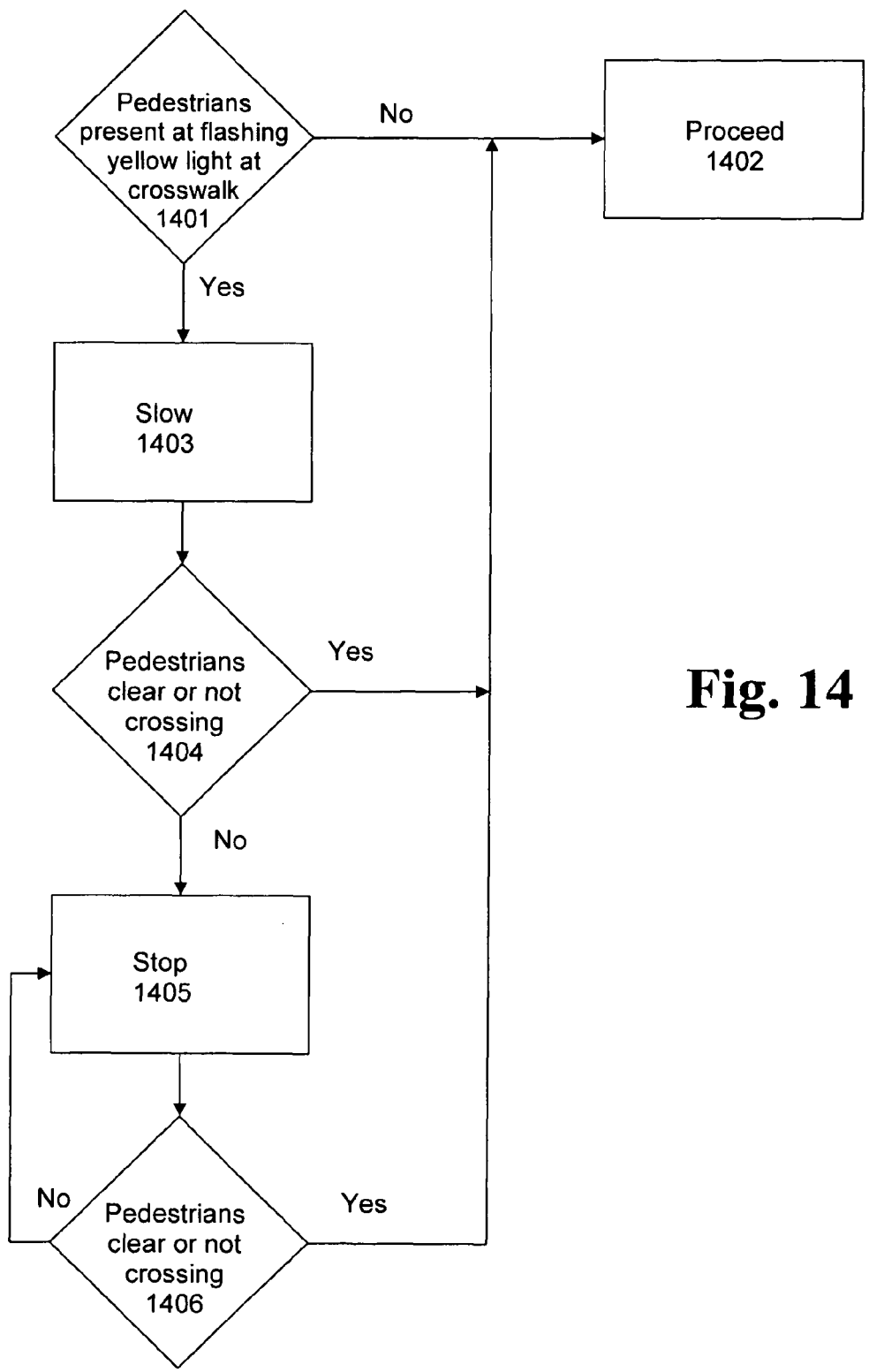
FIG. 14 shows an exemplary process performed by the robotic driving system in the situation shown in FIG. 13.

FIG. 13 illustrates a situation in which the vehicle approaches a pedestrian crossing with a flashing yellow light, and FIG. 14 illustrates an example of a process performed by the system 100 in such a situation. In this situation, the system 100 recognizes the flashing yellow light, and if pedestrians are present, commands the vehicle to stop. The database 101 may store the location of crosswalks, and the street feature retrieve/store module 204 may determine from the database 101 that a crosswalk is in the vicinity of the vehicle. The static obstacle detection module 203 and the moving obstacle detection and prediction module 202 determine whether a yellow light is flashing, and whether a pedestrian is in the vicinity of the crosswalk (step 1401). If no pedestrians are present, the traffic rule enforcement module 205 allows the vehicle to proceed (step 1402). However, if a pedestrian is present, the traffic rule enforcement module 205 commands the vehicle to slow down (step 1403). The moving obstacle detection and prediction module 202 then determines if the pedestrian has cleared the crosswalk, or is not going to cross the crosswalk (step 1404). If the pedestrian has cleared the crosswalk, or is not going to cross the crosswalk, the traffic rule enforcement module 205 allows the vehicle to proceed (step 1402). Otherwise the traffic rule enforcement module 205 commands the vehicle to stop (step 1405), and the moving obstacle detection and prediction module 202 determines if the pedestrian has cleared the crosswalk, or is not going to cross the crosswalk (step 1406). When the moving obstacle detection and prediction module 202 determines that the pedestrian has cleared the crosswalk or is not going to cross the crosswalk, the traffic rule enforcement module 205 allows the vehicle to proceed (step 1402).

Figure 15:
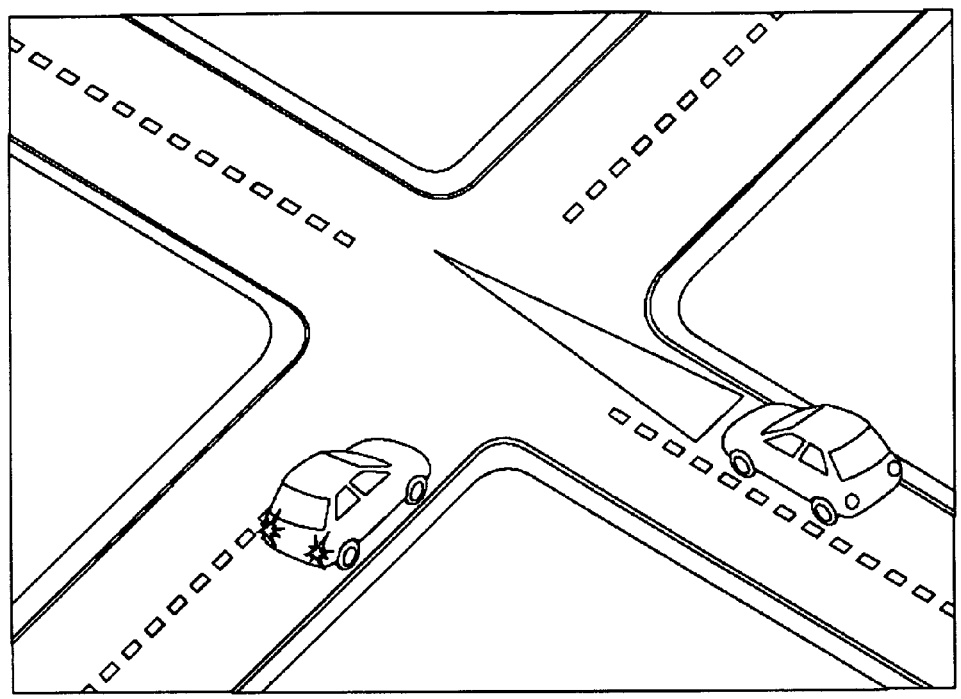
FIG. 15 shows a situation in which the vehicle approaches an intersection without a stop or yield sign.
Figure 16:
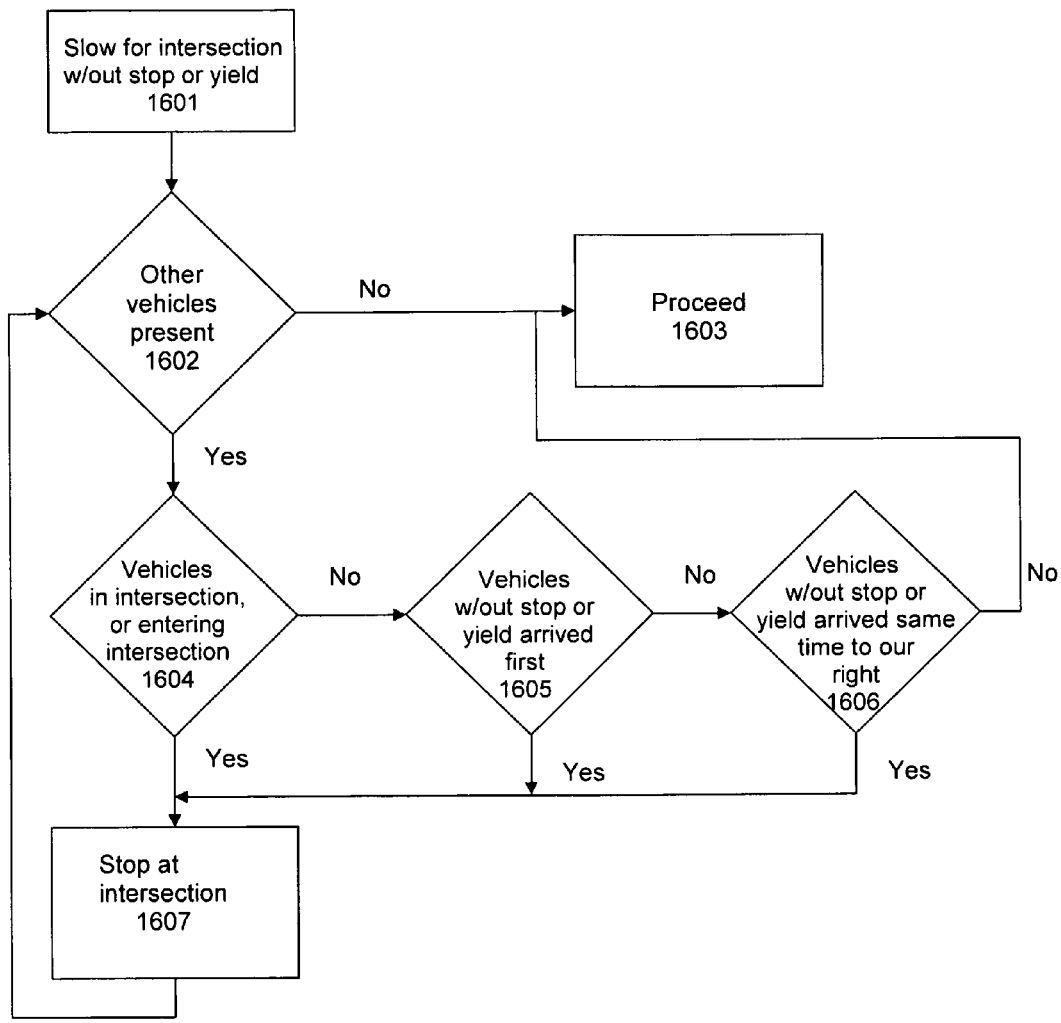
FIG. 16 shows an exemplary process performed by the robotic driving system in the situation shown in FIG. 15.

FIG. 15 illustrates a situation in which the vehicle approaches an intersection without stop or yield signs, and FIG. 16 illustrates an example of a process performed by the system 100 in such a situation. In this situation, the system 100 commands the vehicle to slow down and yield to vehicles already in the intersection or just entering it. The system 100 causes the vehicle to yield to another vehicle that arrives at the intersection first, and to yield to another vehicle that arrives at the intersection at the same time and to the right of the vehicle. The street feature retrieve/store module 204 retrieves the locations of intersections from the database 101, the moving obstacle detection and prediction module 202 detects other vehicles, and the traffic rule enforcement module 205 determines a crossing precedence based the arrival time and direction of other vehicles. First, when the system 100 determines that an intersection without a stop or yield sign is approaching, the traffic rule enforcement module 205 commands the vehicle to slow down (step 1601). The moving obstacle detection and prediction module 202 then determines whether other vehicles are present (step 1602). If no other vehicles are present, the traffic rule enforcement module 205 allows the vehicle to proceed (step 1603). If another vehicle is present, the moving obstacle detection and prediction module 202 determines whether the other vehicle is in the intersection, or entering the intersection (step 1604). If the other vehicle is not in the intersection, or entering the intersection, the moving obstacle detection and prediction module 202 determines whether the other vehicle has arrived at the intersection first (step 1605). If the other vehicle has not arrived at the intersection first, the system 100 determines whether the other vehicle arrived at the intersection at the same time as the vehicle, and whether the other vehicle is to the right of the vehicle (step 1606). If the vehicle arrived at the intersection before the other vehicle, or if the other vehicle is not to the right of the vehicle, the traffic rule enforcement module 205 allows the vehicle to proceed through the intersection (step 1603). However, if the other vehicle is in the intersection or entering the intersection, if the other vehicle arrived at the intersection first, or if the two vehicles arrived at the intersection simultaneously and the other vehicle was to the right of the vehicle, then the traffic rule enforcement module 205 commands the vehicle to stop at the intersection (step 1607). The moving obstacle detection and prediction module 202 then monitors for the presence of vehicles again (step 1602).

Figure 17:
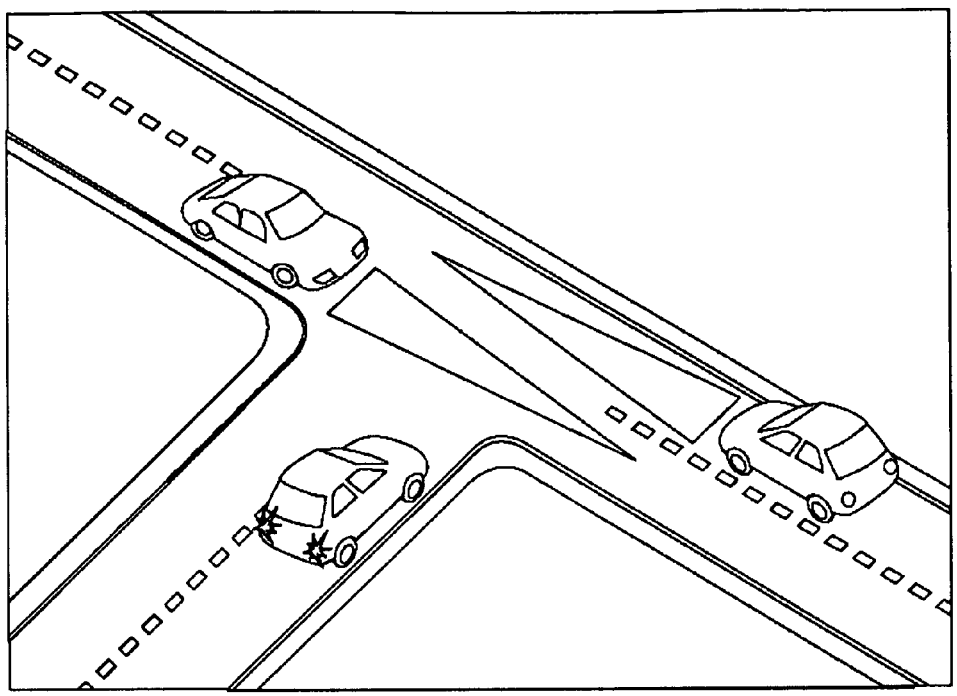
FIG. 17 shows a situation in which the vehicle approaches a T intersection without a stop or yield sign.
Figure 18:
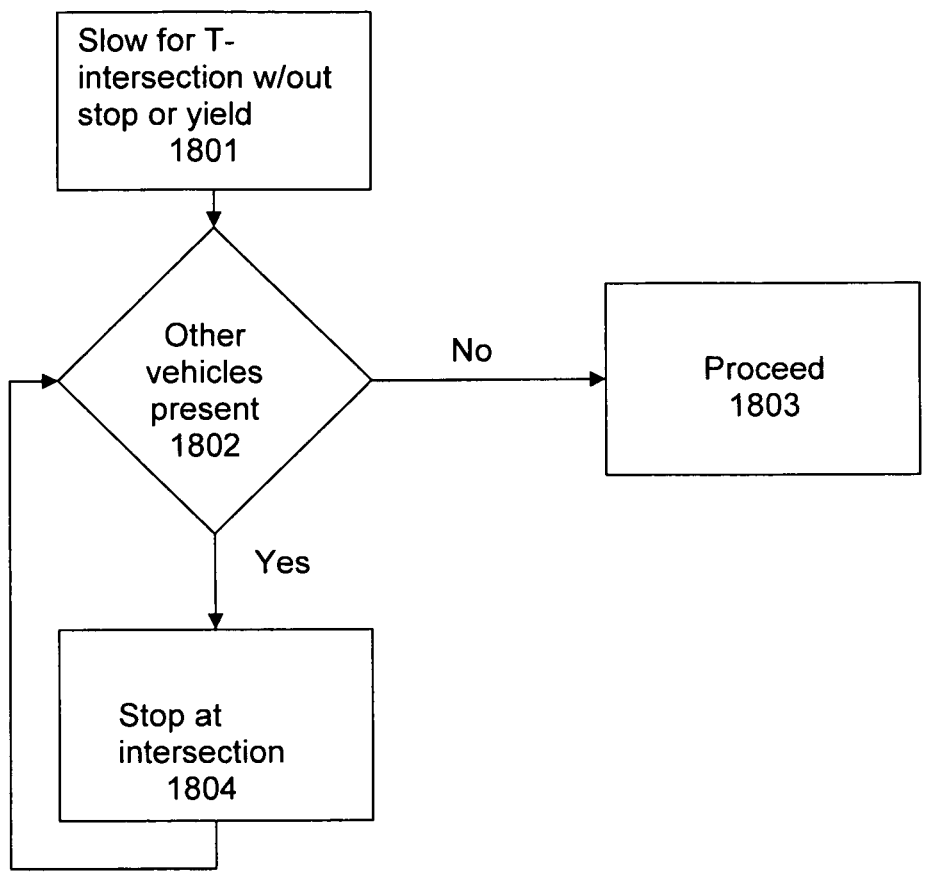
FIG. 18 shows an exemplary process performed by the robotic driving system in the situation shown in FIG. 17.

FIG. 17 illustrates a situation in which the vehicle approaches a T intersection without stop or yield signs (via the trunk of the T), and FIG. 18 illustrates an example of a process performed by the system 100 in such a situation. In this situation, when the system 100 recognizes a T intersection without a stop sign or a yield sign, the system 100 commands the vehicle to slow down or stop to yield to vehicles on the through road. The street feature retrieve/store module 204 retrieves information regarding T intersections from the database 101, and the moving obstacle detection and prediction module 202 detects the presence of other vehicles in and around the intersection. The traffic rule enforcement module 205 commands the vehicle to give right of way to other vehicles if no stop signs are present. If stop signs are present, the traffic rule enforcement module 205 uses the stop signs to compute precedence.

When the vehicle approaches a T intersection without a stop sign or yield sign, the traffic rule enforcement module 205 commands the vehicle to slow down (step 1801). The moving obstacle detection and prediction module 202 then determines whether other vehicles are present (step 1802). If no other vehicles are present, the traffic rule enforcement module 205 allows the vehicle to proceed through the intersection (step 1803). However, if another vehicle is present, the traffic rule enforcement module 205 commands the vehicle to stop at the intersection (step 1804). The moving obstacle detection and prediction module 202 then returns to monitoring for the presence of other vehicles (step 1802).

Figure 19:
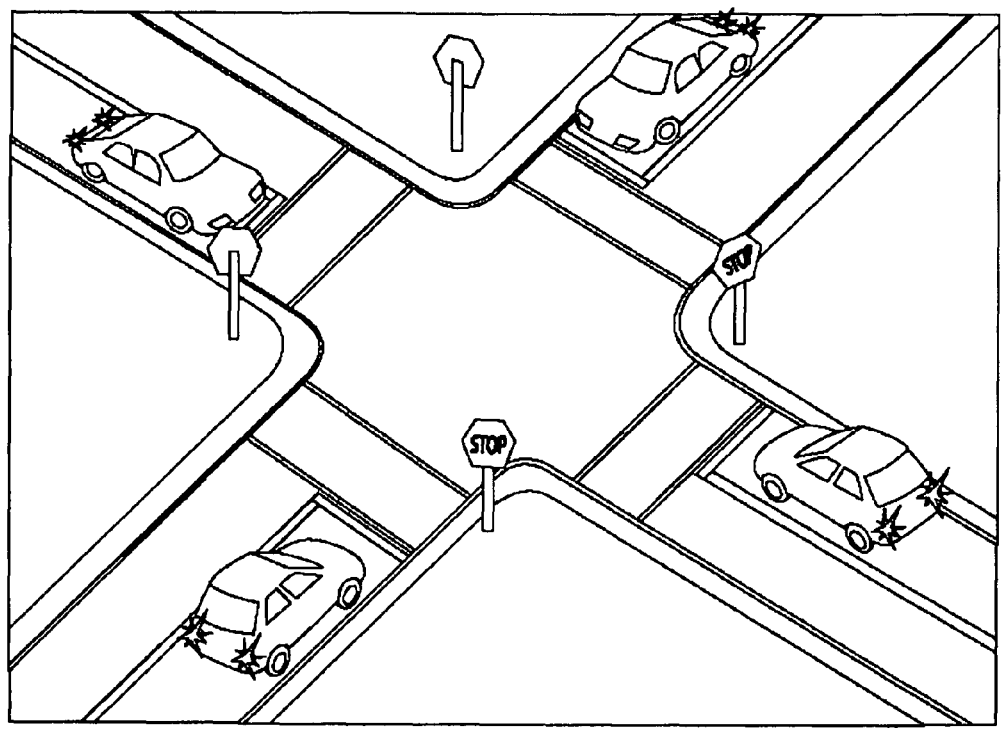
FIG. 19 shows a situation in which the vehicle approaches an intersection with stop signs.
Figure 20:
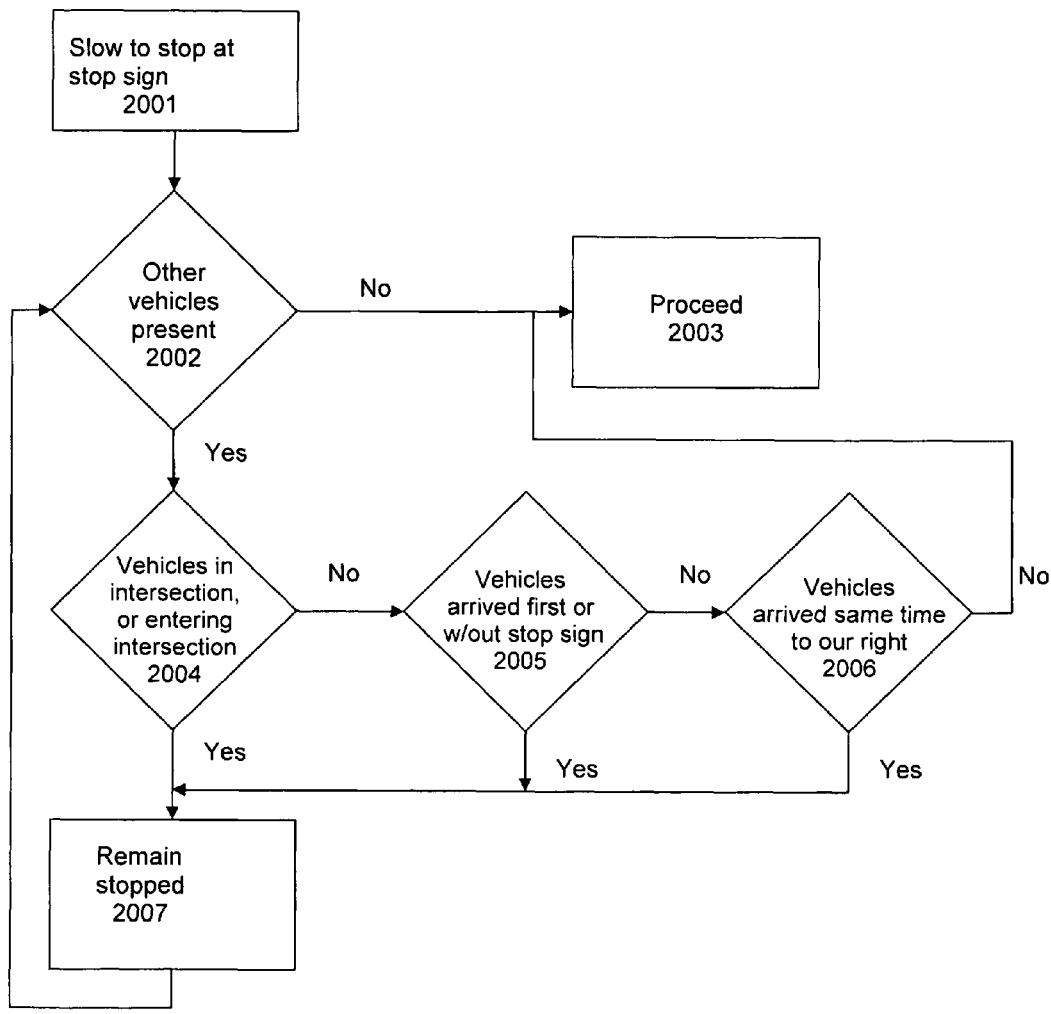
FIG. 20 shows an exemplary process performed by the robotic driving system in the situation shown in FIG. 19.

FIG. 19 illustrates a situation in which the vehicle approaches an intersection with stop signs, and FIG. 20 illustrates an example of a process performed by the system 100 in such a situation. In this situation, the traffic rule enforcement module 205 commands the vehicle to stop at a stop sign (step 2001). The moving obstacle detection and prediction module 202 then determines whether other vehicles are present (step 2002). If no other vehicles are present, the traffic rule enforcement module 205 allows the vehicle to proceed (step 2003). However, if another vehicle is present, the moving obstacle detection and prediction module 202 determines whether the other vehicle is in the intersection or entering the intersection (step 2004). If the other vehicle is in the intersection or entering the intersection, the vehicle remains stopped (step 2007). The moving obstacle detection and prediction module 202 then continues monitoring for the presence of other vehicles (step 2002). However, if the other vehicle is not in the intersection or entering the intersection, the moving obstacle detection and prediction module 202 determines whether the other vehicle arrived at the intersection first, and determines whether the other vehicle must stop at the stop sign (step 2005). If the other vehicle arrived at the intersection first, or if the other vehicle does not have a stop sign to stop at, the vehicle remains stopped (step 2007). However, if the other vehicle did not arrive at the intersection first, and if the other vehicle does have a stop sign to stop at, the moving obstacle detection and prediction module 202 determines whether the two vehicles arrived at the intersection simultaneously and determines whether the other vehicle is to the right of the vehicle (step 2006). If the vehicle arrived at the intersection before the other vehicle, or if the other vehicle is not to the right of the vehicle, the traffic rule enforcement module 205 allows the vehicle to proceed (step 2003). Otherwise, if the two vehicles arrived at the intersection simultaneously and the other vehicle is to the right of the vehicle, the vehicle remains stopped (step 2007).

Figure 21:
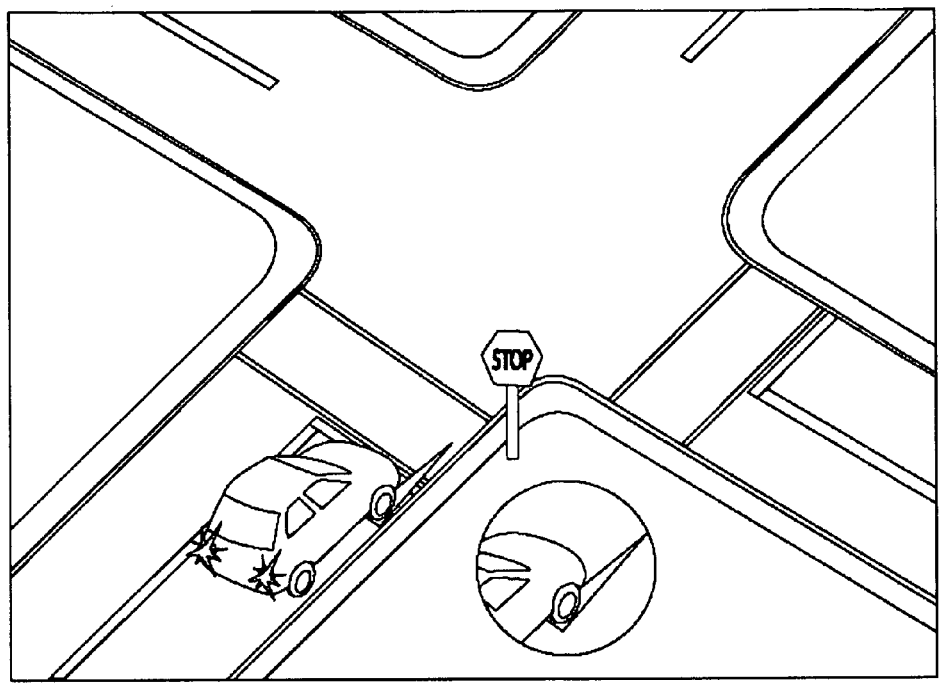
FIG. 21 shows a situation in which the vehicle stops at a stop sign.
Figure 22:
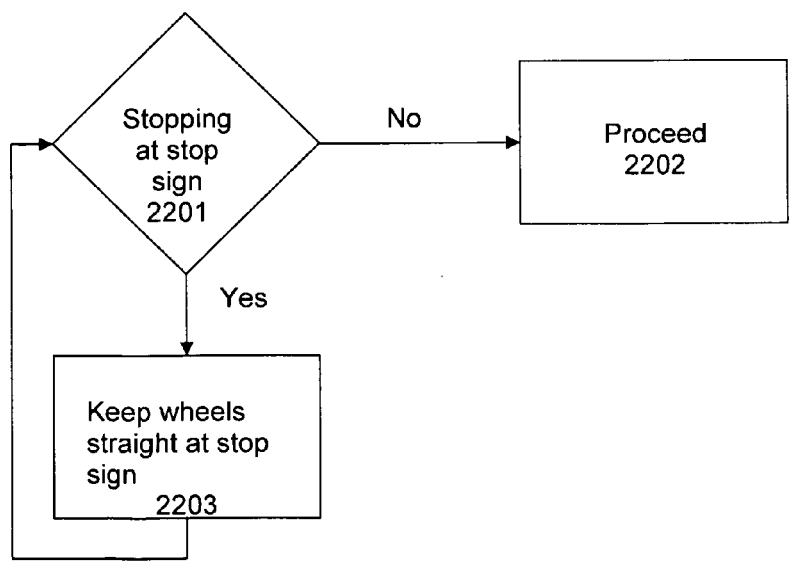
FIG. 22 shows an exemplary process performed by the robotic driving system in the situation shown in FIG. 21.

FIG. 21 illustrates a situation in which the vehicle stops at a stop sign, and FIG. 22 illustrates an example of a process performed by the system 100 in such a situation. In this situation, the system 100 keeps the wheels of the vehicle pointed forward while the vehicle is stopped at the stop sign, to prevent the vehicle from driving over a walkway if the vehicle is rear-ended. This behavior may be accomplished, for example, by the process shown in FIG. 22. The traffic rule enforcement module 205 first determines whether the vehicle is stopped at a stop sign (step 2201). This behavior may be accomplished, for example, via the street feature retrieve/store module's 204 interaction with the database 101, or solely via the street feature retrieve/store module 204. If the vehicle is not stopped at a stop sign, the traffic rule enforcement module 205 allows the vehicle to proceed (step 2202). However, if the vehicle is stopped at a stop sign, the traffic rule enforcement module 205 commands the vehicle to keep its wheel pointed straight forward while the vehicle is stopped at the stop sign (step 2203).

Figure 23:
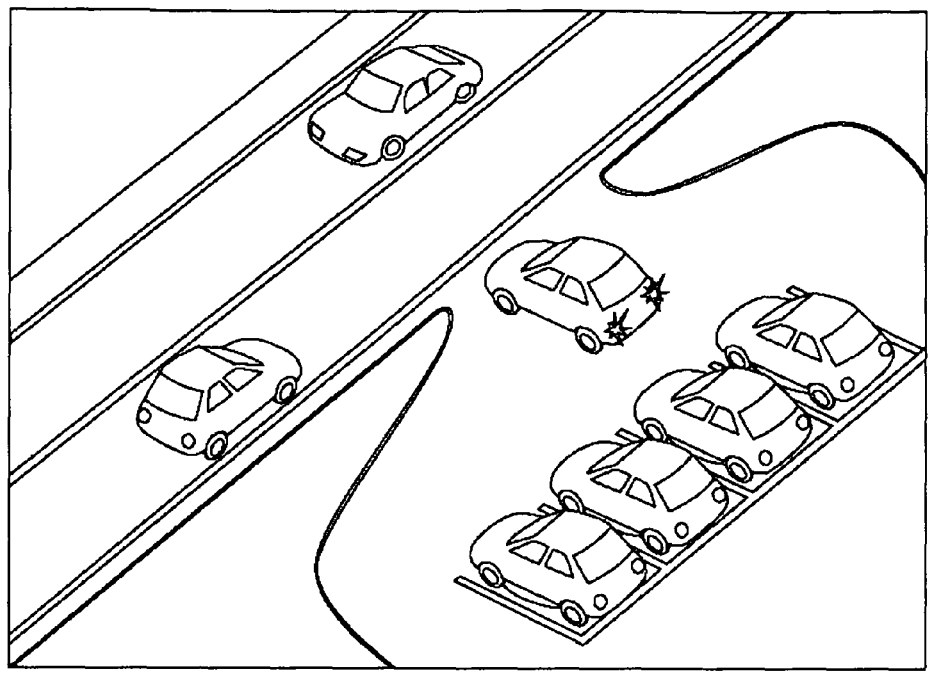
FIG. 23 shows a situation in which the vehicle is entering a street or other roadway from an area outside of the road network.

FIG. 23 illustrates a situation in which the vehicle is entering a street or other roadway from an area outside of the road network, such as a parking lot. In this situation, the system 100 causes the vehicle to yield to all traffic on the street or roadway. The system 100 recognizes that it is outside of the road network by retrieving information from the database 101, and by determining its location from the location detector 102. The moving obstacle detection and prediction module 202 recognizes other vehicles in the vicinity of the entrance to the street or roadway, and the traffic rule enforcement module 205 commands the vehicle to give right of way to other vehicles traveling on the street or roadway.

The system 100 is also capable of controlling the vehicle to follow traffic rules relating to roundabouts (also referred to as rotaries or traffic circles). The database 101 may store data indicating the location of roundabouts. The street feature retrieve/store module 204 may retrieve this information, and the system 100 may compare this information with the present location of the vehicle. Alternatively, or additionally, the static obstacle detection module 203 may detect the presence of a roundabout via the sensors 103. The moving obstacle detection and prediction module 202 may determine the presence, speed and/or direction of other vehicles, bicycles, pedestrians and the like which are in the vicinity of the roundabout via the sensors 103. When the vehicle enters the roundabout, the traffic rule enforcement module 205 controls the vehicle to proceed in a counterclockwise direction.

Examples of situations the system 100 may encounter relating to roundabouts, and processes the system 100 may perform in these situations are described below with reference to FIGS. 24-29.

Figure 24:
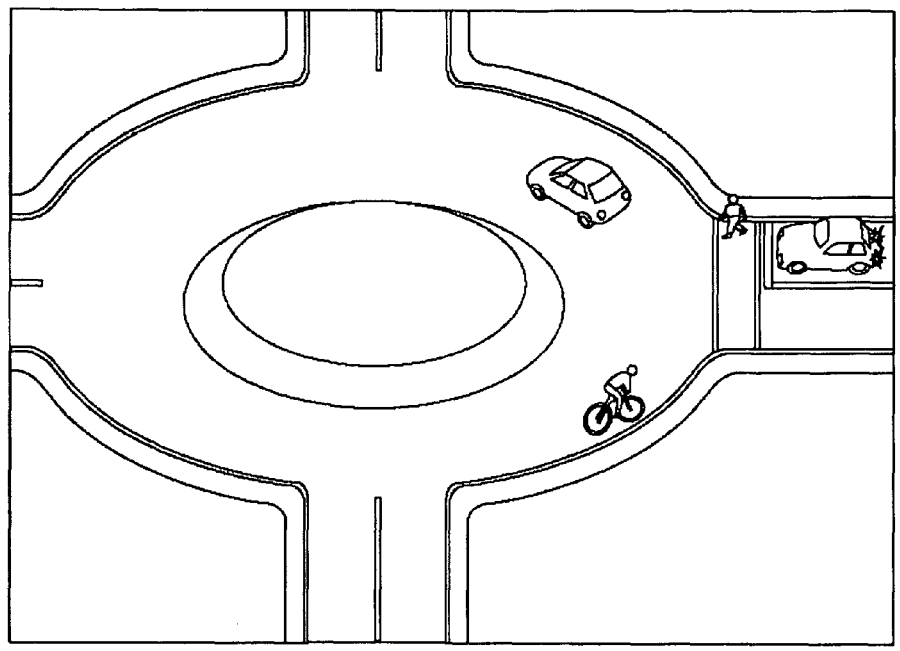
FIG. 24 shows a situation in which the vehicle approaches a roundabout.
Figure 25:
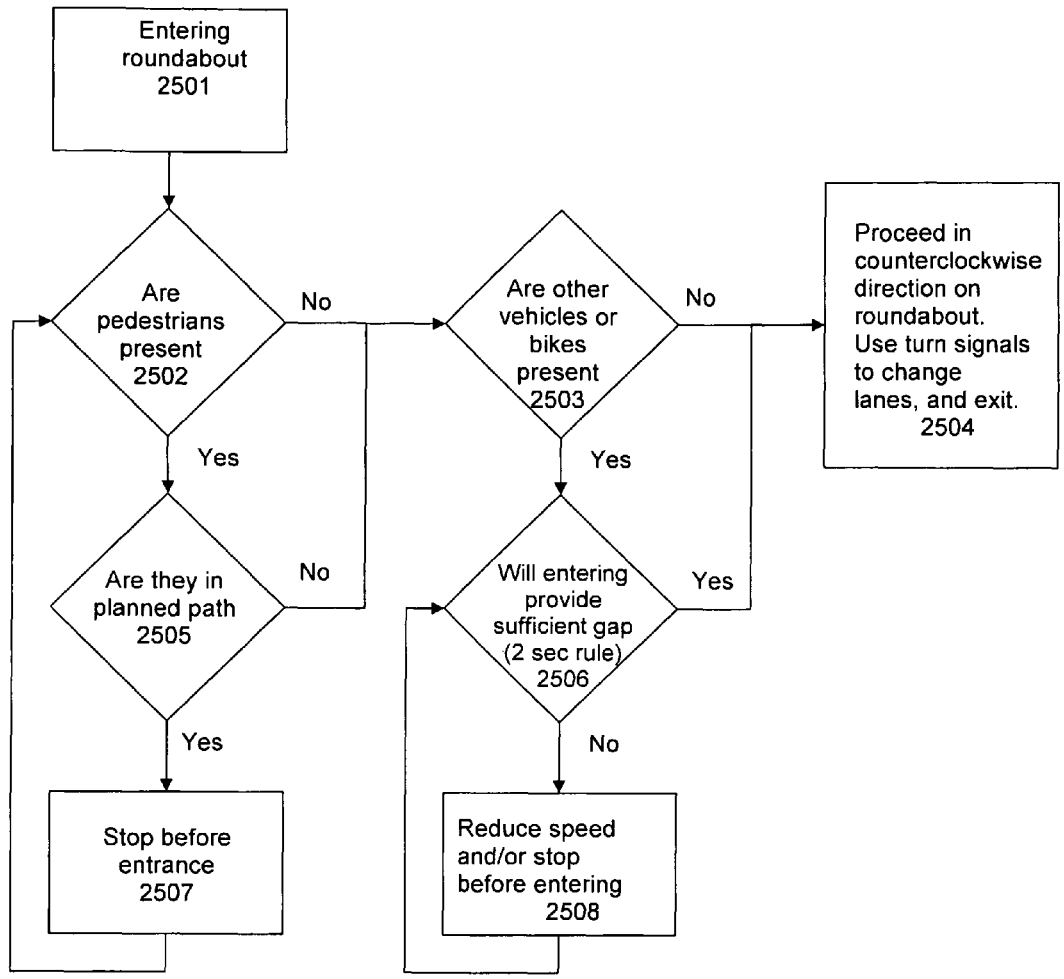
FIG. 25 shows an exemplary process performed by the robotic driving system in the situation shown in FIG. 24.
Figure 26:
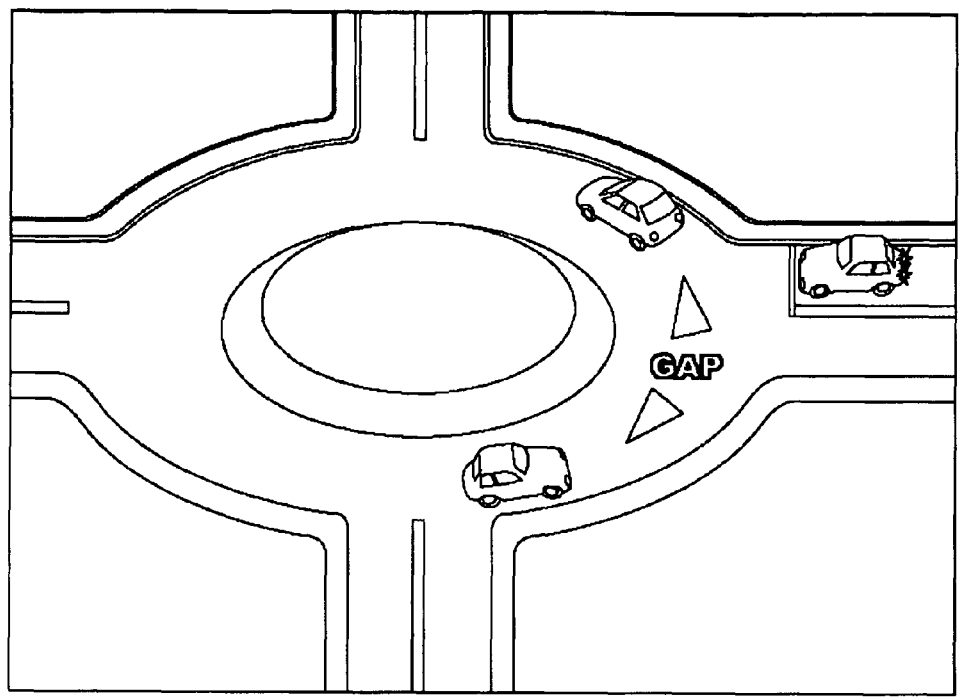
FIG. 26 shows an example of vehicles traveling in a roundabout.
Figure 27:
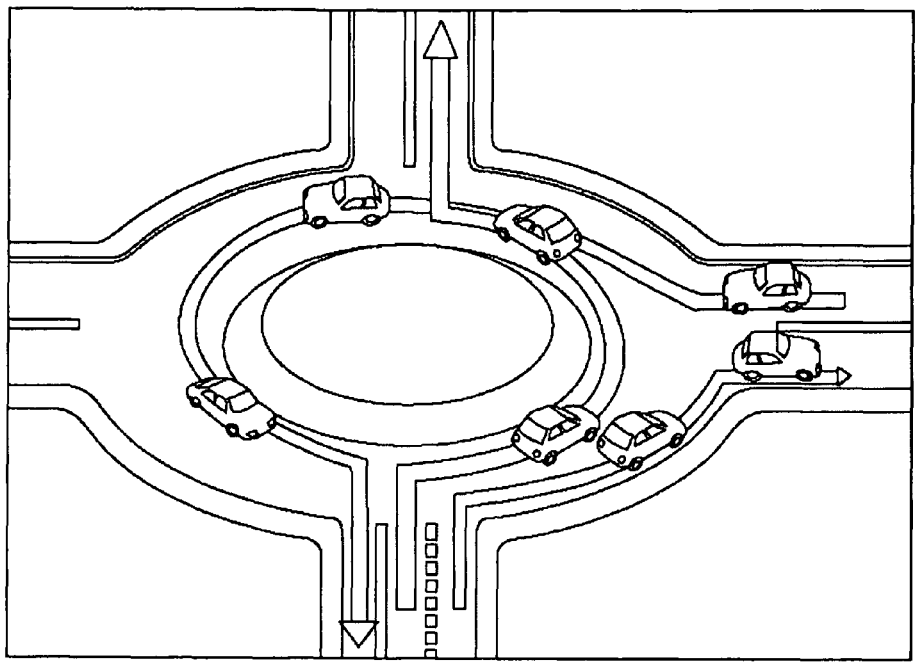
FIG. 27 shows another example of vehicles traveling in a roundabout.
Figure 30:
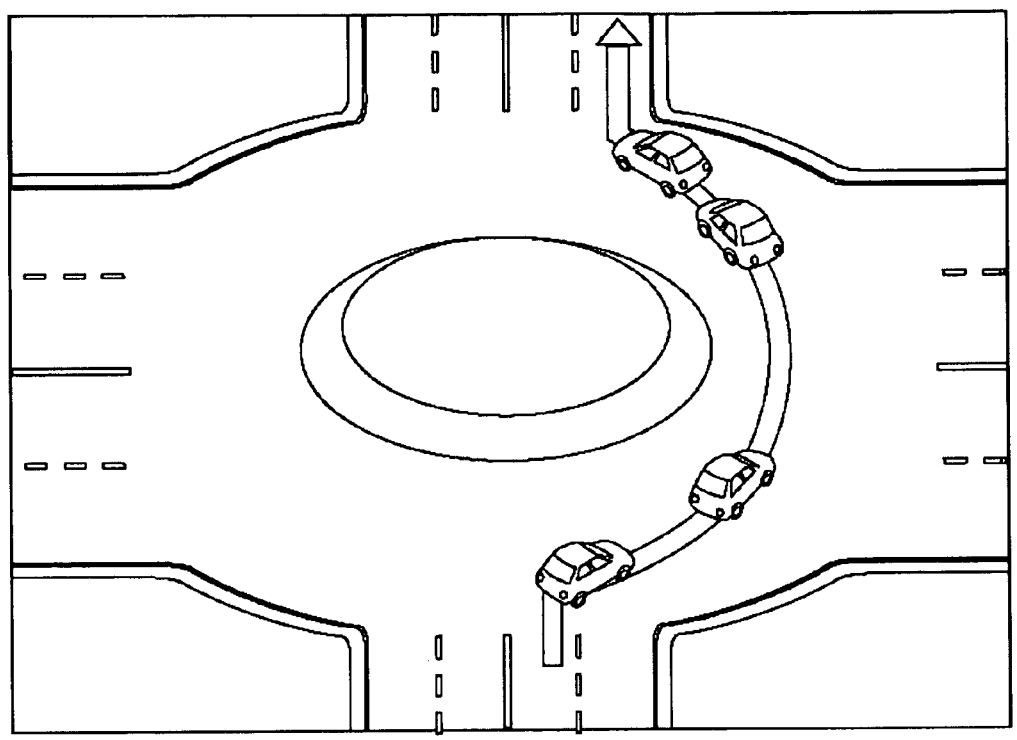
FIG. 30 shows an example of a vehicle traveling in a roundabout.

FIG. 24 illustrates a situation in which the vehicle approaches a roundabout. In this situation, the system 100 controls the vehicle to yield to vehicles, bicycles and pedestrians when entering the roundabout. This behavior may be accomplished, for example, by the process shown in FIG. 25. First, the system 100 determines via the street feature retrieve/store module 204 and/or static obstacle detection module 203 that the vehicle is entering a roundabout (step 2501). The moving obstacle detection and prediction module 202 determines whether a pedestrian is present in the roundabout (step 2502). If a pedestrian is present, the traffic rule enforcement module 205 determines whether the pedestrian is in a path the vehicle is planning to take (step 2505). If the pedestrian is in a path the vehicle is planning to take, the traffic rule enforcement module 205 commands the vehicle to stop (step 2507), and the moving obstacle detection and prediction module 202 continues to monitor for pedestrians (2502). The moving obstacle detection and prediction module 202 also determines whether other vehicles or bicycles are present in the roundabout (step 2503). If other vehicles or bicycles are present in the roundabout, the system 100 determines whether there will be a sufficient gap between the vehicle and the other vehicles or bicycles in the roundabout if the vehicle enters the roundabout (step 2506), as shown, for example, in FIG. 26. For example, the system may determine whether there will be a two second gap between the vehicles. If the system 100 determines that there would not be a sufficient gap, the system 100 controls the vehicle to reduce its speed and/or stop before entering the roundabout (step 2508). If the system 100 determines that there would be a sufficient gap, or if the system determines that no pedestrians, vehicles or bicycles are present in the roundabout, the traffic rule enforcement module 205 controls the vehicle to proceed in a counterclockwise direction in the roundabout (as shown in FIG. 27), and to use turn signals when the vehicle is changing lanes or exiting the roundabout (as shown in FIG. 30) (step 2504).

Figure 28:
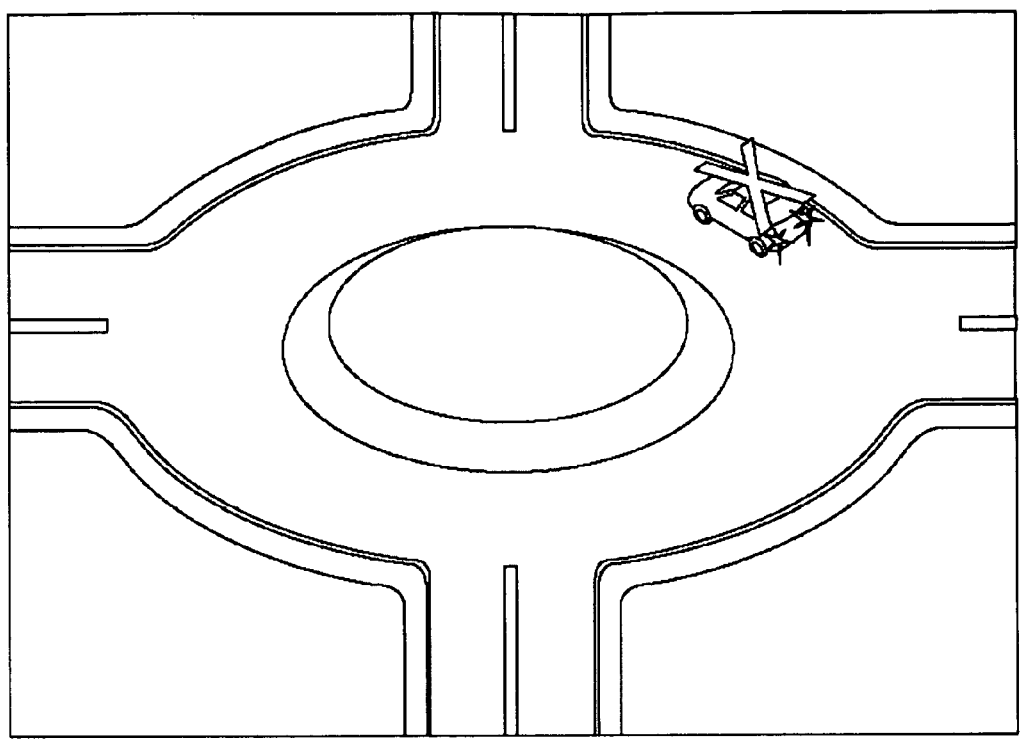
FIG. 28 shows an example of a vehicle stopped in a roundabout.
Figure 29:
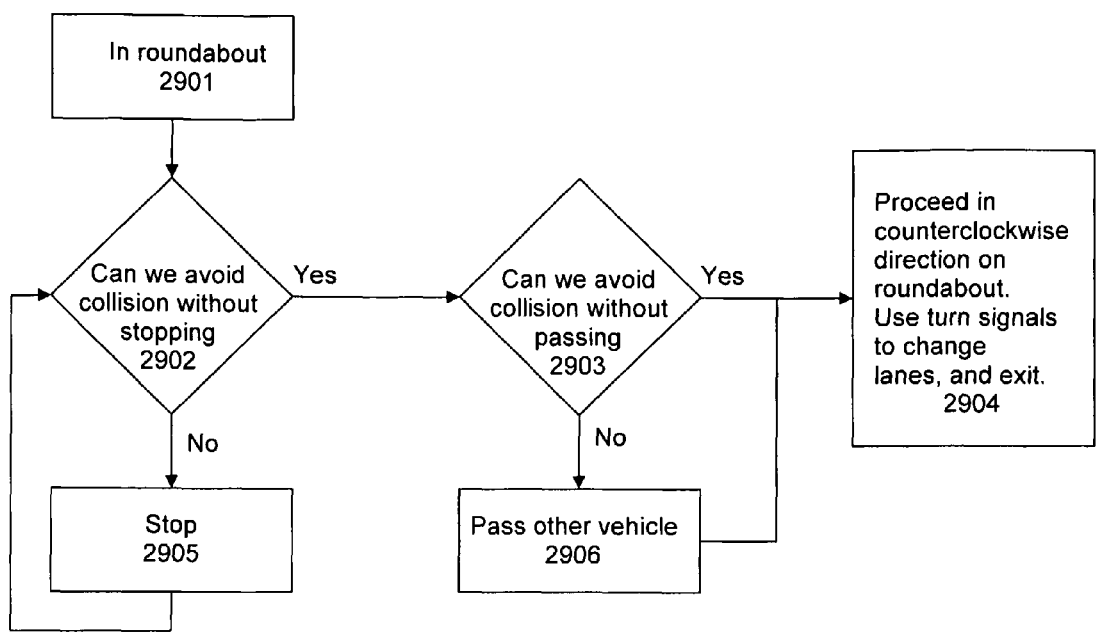
FIG. 29 shows an exemplary process of controlling a vehicle in a roundabout.

The system 100 also controls the vehicle so that it will not stop in the roundabout (as shown in FIG. 28), or pass vehicles in a roundabout, except to avoid a collision. This behavior may be accomplished, for example, by the process shown in FIG. 29. First, the vehicle enters the roundabout (step 2901). Via the moving obstacle detection and prediction module 202, the system 100 determines whether a collision with another vehicle is imminent and whether the collision can be avoided without stopping (step 2902). If the collision cannot be avoided without stopping the vehicle, the traffic rule enforcement module 205 commands the vehicle to stop (step 2905). If the collision can be avoided without stopping the vehicle, the system 100 determines if the collision can be avoided without passing the other vehicle (step 2903). If the collision cannot be avoided without passing the other vehicle, the traffic rule enforcement module 205 commands the vehicle to pass the other vehicle to avoid the collision (step 2906). However, if the collision can be avoided without passing the other vehicle, the traffic rule enforcement module 205 commands the vehicle to proceed (step 2904).

The system 100 is also capable of controlling the vehicle to follow traffic rules relating to mountain roads. The system 100 may determine that it is on a mountain road, or other narrow road or narrow portion of a road, based on the sensors 103, navigational features and/or information stored in the database 101. If the system encounters a vehicle traveling in the opposite direction and determines that there is insufficient room for the vehicles to pass, then the system determines the priority of the vehicles. For example, if the vehicle is traveling downhill, it will yield to the other vehicle by backing up until there is room for the other vehicle to pass. Other priority schemes may be implemented, such as, for example, the direction of travel of each vehicle, which is particularly important when the vehicles are not on a slope. An example of a situation the system 100 may encounter relating to mountain roads, and processes the system 100 may perform in this situation are described below with reference to FIGS. 31 and 32.

Figure 31:
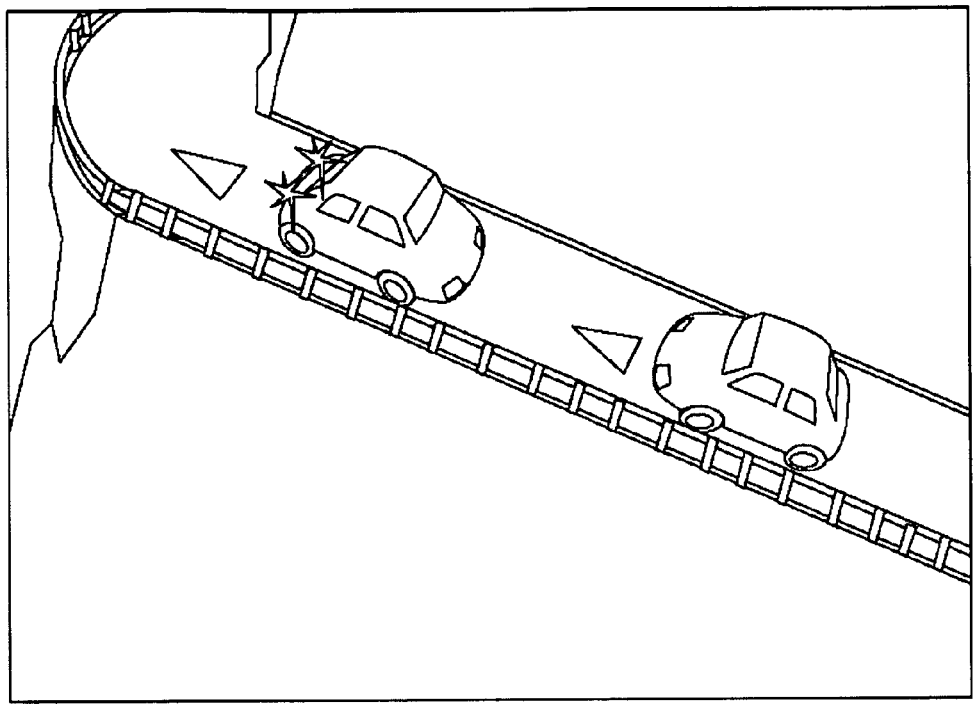
FIG. 31 shows a situation in which the vehicle meets another vehicle on a steep road where neither vehicle can pass.
Figure 32:
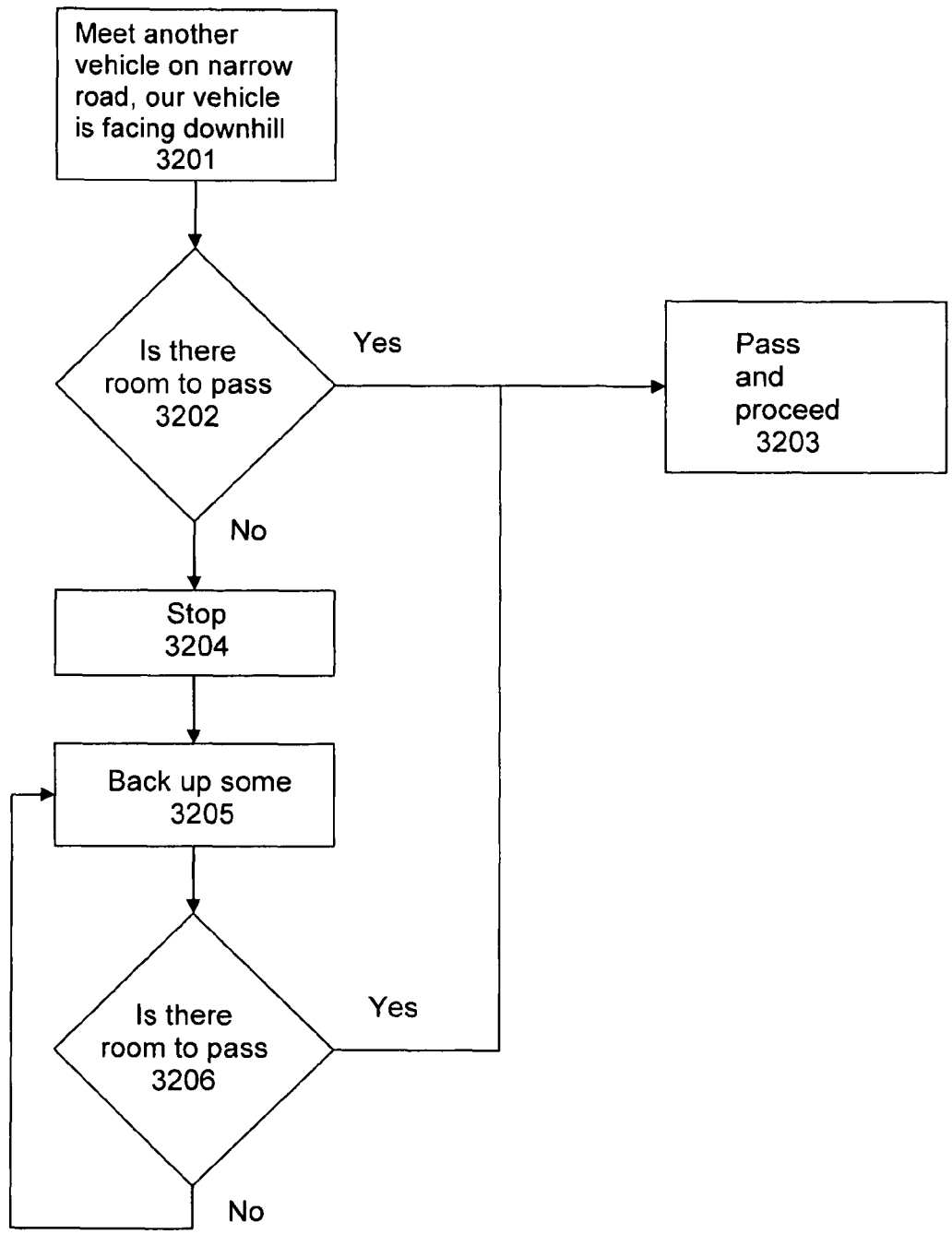
FIG. 32 shows an exemplary process performed by the robotic driving system in the situation shown in FIG. 31.

FIG. 31 illustrates a situation in which the vehicle meets another vehicle on a steep road where neither can pass. In this situation, if the vehicle is facing downhill, it will yield the right of way to the other vehicle by backing up until the vehicle going uphill can pass. This behavior can be accomplished, for example, by the process shown in FIG. 32. First, the system 100 determines that the vehicle has met another vehicle on a narrow road, and that the vehicle is facing downhill (step 3201). Then, the system 100 determines, via the sensor 103, whether there is room to pass (step 3202). If there is room to pass, the traffic rule enforcement module 205 commands the vehicle to proceed (3203). However, if there is no room to pass, the traffic rule enforcement module 205 commands the vehicle to stop (step 3204) and back up (step 3205). The system 100 again determines whether there is room to pass (step 3206). If there is no room to pass, the vehicle backs up some more (step 3205). When there is room to pass, the traffic rule enforcement module 205 commands the vehicle to proceed (step 3203).

The system 100 is also capable of controlling the vehicle to follow traffic rules relating to traffic lights and road signs. The system 100 may identify traffic signals, including traffic lights, road signs, flashing school bus lights and the like using the sensors 103, stored data and/or location information. Examples of situations the system 100 may encounter relating to traffic lights and road signs, and processes the system 100 may perform in these situations are described below with reference to FIGS. 33-55.

Figure 33:
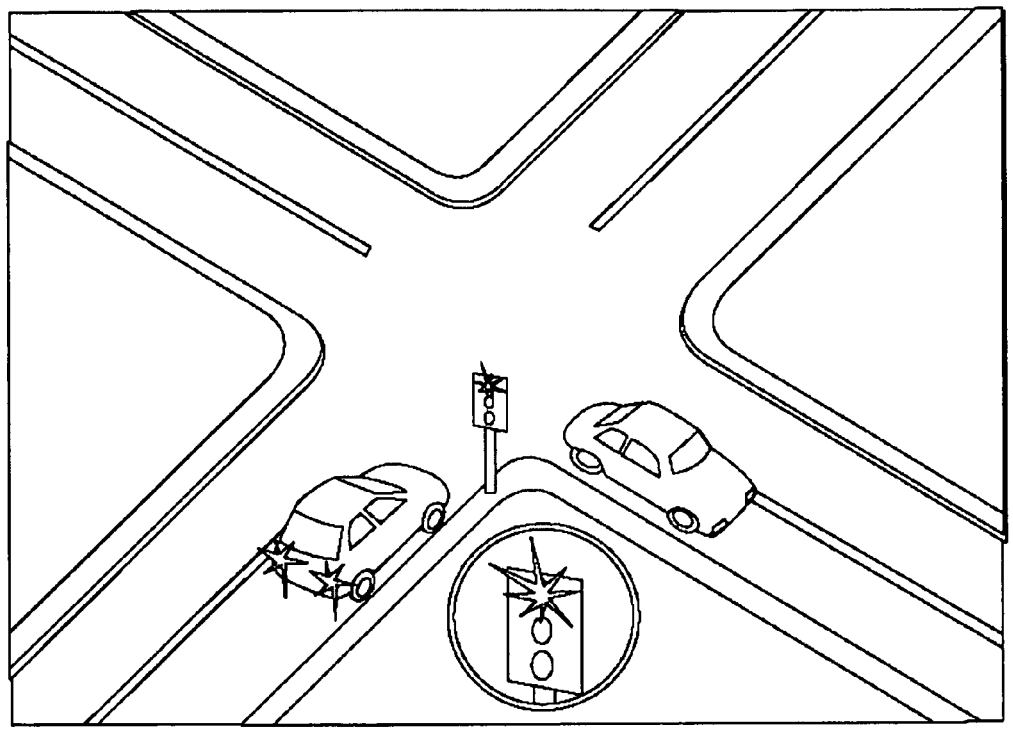
FIG. 33 shows a situation in which the vehicle approaches a red traffic light.
Figure 34:
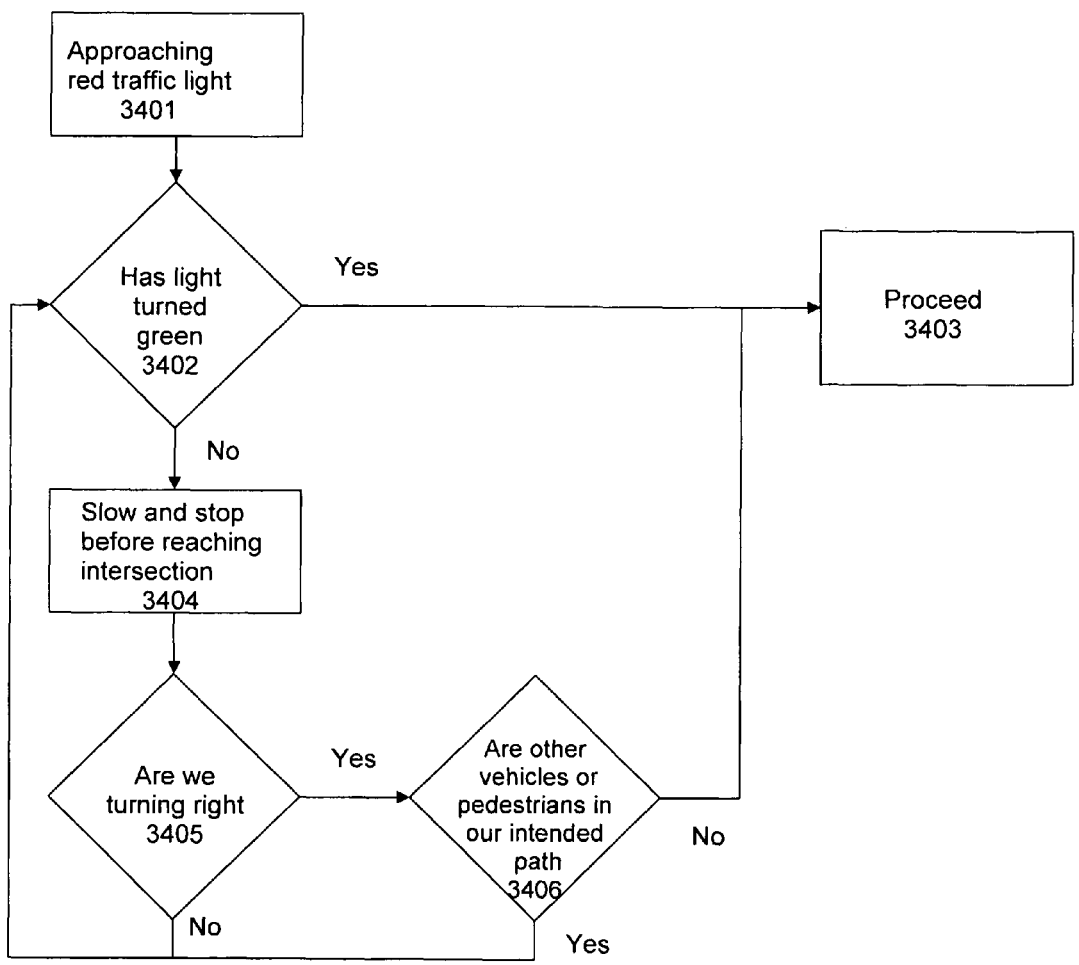
FIG. 34 shows an exemplary process performed by the robotic driving system in the situation shown in FIG. 33.

FIG. 33 illustrates a situation in which the vehicle approaches a red traffic light. In this situation, the system 100 recognizes the red light, and commands the vehicle to stop. If the vehicle is making a right turn, and if a pedestrian or crossing traffic is present, the system 100 commands the vehicle to yield. This behavior may be accomplished, for example, by the process shown in FIG. 34. First, the sensors 103 detect that the vehicle is approaching a red traffic light (step 3401). The system 100 then determines, via the sensors 103, whether the light has turned green (step 3402). If the light has turned green, the traffic rule enforcement module 205 commands the vehicle to proceed (step 3403). If the light has not turned green, the traffic rule enforcement module 205 commands the vehicle to slow down and stop before reaching the intersection (step 3404). Based on the road planner module 201, the system 100 determines whether the vehicle will be turning right (step 3405). If the vehicle will be turning right, the moving obstacle detection and prediction module 202 determines whether other vehicles or pedestrians are in the intended path of the vehicle (step 3406). If other vehicles or pedestrians are in the path of the vehicle, the system 100 returns to monitoring whether the light has turned green (step 3402). However, if there are no vehicles or pedestrians in the vehicle's path, the traffic rule enforcement module 205 commands the vehicle to proceed (step 3403).

Figure 35:
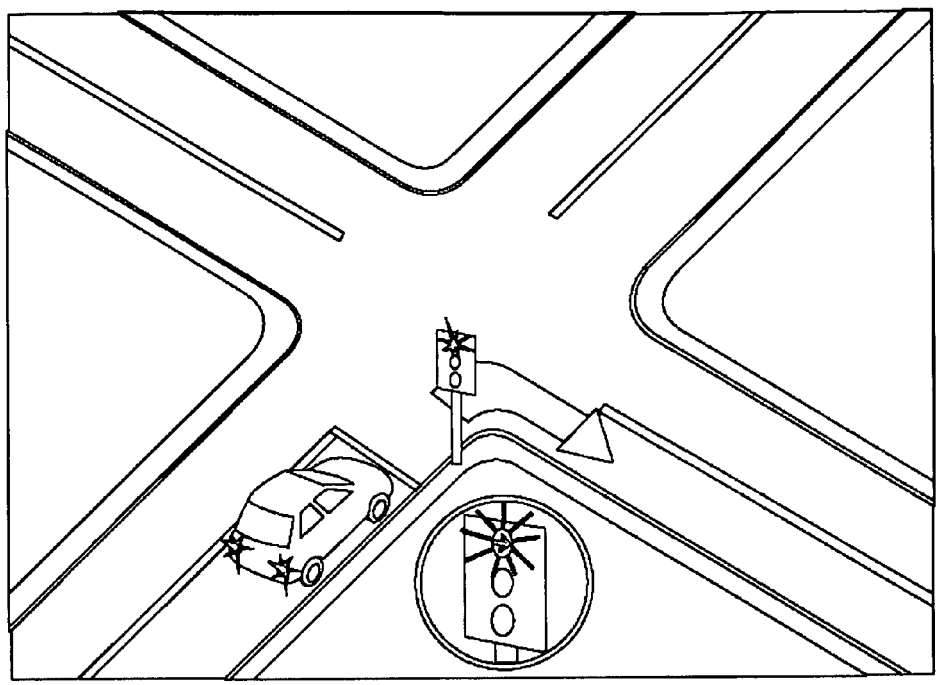
FIG. 35 shows a situation in which the vehicle approaches a red traffic light having a no turn light or sign.
Figure 36:
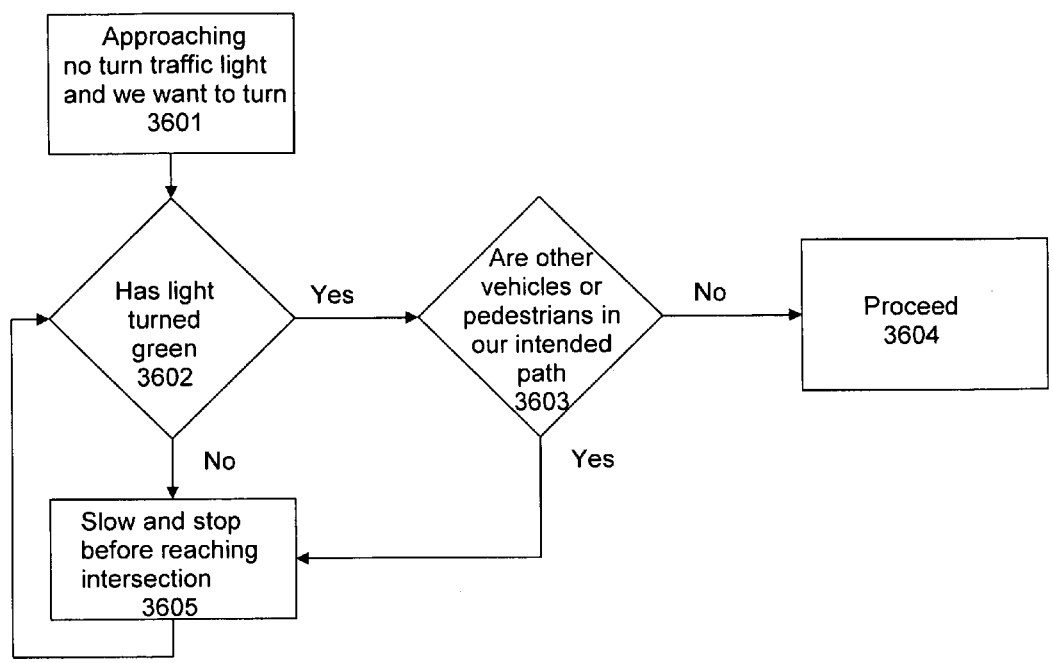
FIG. 36 shows an exemplary process performed by the robotic driving system in the situation shown in FIG. 35.

FIG. 35 illustrates a situation in which the vehicle approaches a red traffic light having a no turn light or sign. In this situation, the system 100 will recognize the no turn light or sign, and stop before the intersection. This behavior may be accomplished, for example, by the process shown in FIG. 36. First, the system 100 determines, via the sensors 103, that the vehicle is approaching a red light with a no turn on red light or sign, and determines, via the road planner module 201 for example, that the vehicle will be turning right (step 3601). The sensors 103 then determine whether the light has turned green (step 3602). If the light has not turned green, the traffic rule enforcement module 205 commands the vehicle to slow down and stop before reaching the intersection (step 3605). The sensors 103 then continue to monitor the light (step 3602). When the light has turned green, the system 100 determines whether other vehicles or pedestrians are in the intended path of the vehicle (step 3603). If other vehicles or pedestrians are in the intended path of the vehicle, the traffic rule enforcement module 205 commands the vehicles to stop (step 3605). When the system 100 has determined that no other vehicles or pedestrians are in the intended path of the vehicle, the traffic rule enforcement module 205 commands the vehicle to proceed (step 3604).

Figure 37:
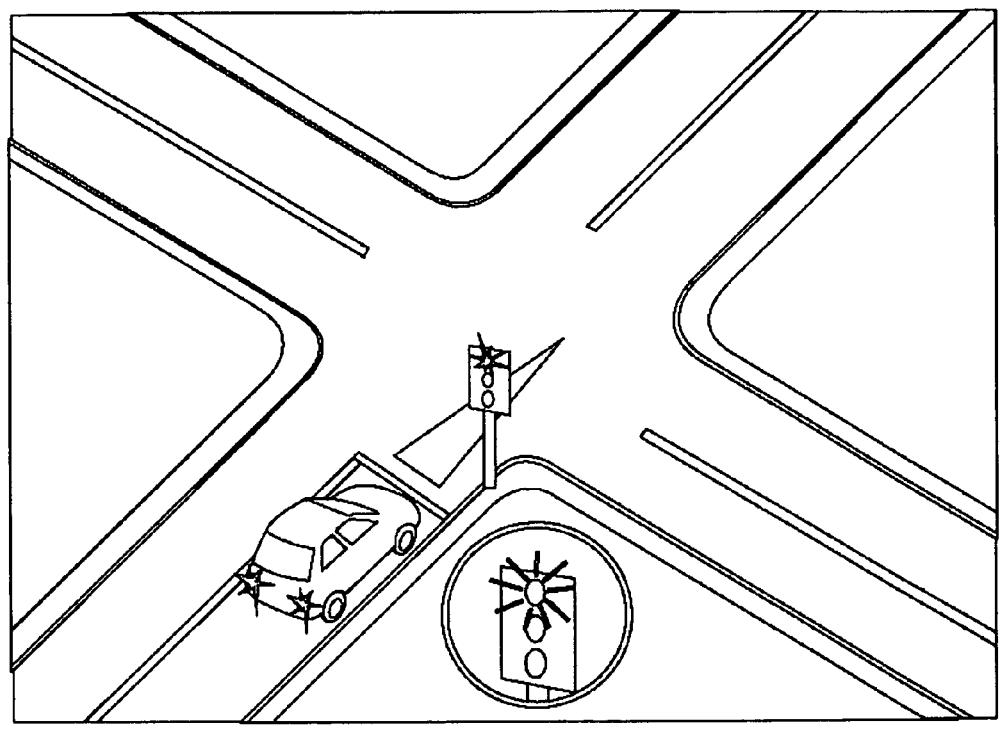
FIG. 37 shows a situation in which the vehicle approaches a red flashing light.
Figure 38:
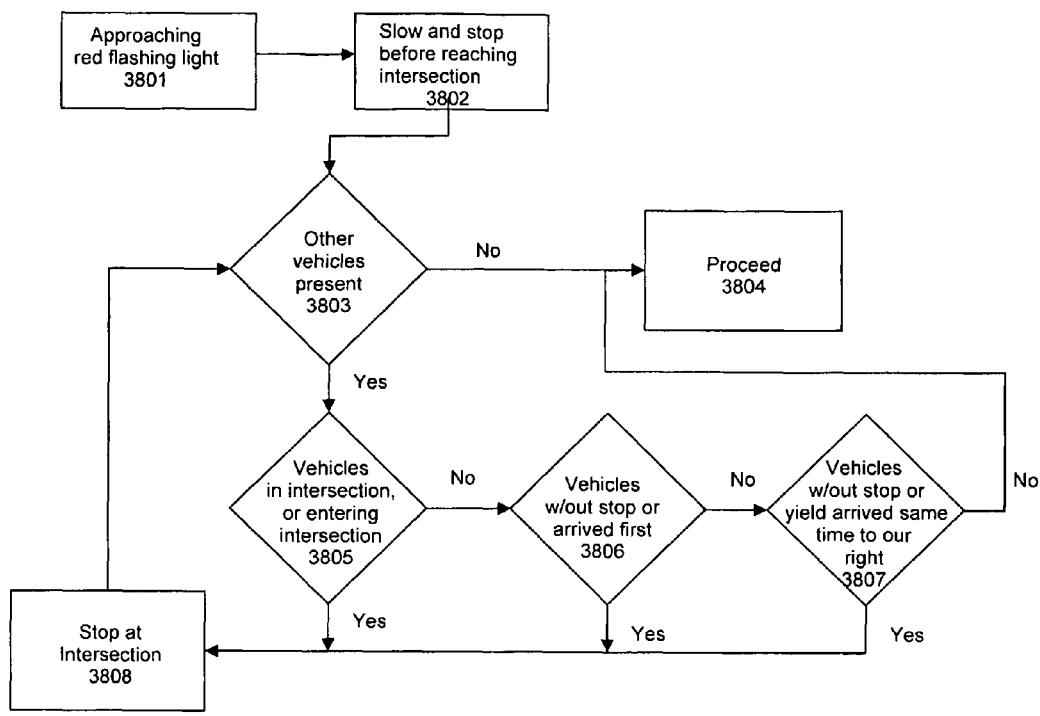
FIG. 38 shows an exemplary process performed by the robotic driving system in the situation shown in FIG. 37.

FIG. 37 illustrates a situation in which the vehicle approaches a flashing red light. In this situation, the system 100 will recognize the flashing red light and command the vehicle to stop and then proceed through the intersection safely. This behavior may be accomplished, for example, by the process shown in FIG. 38. First, the system 100 detects, via the sensors 103, that the vehicle is approaching a flashing red light (step 3801). The traffic rule enforcement module 205 then commands the vehicle to slow and stop before reaching the intersection (step 3802), and the moving obstacle detection and prediction module 202 determines whether another vehicle is present (step 3803). If no other vehicle is present, the traffic rule enforcement module 205 commands the vehicle to proceed (step 3804). However, if another vehicle is present, the system 100 determines whether the other vehicle is in the intersection or entering the intersection (step 3805), determines whether the other vehicle must stop or has arrived at the intersection first (step 3806), and determines whether the other vehicle must stop or yield, and whether the two vehicles arrived at the intersection first and the other vehicle is to the right of the vehicle (step 3806). If the other vehicle is in the intersection, entering the intersection, does not need to stop or yield, or arrived at the intersection first, or if the two vehicles arrived at the intersection simultaneously and the other vehicle is to the right of the vehicle, the traffic rule enforcement module 205 commands the vehicle to stop (step 3808). Otherwise, if the other vehicle is not in the intersection, is not entering the intersection, must stop or yield, did not arrive at the intersection first, and either is not to the right of the vehicle or did not arrive at the intersection at the same time as the vehicle, the traffic rule enforcement module 205 commands the vehicle to proceed (step 3804).

Figure 39:
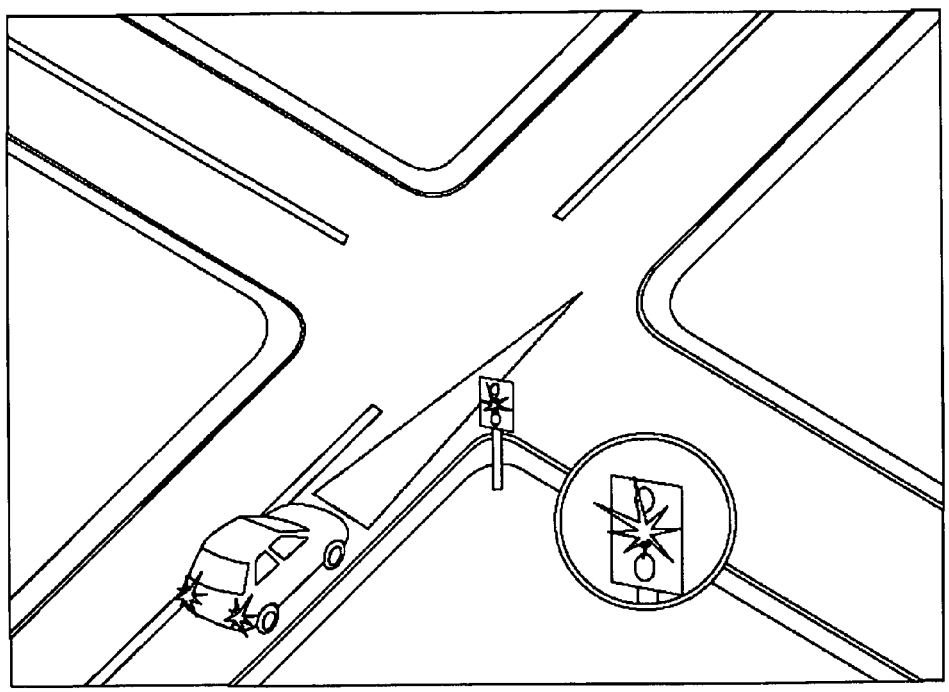
FIG. 39 shows a situation in which the vehicle approaches a yellow flashing light.
Figure 40:
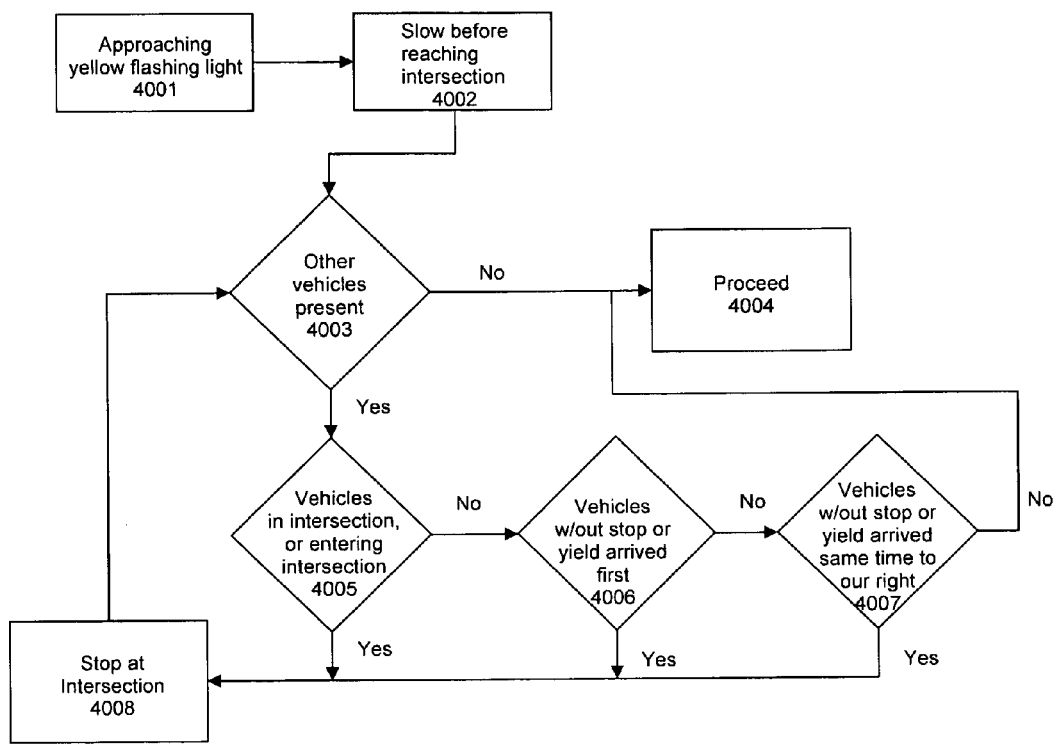
FIG. 40 shows an exemplary process performed by the robotic driving system in the situation shown in FIG. 39.
Figure 41:
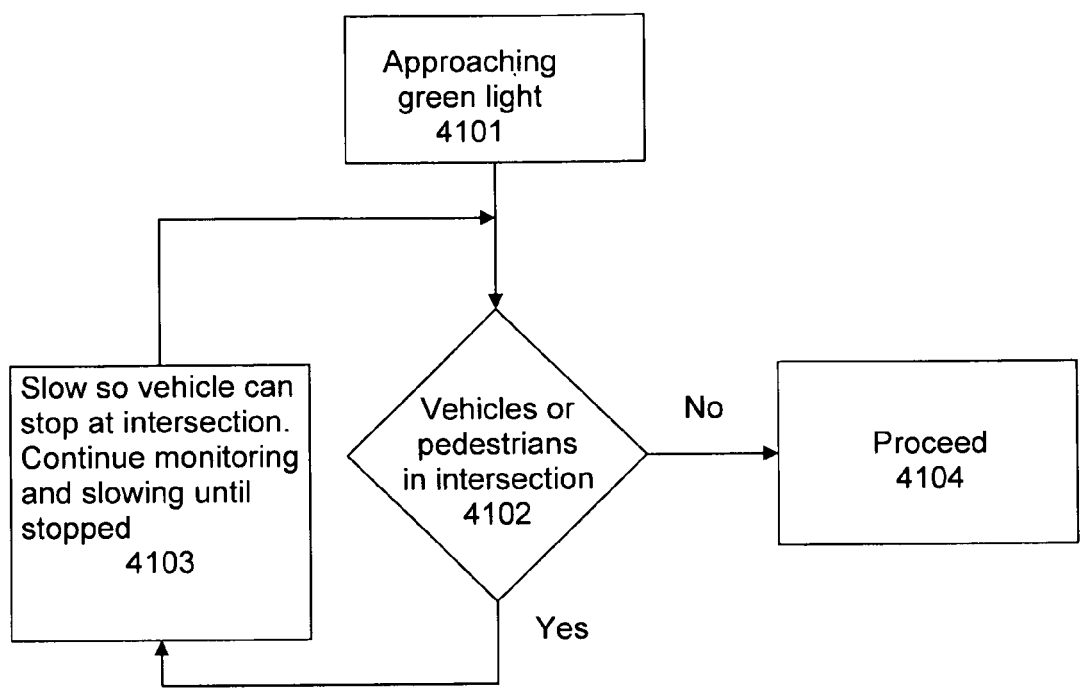
FIG. 41 shows an exemplary process of crossing an intersection with a green traffic light.

FIG. 39 illustrates a situation in which the vehicle approaches a flashing yellow light. In this situation, the system 100 recognizes the flashing yellow light and controls the vehicle to slow down before entering an intersection. This behavior may be accomplished, for example, by the process shown in FIG. 40. First, the sensors 103 detect that the vehicle is approaching a flashing yellow light (step 4001). The traffic rule enforcement module 205 then controls the vehicle to slow down before reaching the intersection (step 4002). The moving obstacle detection and prediction module 202 determines if other vehicles are present (step 4003). If no other vehicle is present, the traffic rule enforcement module 205 commands the vehicle to proceed (step 4004). However, if another vehicle is present, the system 100 determines whether the other vehicle is in the intersection or entering the intersection (step 4005), determines whether the other vehicle must stop or arrived at the intersection first (step 4006), and determines whether the other vehicle must stop or yield, and whether the two vehicles arrived at the intersection first and the other vehicle is to the right of the vehicle (step 4007). If the other vehicle is in the intersection, entering the intersection, does not need to stop or yield, or arrived at the intersection first, or if the two vehicles arrived at the intersection simultaneously and the other vehicle is to the right of the vehicle, the traffic rule enforcement module 205 commands the vehicle to stop (step 4008). Otherwise, if the other vehicle is not in the intersection, is not entering the intersection, must stop or yield, did not arrive at the intersection first, and either is not to the right of the vehicle or did not arrive at the intersection at the same time as the vehicle, the traffic rule enforcement module 205 commands the vehicle to proceed (step 4004).

The system 100 will also recognize green traffic lights and allow the vehicle to continue in its path only if an intersection is clear of pedestrians or other vehicles. This behavior may be accomplished, for example, by the process shown in FIG. 41. First, the sensors 103 detect that the vehicle is approaching a green light (step 4101). The system 100 then determines whether a pedestrian or other vehicle is in an intersection (step 4102). If no pedestrian or other vehicle is in the intersection, the traffic rule enforcement module 205 commands the vehicle to proceed (step 4104). Otherwise, the traffic rule enforcement module 205 commands the vehicle to slow down so that it can stop at the intersection, and the system 100 continues to monitor the intersection and slow the vehicle down until it comes to a stop (step 4103).

Figure 42A:
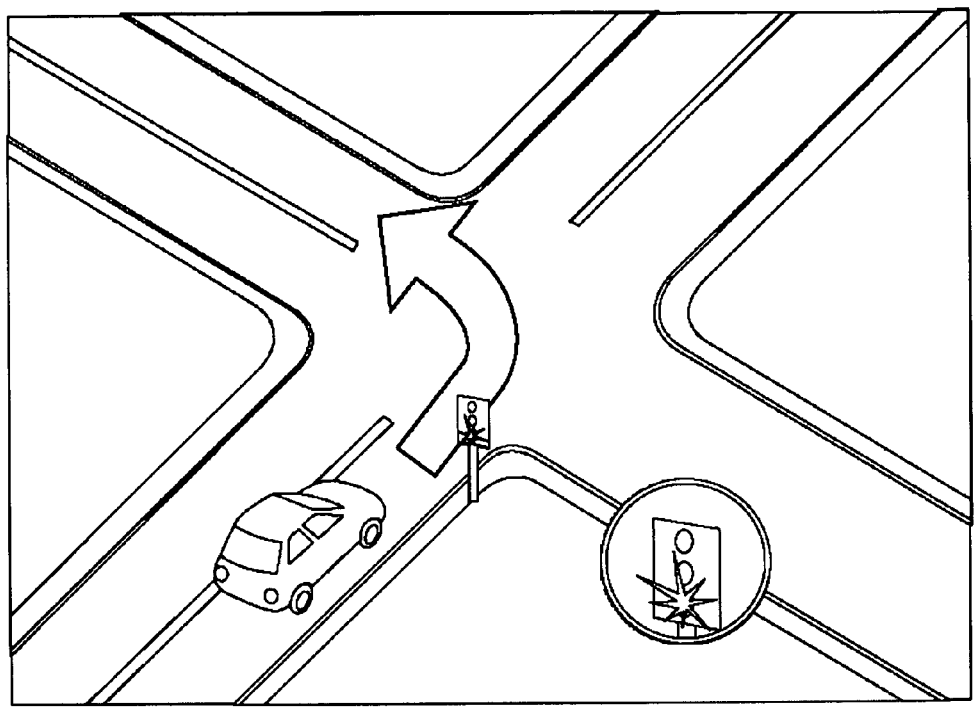
FIG. 42(A) shows a situation in which the vehicle approaches a traffic light having a green arrow light.
Figure 42B:
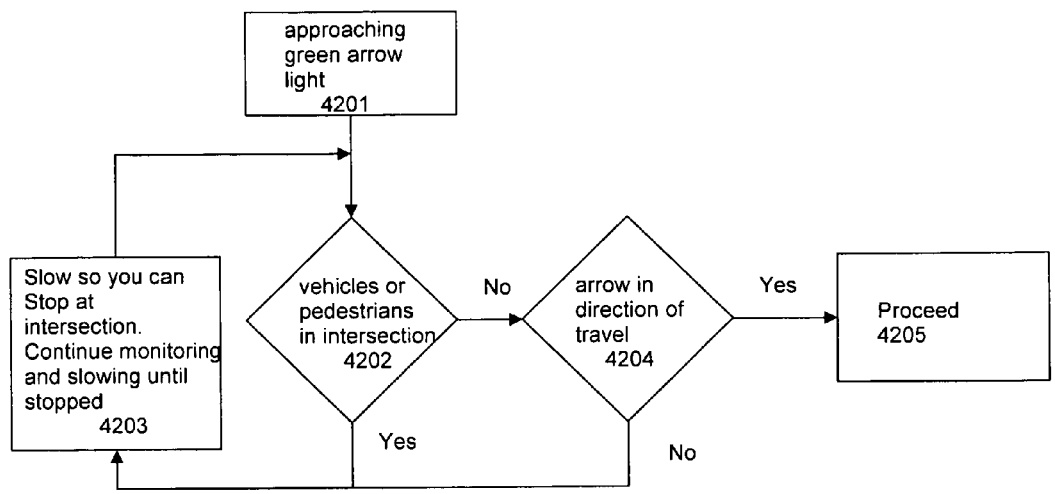
FIG. 42(B) shows an exemplary process performed by the robotic driving system in the situation shown in FIG. 42(A)

FIG. 42(A) illustrates a situation in which the vehicle approaches a traffic light having a green arrow light. In this situation, the system 100 will recognize the green arrow light and will allow the vehicle to proceed only if the arrow is in the direction the vehicle will be traveling and the intersection is clear of pedestrians and other vehicles. This behavior may be accomplished, for example, by the process shown in FIG. 42(B). First, the sensors 103 detect that the vehicle is approaching a green arrow light (step 4201). Then, the system 100 determines whether other vehicles or pedestrians are in the intersection (step 4202), and determines if the arrow is in the direction of the vehicle's travel (step 4204). If another vehicle or a pedestrian is in the intersection, or if the arrow is not in the direction of the vehicle's travel, the traffic rule enforcement module 205 commands the vehicle to slow down so that it can stop at the intersection (step 4203). When the system 100 determines that no other vehicle or pedestrian is in the intersection, and determines that the arrow is in the direction of the vehicle's travel, the traffic rule enforcement module 205 commands the vehicle to proceed (step 4205).

Figure 43:
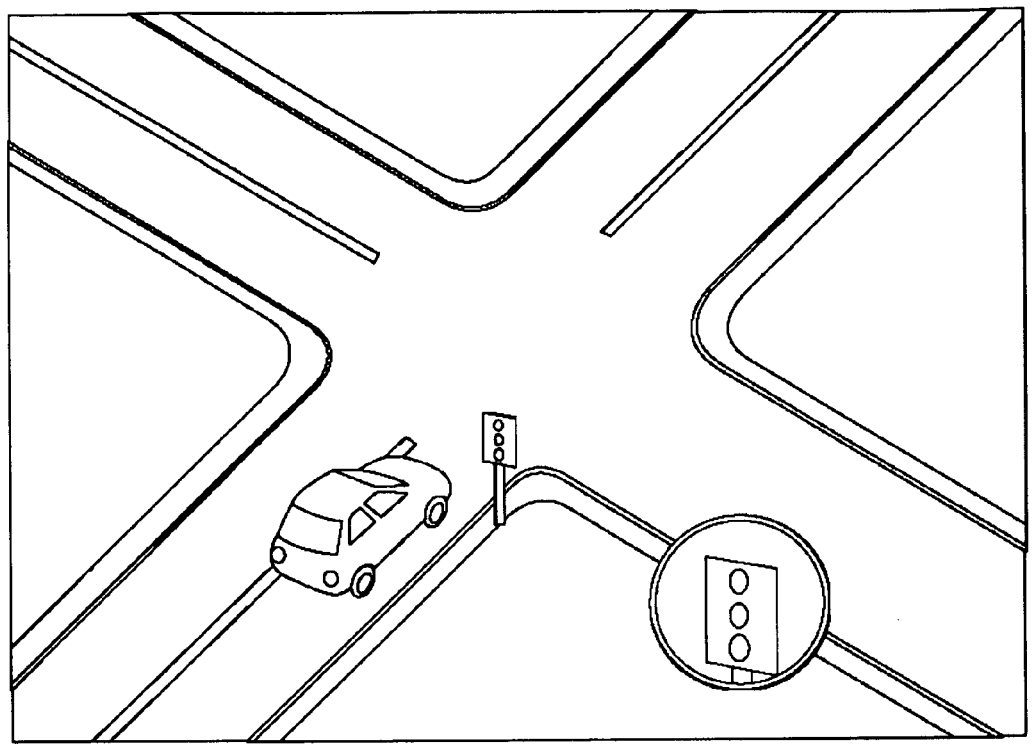
FIG. 43 shows a situation in which the vehicle approaches a broken street light.

FIG. 43 illustrates a situation in which the vehicle approaches a broken street light. In this situation, the system 100 will recognize that the street light is broken, and will control the vehicle as if the intersection where a four-way stop. For example, the system 100 can perform the process shown in FIG. 20, as described above.

Figure 44:
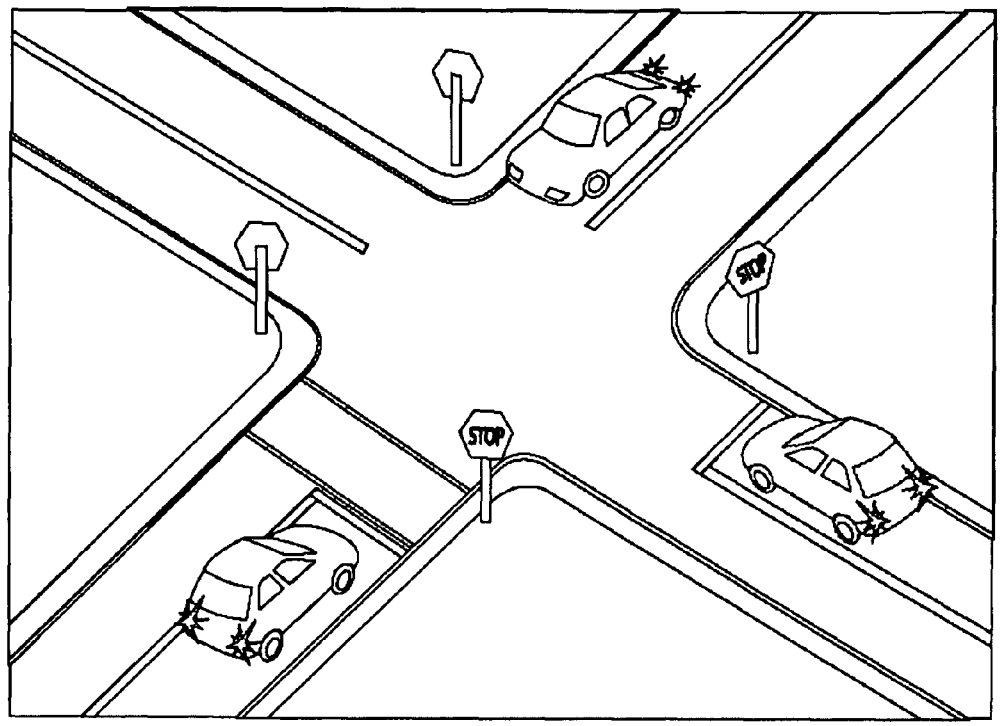
FIG. 44 shows a situation in which the vehicle approaches a stop sign.
Figure 45:
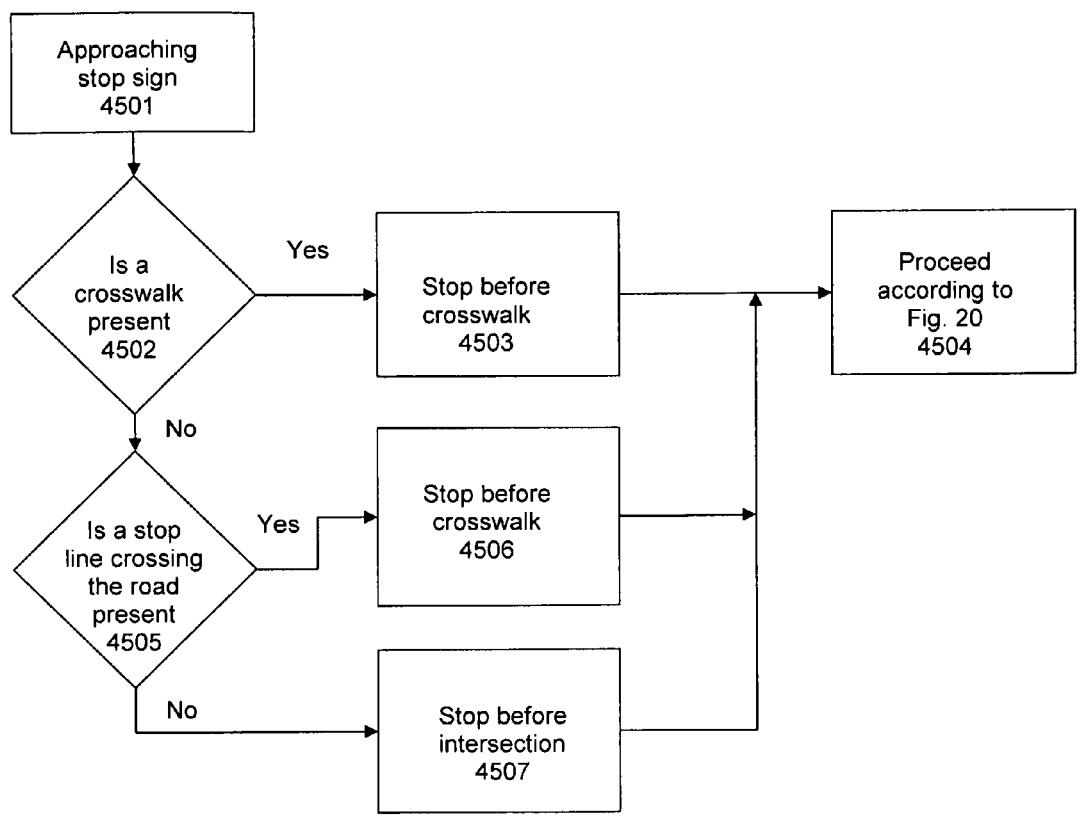
FIG. 45 shows an exemplary process performed by the robotic driving system in the situation shown in FIG. 44.

FIG. 44 illustrates a situation in which the vehicle approaches a stop sign. In this situation, the system 100 will recognize the stop sign, and control the vehicle to come to a complete stop. If the sign is at an intersection and a pedestrian crosswalk crosses the road before the intersection, the system 100 will control the vehicle to stop before it reaches the pedestrian crosswalk. If no crosswalk is present, the system 100 will control the vehicle to stop before it crosses a line crossing the road. If no line is present, the system 100 will control the vehicle to stop right before the intersection. This behavior may be accomplished, for example, by the process shown in FIG. 45. First, the system 100 determines that the vehicle is approaching a stop sign (step 4501). The system 100 determines whether a crosswalk is present (step 4502), and if a crosswalk is present, the traffic rule enforcement module 205 commands the vehicle to stop before it reaches the crosswalk (step 4503). The system 100 also determines whether a stop line crossing the road is present (step 4505). If a stop line is present, the traffic rule enforcement module 205 commands the vehicle to stop before it reaches the stop line (step 4506). However, if no stop line is present, the traffic rule enforcement module 205 commands the vehicle to stop before it reaches the intersection (step 4507). After the vehicle has stopped, the system 100 controls the vehicle according to the process shown in FIG. 20 (step 4504).

Figure 46:
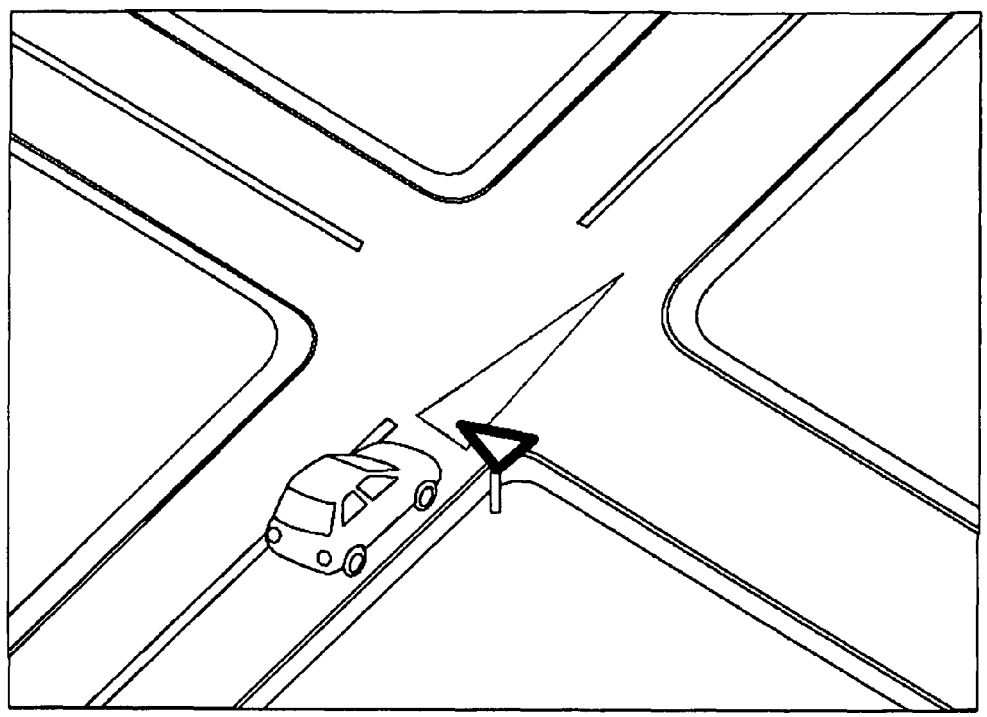
FIG. 46 shows a situation in which the vehicle approaches a yield sign.

FIG. 46 illustrates a situation in which the vehicle approaches a yield sign. In this situation, the system 100 will recognize the yield sign, and control the vehicle in the same manner as it controls the vehicle when it approaches a flashing yellow light. That is, the system 100 can control the vehicle by the process shown in FIG. 40, as described above.

Figure 47:
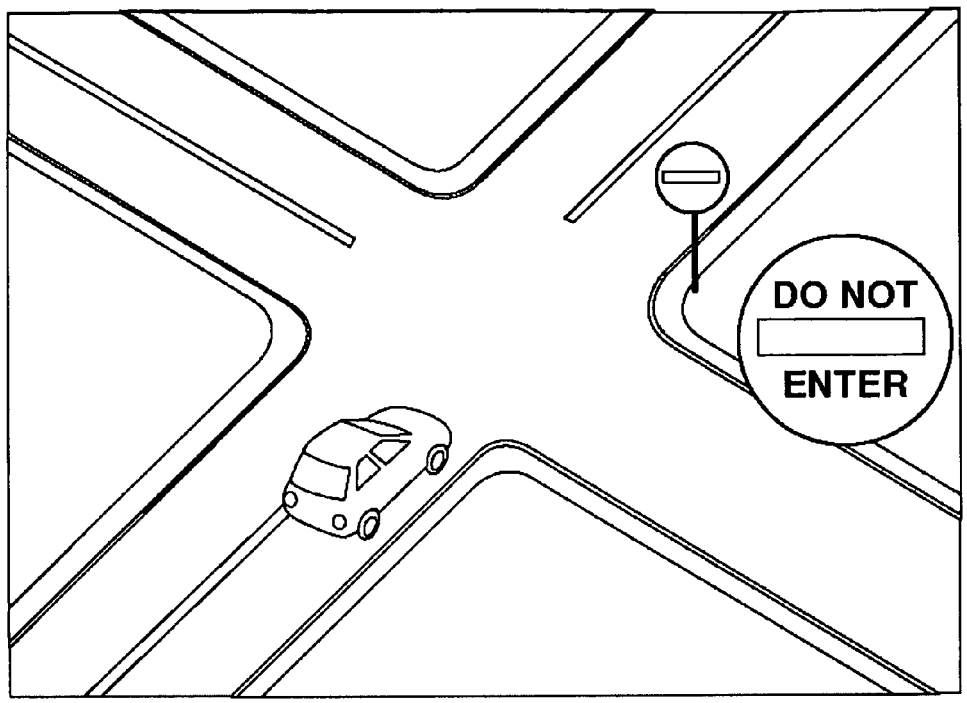
FIG. 47 shows a situation in which the vehicle approaches a "Do not enter" sign.
Figure 48:
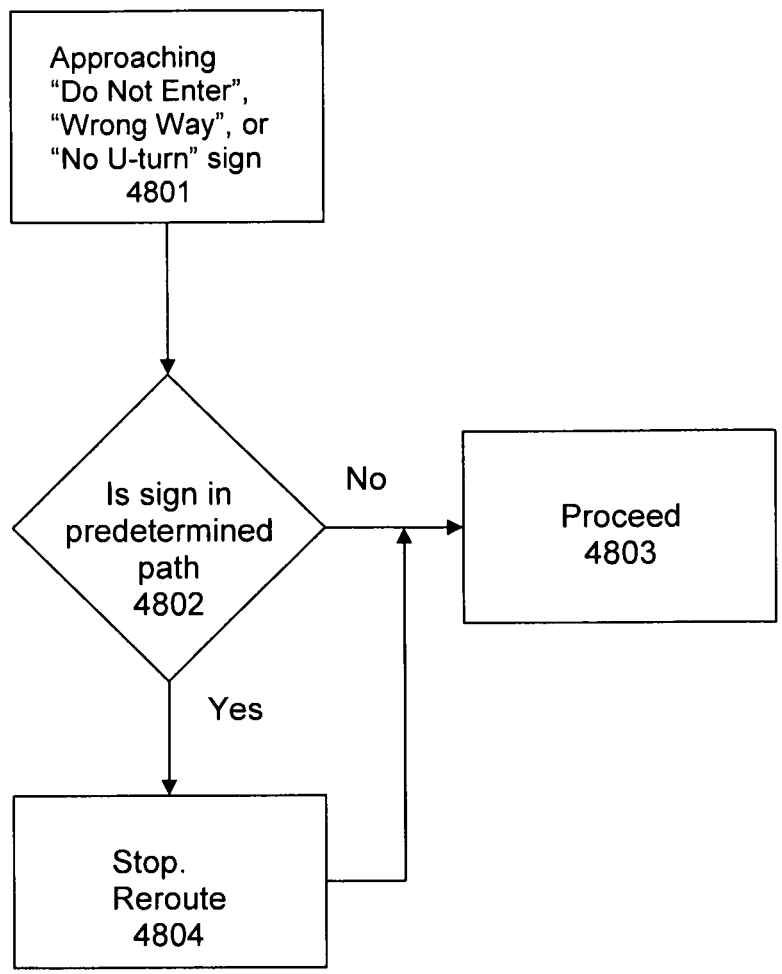
FIG. 48 shows an exemplary process performed by the robotic driving system in the situation shown in FIG. 47.

FIG. 47 illustrates a situation in which the vehicle approaches a "Do Not Enter" sign. In this situation, the system 100 will recognize the sign. The system 100 will also recognize similar signs, such as, but not limited to, "Wrong Way" and "No U-Turn" signs. If the sign is in the path that the vehicle is planning to travel, the system 100 will stop and re-route the vehicle. This behavior may be accomplished, for example, by the process shown in FIG. 48. First, the system 100 determines that it is approaching a sign such as a "Do not enter", "Wrong Way" or "No U-Turn" sign (step 4801). The system 100 then determines whether the sign prohibits the vehicle's planned path (step 4802). If the sign does not prohibit the vehicle's planned path, the traffic rule enforcement module 205 allows the vehicle to proceed as planned (step 4803). However, if the sign prohibits the vehicle's planned path, the system 100 will re-route the vehicle, such as by using the road planner module 201 (step 4804).

Figure 49:
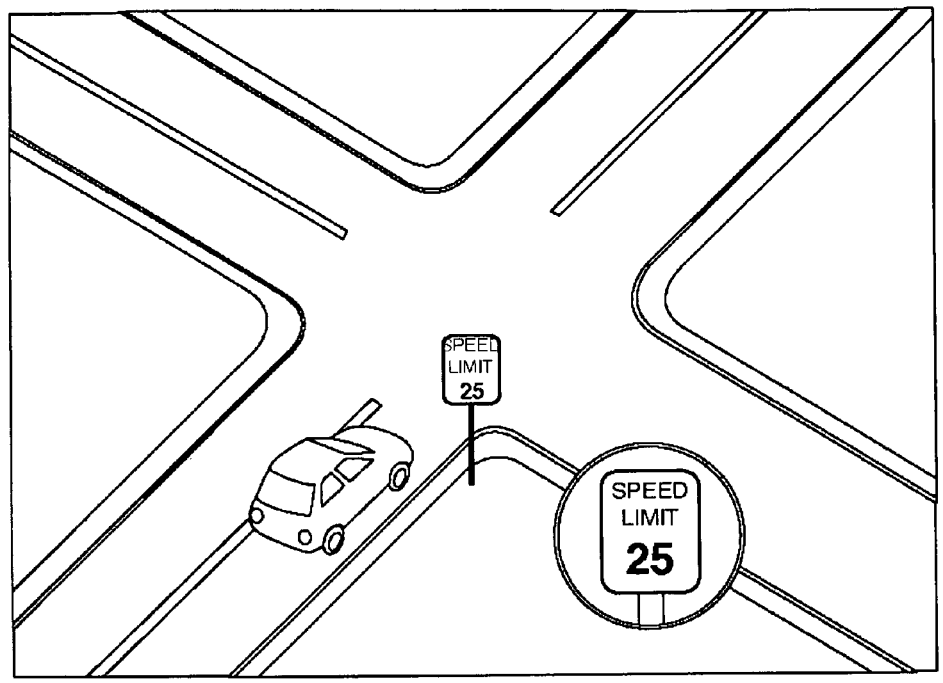
FIG. 49 shows a situation in which the vehicle is approaching a speed limit sign.

FIG. 49 shows a situation in which the vehicle is approaching a speed limit sign. In this situation, the system 100 will recognize the sign, and control the speed of the vehicle so that it does not exceed the posted speed.

Figure 50:
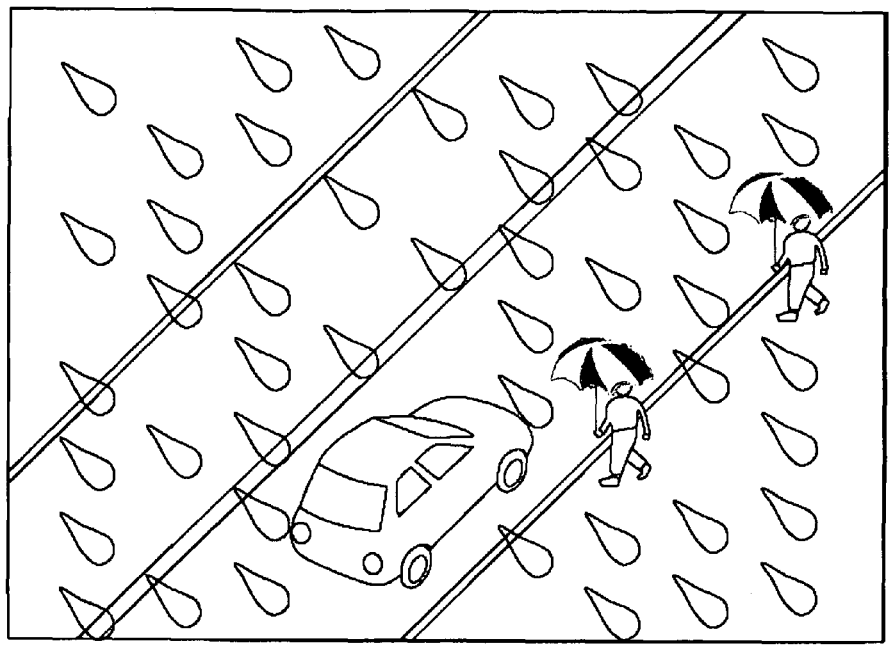
FIG. 50 shows a situation in which the vehicle is traveling in bad weather.
Figure 51:
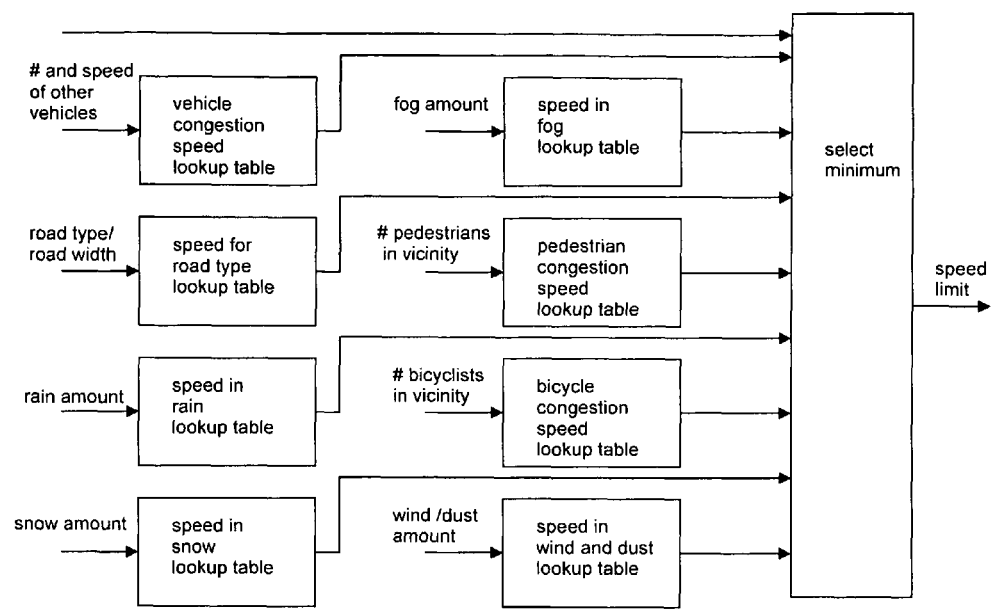
FIG. 51 shows an exemplary set of lookup tables used by the processing system of the robotic driving system.

FIG. 50 shows a situation in which the vehicle is traveling in bad weather, and in the vicinity of pedestrians. In this situation, the system 100 will control the speed of the vehicle based on several factors, including, for example, a posted speed limit, a number and speed of other vehicles, a road surface quality (e.g., smooth or coarse), the presence of rain or snow, a fog density, a lane or road width, the presence of pedestrians or bicyclists, or windy or dusty conditions. For example, the processing system 104 may include a memory which stores a plurality of lookup tables. An example is illustrated in FIG. 51. For example, the sensors 103 may determine a number and speed of other vehicles, and provide this data as an input to a vehicle congestion speed lookup table. Based on the input data, the vehicle congestion speed lookup table outputs a maximum safe speed based on traffic congestion conditions. Similarly, the sensors 103 may determine a fog density, and provide this data as an input to a fog lookup table. Based on the input data, the fog lookup table outputs a maximum safe speed based on fog conditions. The system 100 will select the minimum of the speeds output from the lookup tables, and control the vehicle not to exceed this speed.

Figure 52:
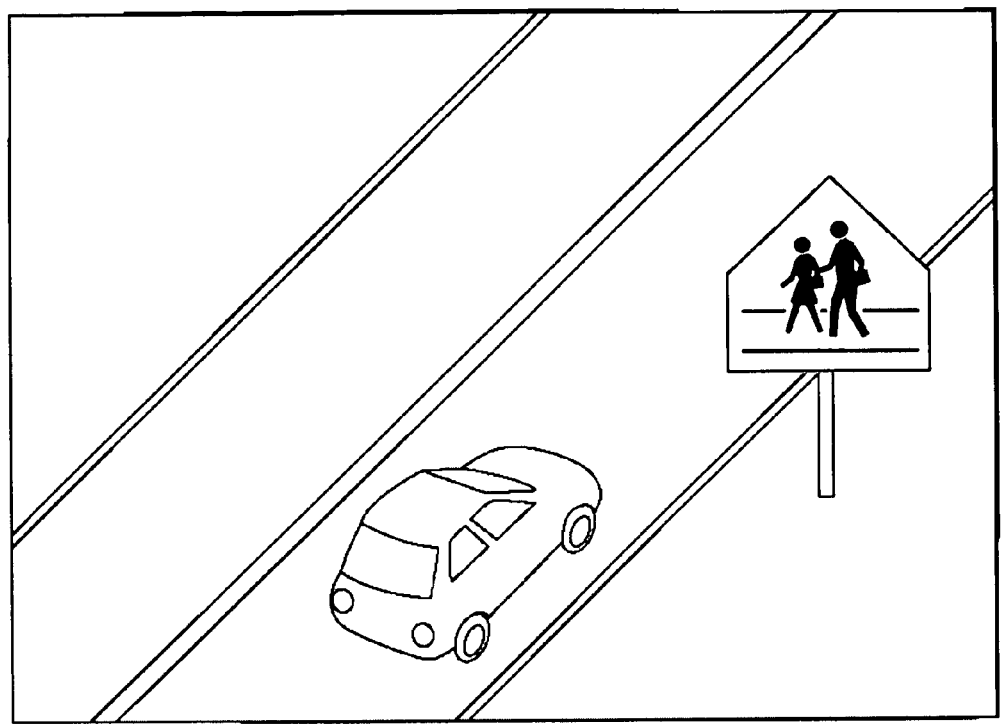
FIG. 52 shows a situation in which the vehicle is approaching a school crossing sign.
Figure 53:
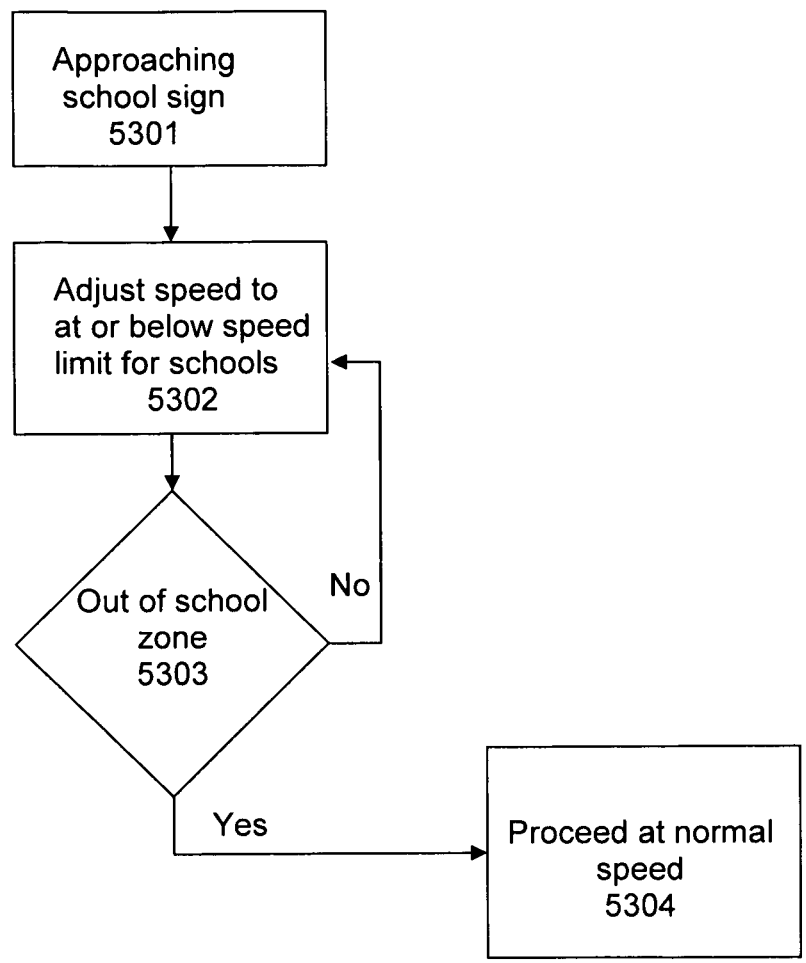
FIG. 53 shows an exemplary process performed by the robotic driving system in the situation shown in FIG. 52.

FIG. 52 shows a situation in which the vehicle is approaching a school crossing sign. In this situation, the system 100 will recognize the school crossing sign, and control the vehicle so that its speed does not exceed the legal speed limit for school zones. This behavior may be accomplished, for example, by the process shown in FIG. 53. First, the system 100 recognizes that the vehicle is approaching a school crossing sign (step 5301). The traffic rule enforcement module 205 then commands the vehicle to adjust its speed to be at or below the legal speed limit for school zones (step 5302). The system 100 monitors whether the vehicle has left the school zone (step 5303), and the traffic rule enforcement module 205 instructs the vehicle to proceed at its normal speed after the system 100 has determined that the vehicle has left the school zone (step 5304).

Figure 54:
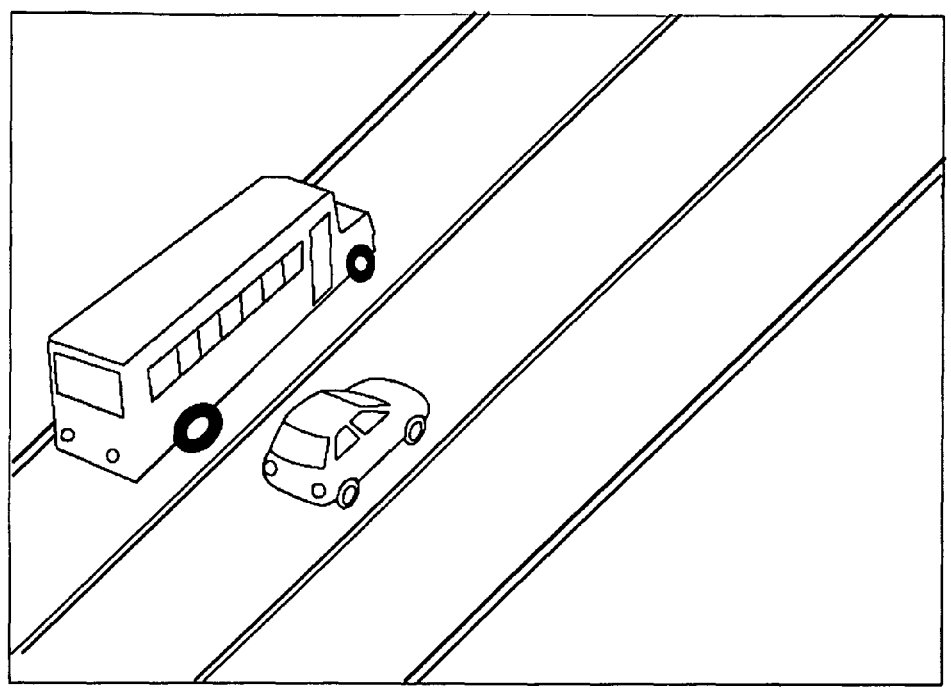
FIG. 54 shows a situation in which the vehicle is approaching a school bus.
Figure 55:
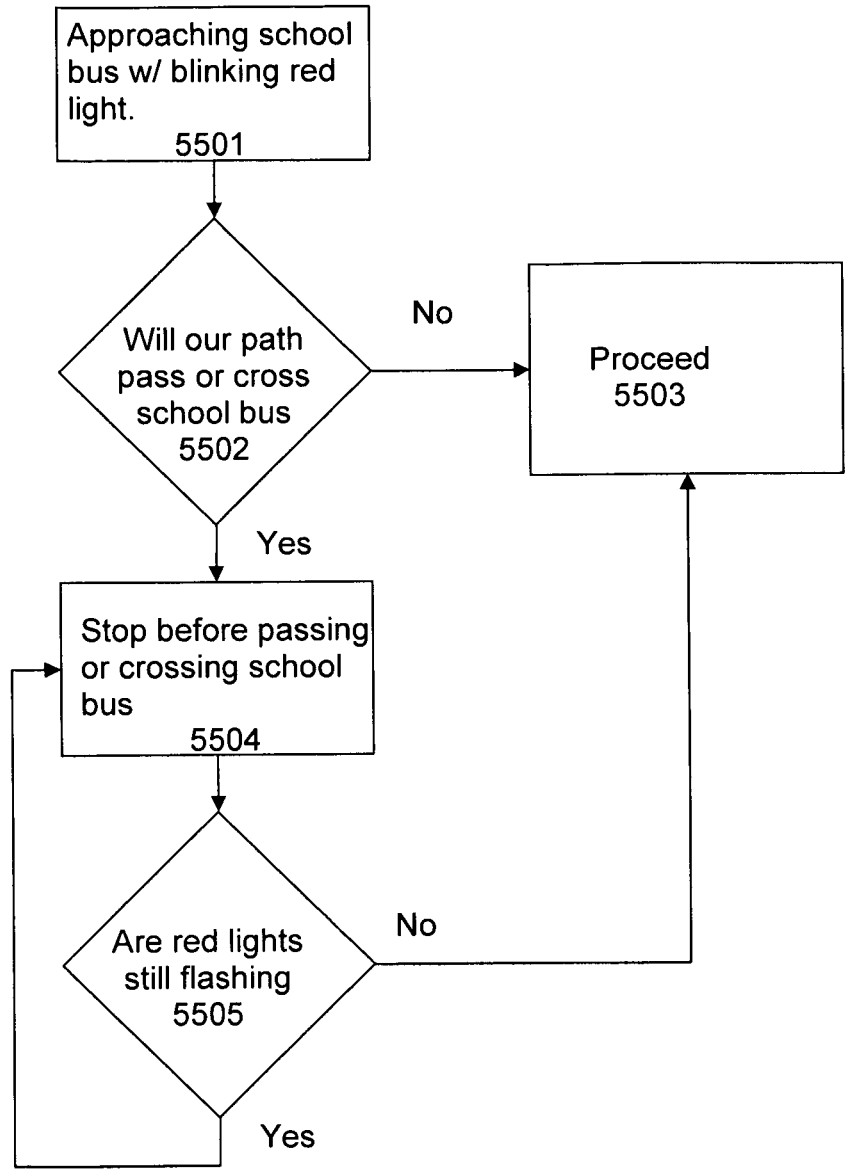
FIG. 55 shows an exemplary process performed by the robotic driving system in the situation shown in FIG. 54.

FIG. 54 shows a situation in which the vehicle is approaching a school bus. In this situation, the system 100 will recognize the school bus. If the school bus has a blinking red light, the system 100 will prevent the vehicle from passing or crossing the school bus. The system 100 will control the vehicle to stop until the red flashing light is turned off. This behavior may be accomplished, for example, by the process shown in FIG. 55. First, the moving obstacle detection and prediction module 202 detects that the vehicle is approaching a school bus with a blinking red light (step 5501). The system 100 then determines if the planned path of the vehicle will pass or cross the school bus (step 5502). If the planned path of the vehicle will not pass or cross the school bus, then the traffic rule enforcement module 205 commands the vehicle to proceed (step 5503). However, if the planned path of the vehicle will pass or cross the school bus, then the traffic rule enforcement module 205 commands the vehicle to stop before it reaches the school bus (step 5504). The sensors 103 monitor whether the red lights are flashing (step 5505), and when the red lights stop flashing, the traffic rule enforcement module 205 commands the vehicle to proceed (step 5503).

The system 100 is also capable of controlling the vehicle to follow traffic rules relating to dangerous intersections and alleys. The system 100 generally controls the vehicle to follow traffic rules relating to safe travel, such as by slowing down upon approaching a dangerous intersection or proceeding slowly through an alley. Information relating to dangerous intersections, alleys and the like may be determined through the sensors 103, stored data, and/or location information. Examples of situations the system 100 may encounter relating to dangerous intersections and alleys, and processes the system 100 may perform in these situations are described below with reference to FIGS. 56-60.

Figure 56:
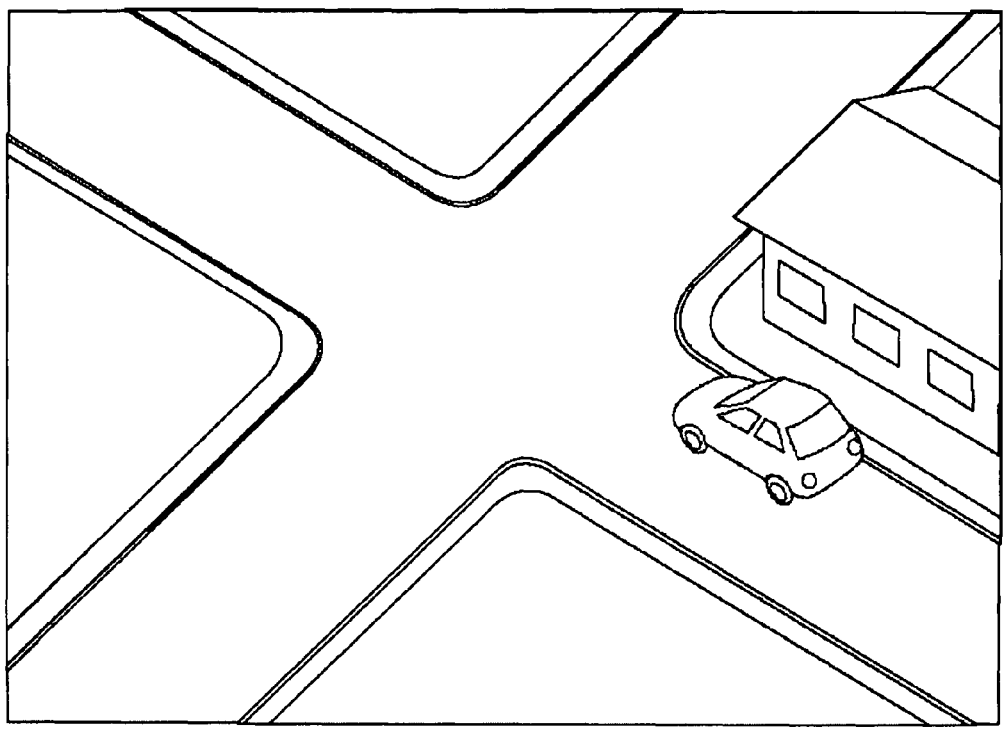
FIG. 56 shows a situation in which the vehicle is approaching a blind intersection.
Figure 57:
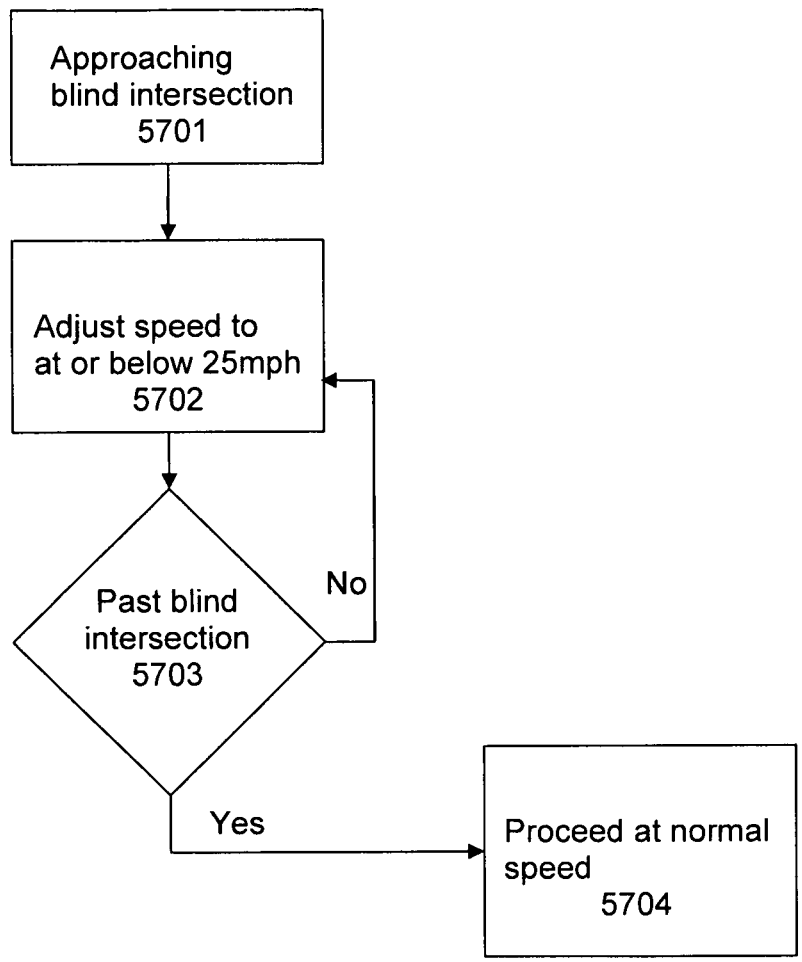
FIG. 57 shows an exemplary process performed by the robotic driving system in the situation shown in FIG. 56.

FIG. 56 shows a situation in which the vehicle is approaching a blind intersection (i.e., an intersection where the surroundings obstruct the view of crossing vehicles). In this situation, the system 100 will recognize that the intersection is a blind intersection, and control the vehicle to reduce its speed to a safe speed (such as, for example, 25 mph). This behavior may be accomplished, for example, by the process shown in FIG. 57. First, the system 100 recognizes that the vehicle is approaching a blind intersection (step 5701). Then, the traffic rule enforcement module 205 commands the vehicle to adjust its speed to a safe speed (such as, at or below 25 mph) (step 5702). The system 100 monitors whether the vehicle has passed the blind intersection (step 5703), and when the vehicle has passed the blind intersection, the traffic rule enforcement module 205 commands the vehicle to return to a normal speed (step 5704).

Figure 58:
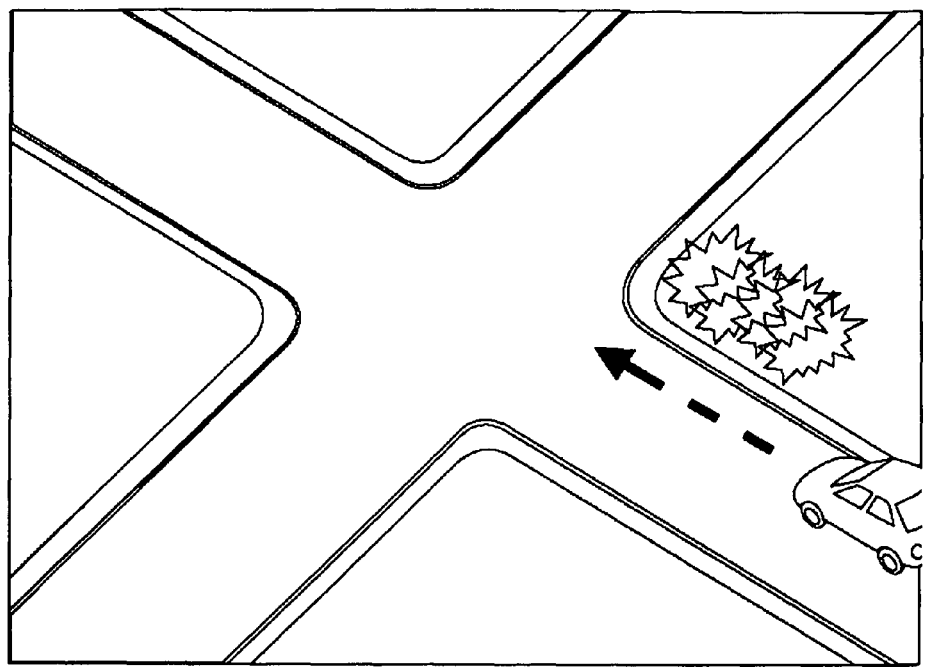
FIG. 58 shows a situation in which the view of a crossing road is occluded.
Figure 59:
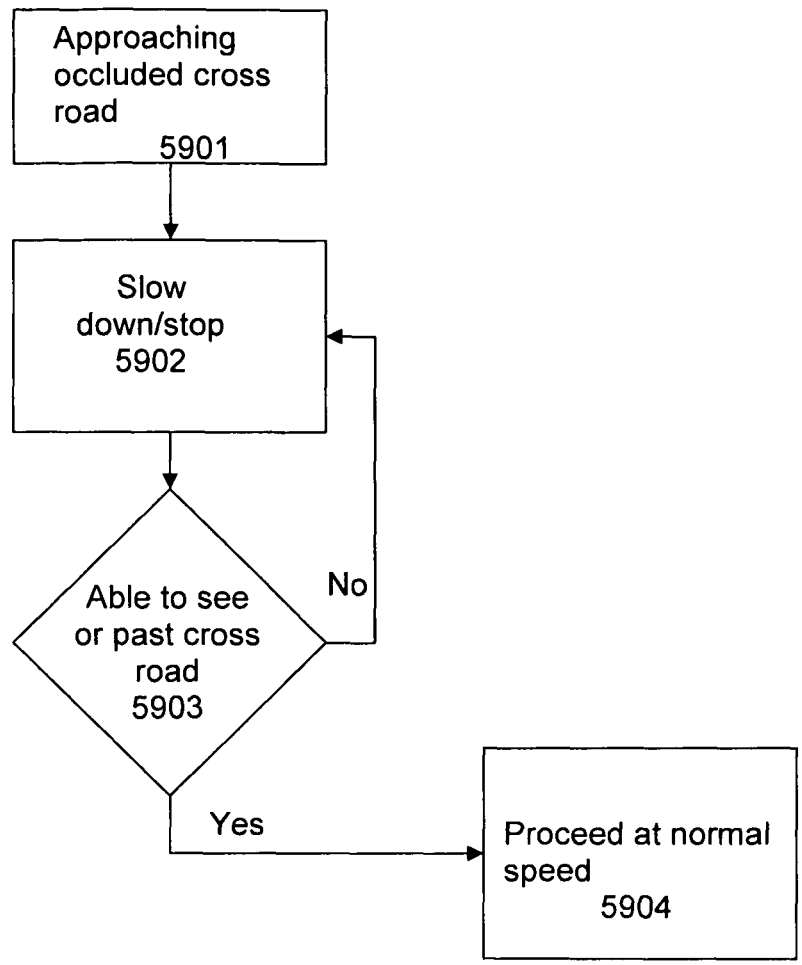
FIG. 59 shows an exemplary process performed by the robotic driving system in the situation shown in FIG. 58.

FIG. 58 shows a situation in which the view of a crossing road is occluded. In this situation, the system 100 will recognize that the view of the crossing road is occluded, and will control the vehicle to inch forward through the intersection. This action may be accomplished, for example, by the process shown in FIG. 59. First, the system 100 recognizes that the vehicle is approaching an occluded cross road (step 5901). Then, the traffic rule enforcement module 205 commands the vehicle to slow down to a speed at which the vehicle is only inching forward (step 5902). The system 100 then determines whether the view of the sensors 103 is occluded (i.e., whether the system 100 is able to 'see' the cross road) (step 5903). If the view of the sensors 103 is occluded, the vehicle continues to inch forward slowly (step 5902). However, once the view of the sensors 103 is no longer occluded, or if the vehicle has passed the cross road, the traffic rule enforcement module 205 commands the vehicle to return to a normal speed (step 5904).

Figure 60:
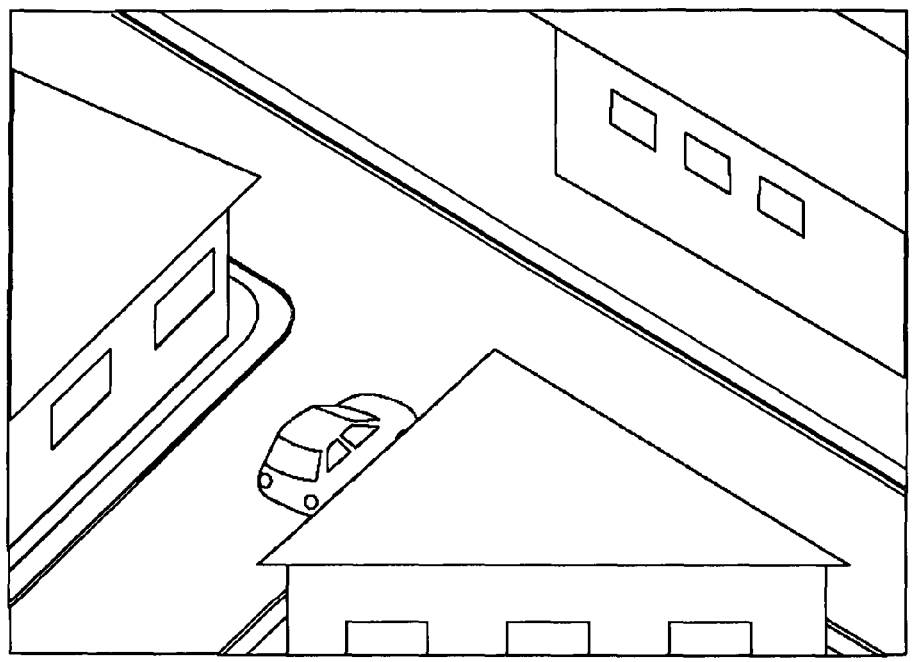
FIG. 60 shows a situation in which the vehicle is in an alley.

FIG. 60 shows a situation in which the vehicle is in an alley. In this situation, the system 100 recognizes that the vehicle is in an alley, and controls the vehicle so that its speed does not exceed a legal speed limit for alleys.

The system 100 is also capable of controlling the vehicle to follow traffic rules relating to railroads. Information relating to railroad crossings and signals may be provided by the sensors 103, stored data and/or location information. Additional information, such as the approach of a train and its speed, the detection of a train whistle or crossing signal bell, or the presence of a flagman may be provided by the sensors 103. Examples of situations the system 100 may encounter relating to railroads, and processes the system 100 may perform in these situations are described below with reference to FIGS. 61-66.

Figure 61:
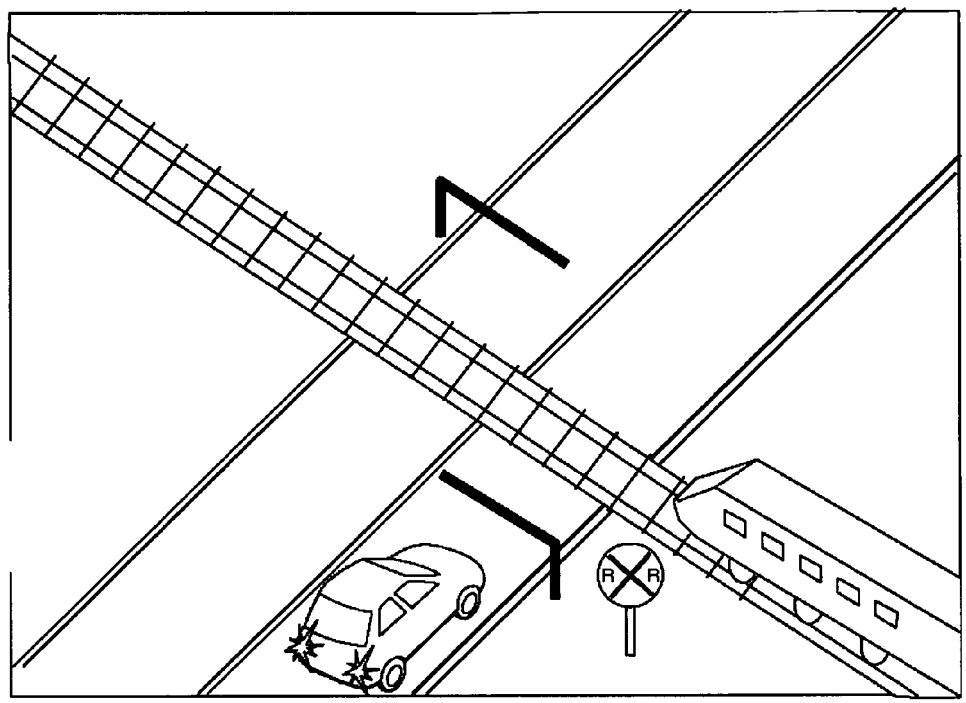
FIG. 61 shows a situation in which the vehicle is approaching a railroad crossing.
Figure 62:
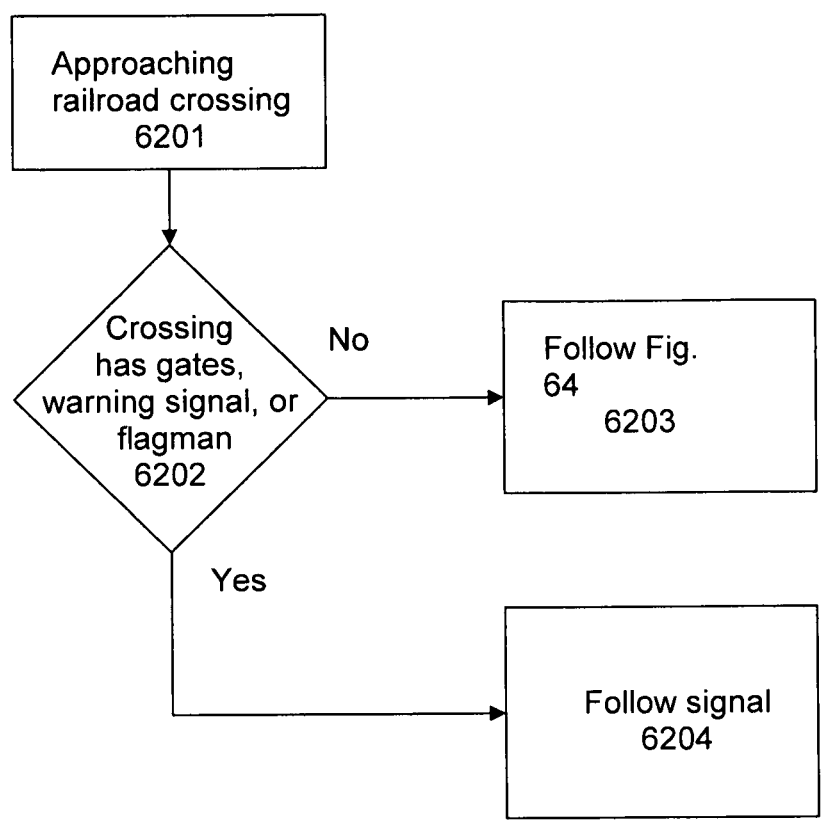
FIG. 62 shows an exemplary process performed by the robotic driving system in the situation shown in FIG. 61.

FIG. 61 shows a situation in which the vehicle is approaching a railroad crossing. In this situation, the system 100 will recognize the railroad crossing. If the crossing is controlled by a gate, a warning signal, or a flagman, the system 100 will follow their signals. The desired behavior may be accomplished, for example, by the process shown in FIG. 62. First, the system 100 recognizes that the vehicle is approaching a railroad crossing (step 6201). The system 100 then determines whether a gate, warning signal, or flagman is present at the crossing (step 6202). If no gate, warning signal, or flagman is present at the crossing, the system 100 performs the process shown in FIG. 64, discussed below (step 6203). However, if a gate, warning signal, or flagman is present at the crossing, the system 100 will control the vehicle to follow its signal (step 6204).

Figure 63:
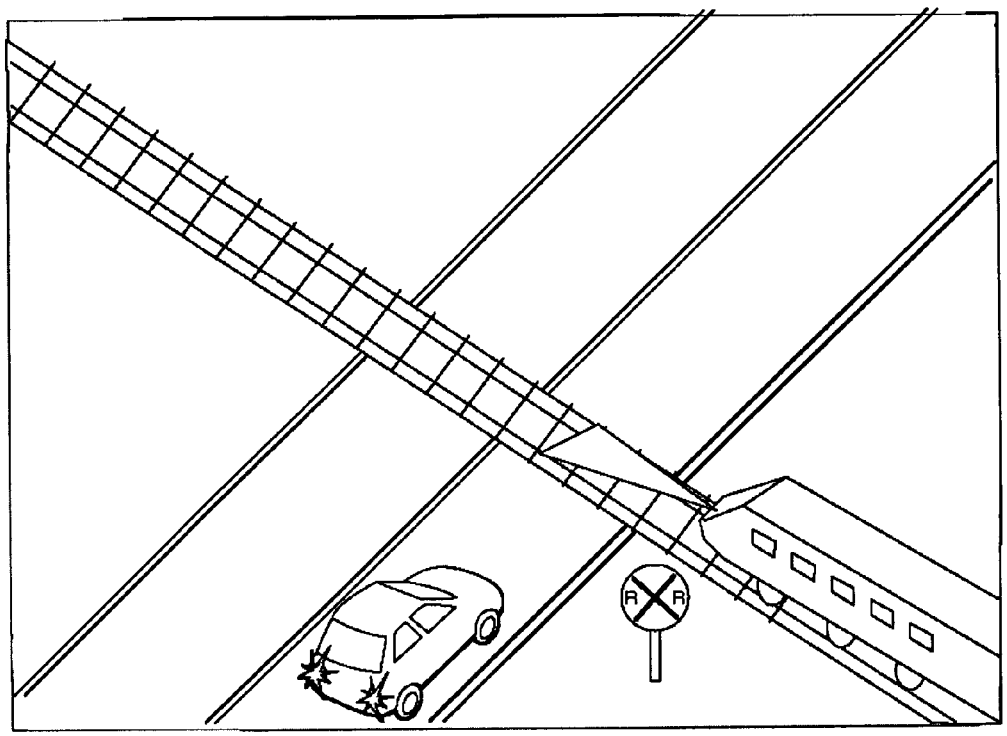
FIG. 63 shows a situation in which the vehicle is approaching a railroad crossing without signals.
Figure 64:
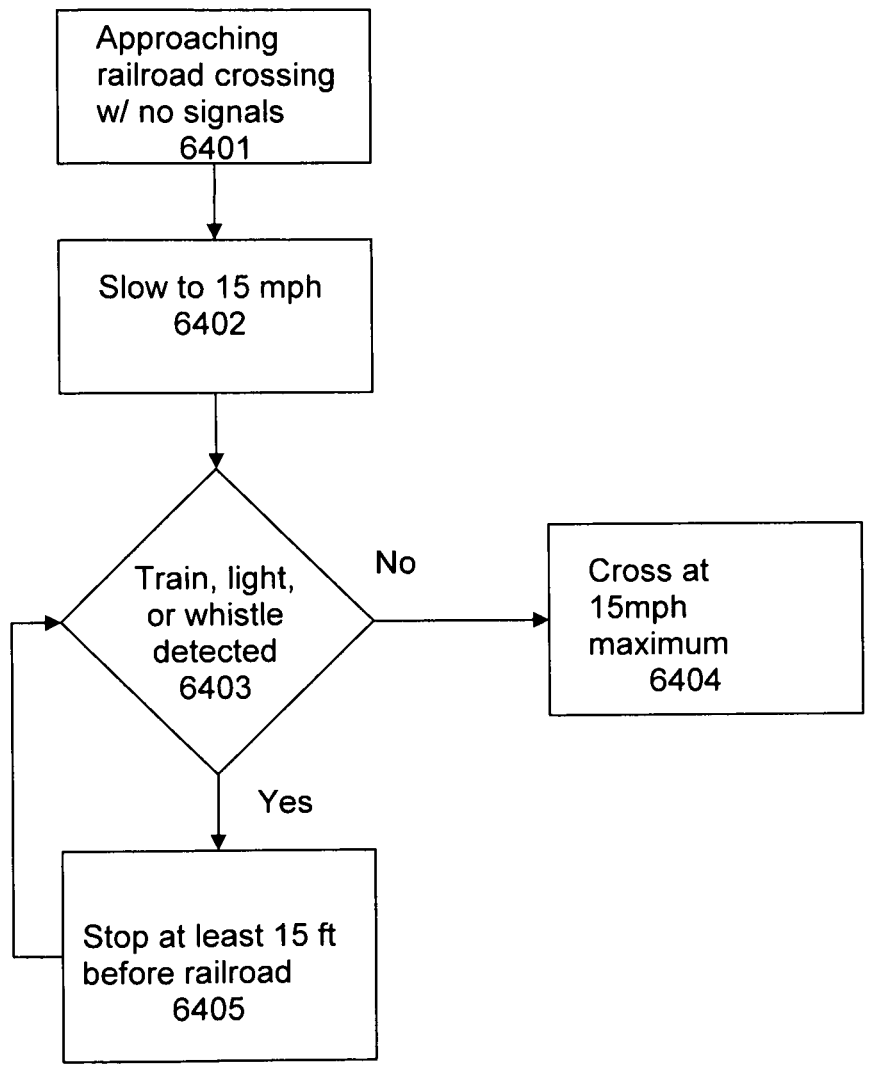
FIG. 64 shows an exemplary process performed by the robotic driving system in the situation shown in FIG. 63.

FIG. 63 shows a situation in which the vehicle is approaching a railroad crossing without signals (i.e., without a gate, warning signal, or flagman). In this situation, the system 100 recognizes that the crossing does not have signals and will recognize an approaching train. The system 100 will control the vehicle to slow down to a safe speed (e.g., 15 mph) and to cross the railroad if no train is approaching. This behavior may be accomplished, for example, by the process shown in FIG. 64. First, the system 100 recognizes that the vehicle is approaching a railroad crossing without signals (step 6401). Then, the traffic rule enforcement module 205 commands the vehicle to slow down to a safe speed (such as, for example, 15 mpg) (step 6402). The sensors 103 then determine whether a train is approaching, such as by detecting a train light or train whistle (step 6403). If a train is not approaching, the traffic rule enforcement module 205 commands the vehicle to cross the railroad crossing at a safe speed (such as 15 mph) (step 6404). If a train is determined to be approaching, the traffic rule enforcement module 205 commands the vehicle to stop at a safe distance from the railroad (such as, for example, 15 ft. in front of the railroad) (step 6405).

Figure 65:
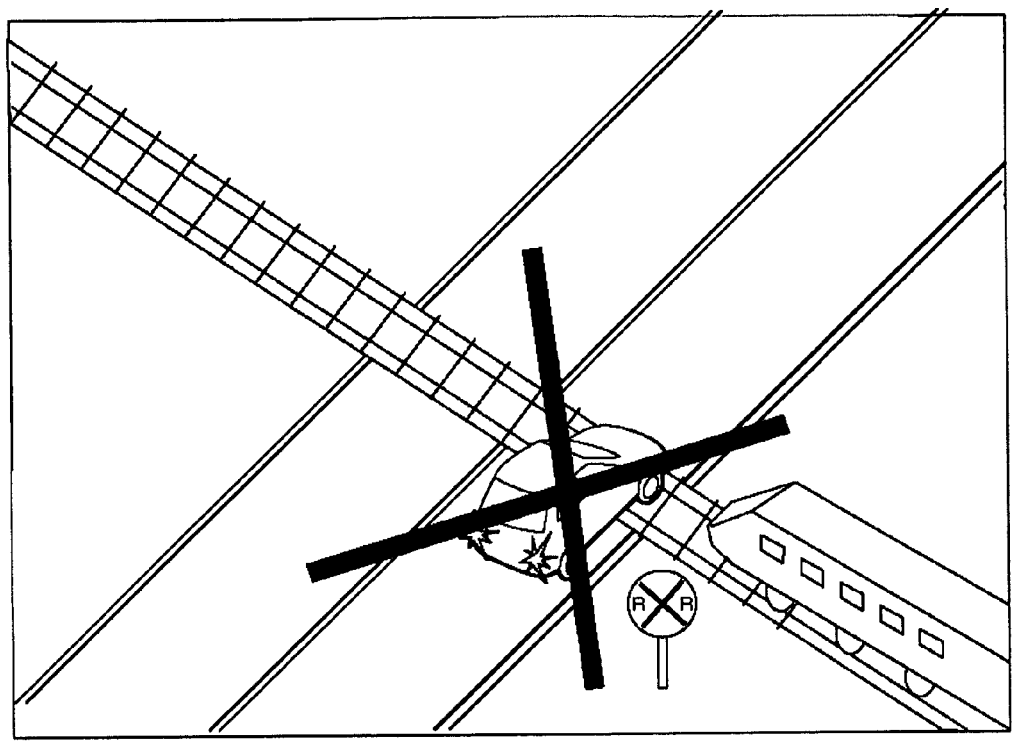
FIG. 65 shows a situation in which the vehicle comes to a stop on a railroad crossing.
Figure 66:
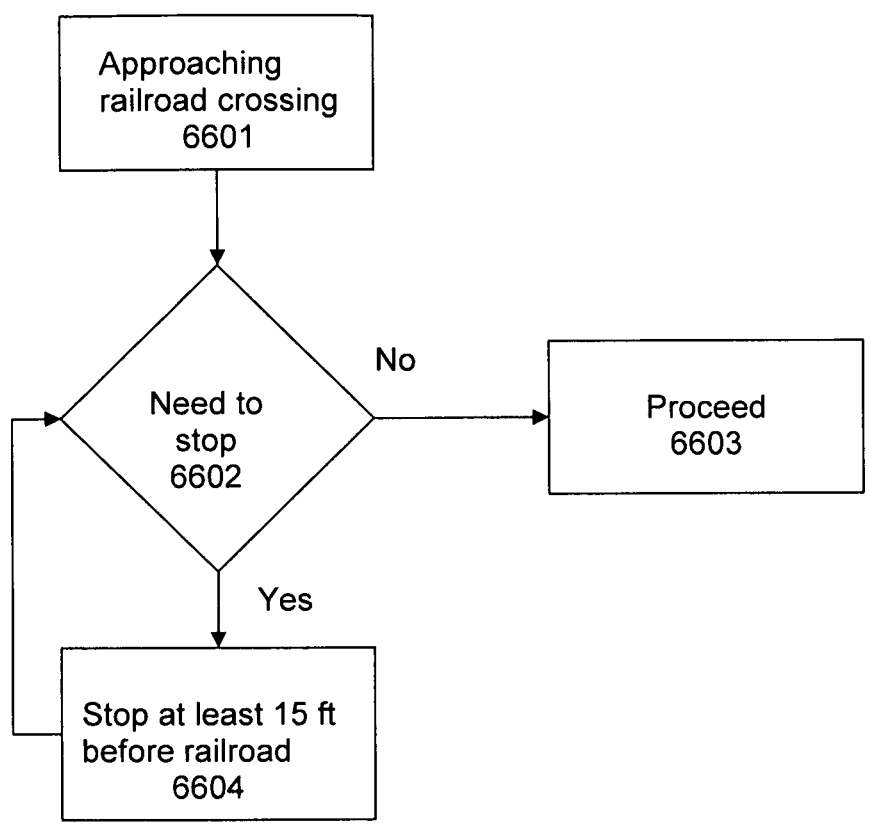
FIG. 66 shows an exemplary process performed by the robotic driving system to avoid the situation shown in FIG. 65.

The system 100 controls the vehicle to avoid the situation shown in FIG. 65, in which the vehicle comes to a stop on the railroad crossing. This behavior may be accomplished, for example, by the process shown in FIG. 66. When the system 100 determines that the vehicle is approaching a railroad crossing (step 6601), it determines whether the vehicle needs to stop (step 6602). If the vehicle does not need to stop, the traffic rule enforcement module 205 commands the vehicle to proceed (step 6603). However, if the vehicle does needs to stop, the traffic rule enforcement module 205 commands the vehicle to stop a safe distance (such as, for example, 15 ft.) in front of the railroad track (step 6604).

Figure 67:
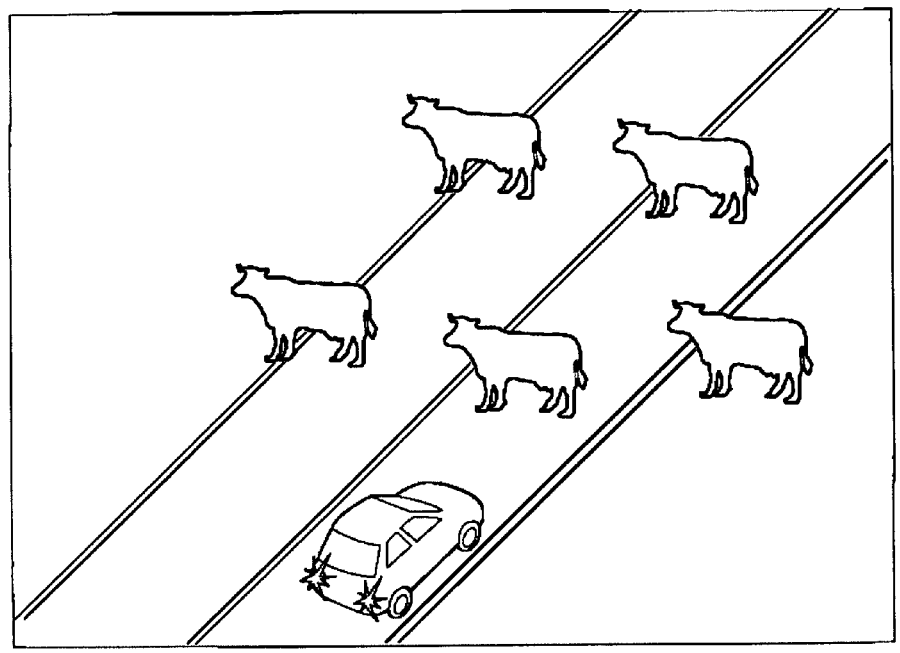
FIG. 67 shows a situation in which animals are crossing a road.

The system 100 is also capable of controlling the vehicle to follow traffic rules relating to animals, such as, for example, in a situation in which animals are crossing a road, as depicted in FIG. 67. The presence of animals in the road may be detected, for example, by the moving obstacle detection and prediction module 202. Further, the system 100 may reduce the speed of the vehicle in anticipation of encountering animals in the road in response to detecting a sign such as, for example, a deer crossing sign or a cattle crossing sign, or other information indicating an increased likelihood of the presence of animals. The system 100 will recognize animals or livestock in the path of the vehicle, and will control the vehicle to either slow down or come to a stop in the same manner as done for pedestrians, as described above, for example, with reference to FIG. 6. Further, in one embodiment, the system 100 may be capable of distinguishing small animals (such as, squirrels or birds) from other types of other animals. In this embodiment, the system 100 will not alter the operation of the vehicle based on the detected presence of small animals.

The system 100 is also capable of controlling the vehicle to follow traffic rules relating to traffic lanes. For example, the system 100 can control the vehicle to follow rules relating to staying on the right side of a two-lane road, passing vehicles, changing lanes when traveling on a road with multiple lanes in a single direction, and the like. Information relating to the number of lanes, road/lane markings, roadblocks, the presence and speed of on-coming traffic, the presence and speed of traffic traveling in the same direction, and the like, may be determined, for example, using the sensors 103, stored data and/or location information. Examples of situations the system 100 may encounter relating to traffic lanes, and processes the system 100 may perform in these situations are described below with reference to FIGS. 68-84.

Figure 68:
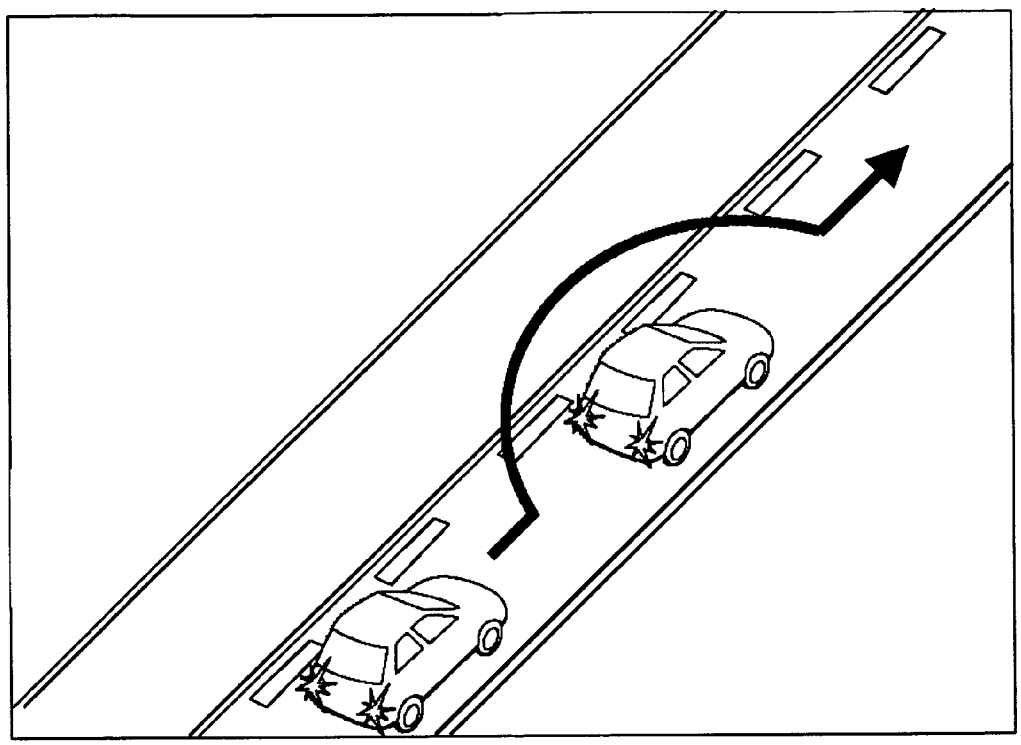
FIG. 68 shows a situation in which the vehicle is driving on a two-lane road.
Figure 69:
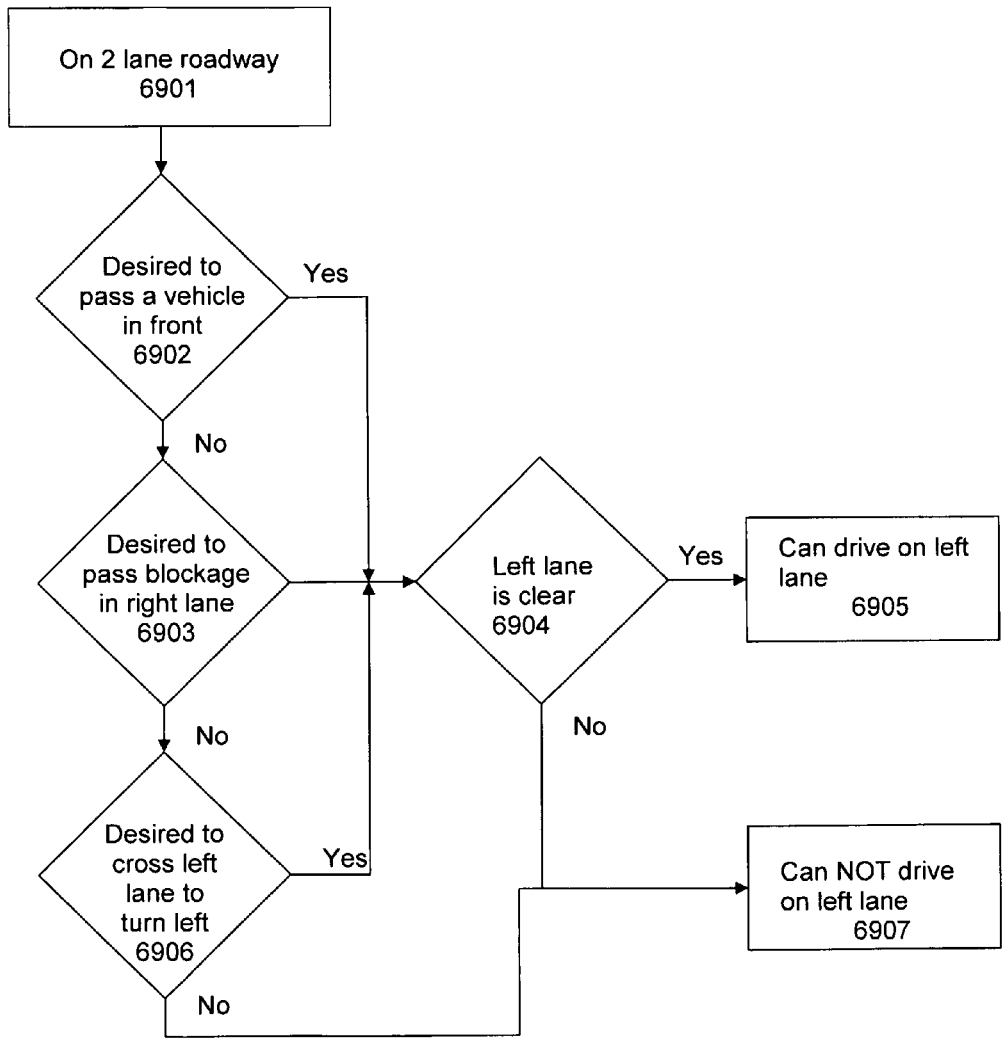
FIG. 69 shows an exemplary process performed by the system in the situation shown in FIG. 68.

FIG. 68 shows a situation in which the vehicle is driving on a two-lane road. In this situation, the system 100 will recognize that the road is a two-lane road, and will prevent the vehicle from driving in the left lane unless it is passing another vehicle, is crossing the left lane to turn left, or if the right lane is blocked. This behavior may be accomplished, for example, by the process shown in FIG. 69. First, the system 100 determines that it is traveling on a two-lane road (step 6901). The system 100 determines whether the vehicle should pass a vehicle in front of it (step 6902), determines whether the right lane is blocked (step 6903) and determines whether the vehicle plans to cross the left lane to turn left (step 6906). If the vehicle should pass a vehicle in front of it, the right lane is blocked, or the vehicle plans to cross the left lane to turn left, the moving obstacle detection and prediction module 202 determines whether the left lane is clear (step 6904). Otherwise, the traffic rule enforcement module 205 prevents the vehicle from crossing into the left lane (step 6907). If the left lane is clear, the traffic rule enforcement module 205 allows the vehicle to cross into the left lane (step 6905). However, if the left lane is not clear, the traffic rule enforcement module 205 prevents the vehicle from crossing into the left lane (step 6907).

Figure 70:
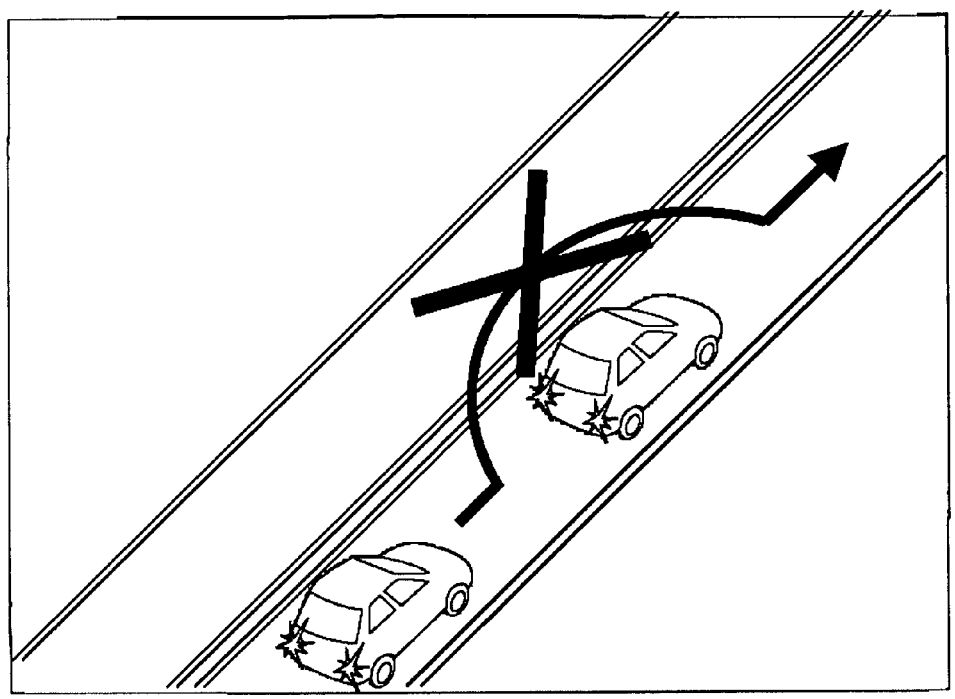
FIG. 70 shows a situation in which the vehicle is driving on a road with solid yellow lines.
Figure 71:
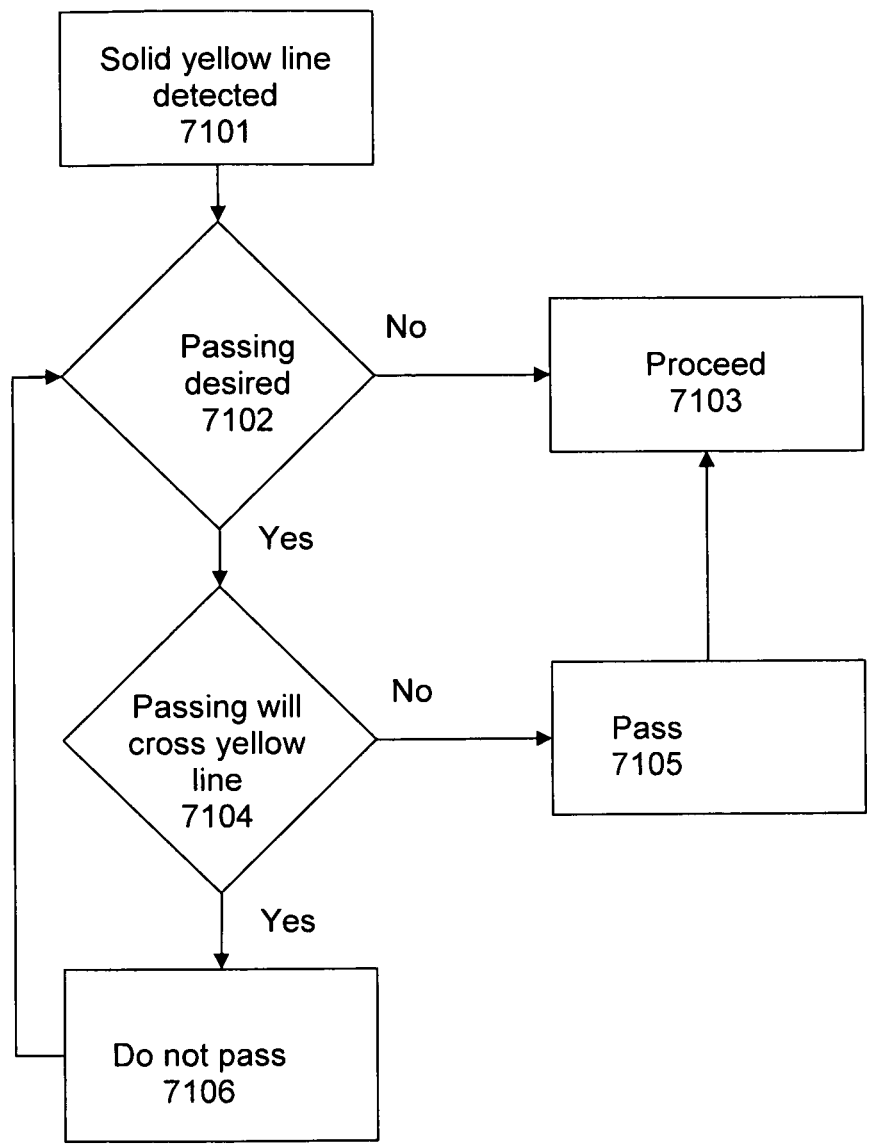
FIG. 71 shows an exemplary process performed by the robotic driving system in the situation shown in FIG. 70.

FIG. 70 shows a situation in which the vehicle is driving on a road with solid yellow lines. In this situation, the system 100 will recognize the solid yellow lines and will prevent the vehicle from passing another vehicle. This behavior may be accomplished, for example, by the process shown in FIG. 71. First, the system 100 detects a solid yellow line (step 7101). Then, the system 100 determines whether the vehicle should pass another vehicle (step 7102). If the vehicle should not pass another vehicle, the vehicle proceeds as before (step 7103). However, if the system 100 determines that the vehicle should pass another vehicle, the system 100 determines whether passing would require crossing a solid yellow line (step 7104). If the system 100 determines that passing would not require crossing a solid yellow line, the traffic rule enforcement module 205 commands the vehicle to pass the other vehicle (step 7105). However, if the system 100 determines that passing would require crossing a solid yellow line, the traffic rule enforcement module 205 prevents the vehicle from passing (step 7106).

Figure 72:
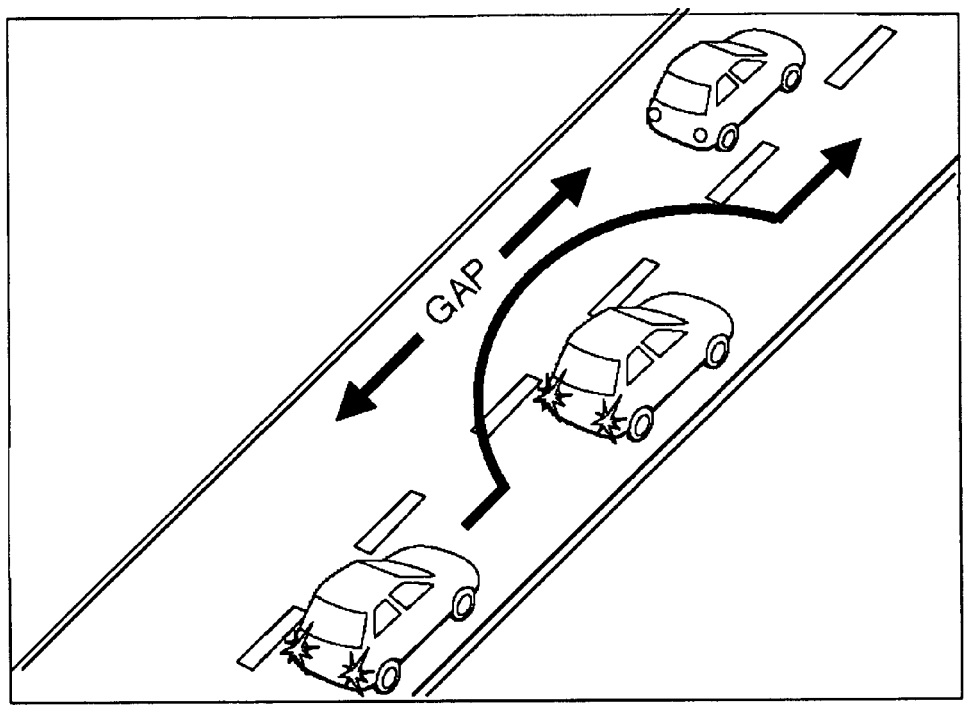
FIG. 72 shows a situation in which the vehicle is driving on a road with broken yellow lines.
Figure 73:
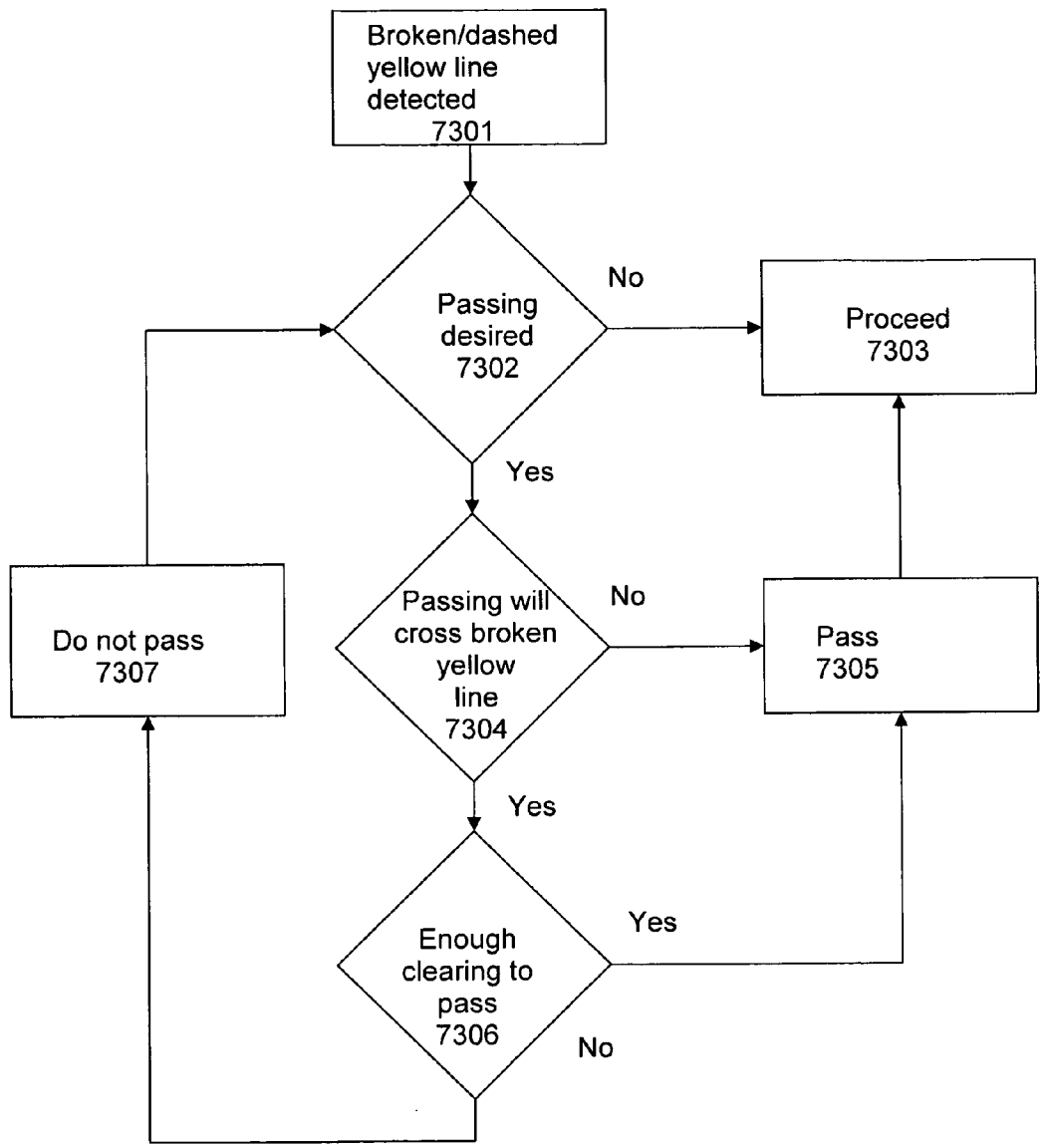
FIG. 73 shows an exemplary process performed by the robotic driving system in the situation shown in FIG. 72.

FIG. 72 shows a situation in which the vehicle is driving on a road with broken (dashed) yellow lines. In this situation, the system 100 will recognize the broken yellow lines, and will allow the vehicle to pass another vehicle if there is enough clearing (distance) from oncoming traffic. This behavior may be accomplished, for example, by the process shown in FIG. 73. First, the system 100 recognizes broken yellow lines (step 7301). The system 100 determines whether the vehicle should pass another vehicle (step 7302). If the vehicle should not pass another vehicle, the vehicle proceeds as before (step 7303). However, if the system 100 determines that the vehicle should pass another vehicle, the system 100 determines whether passing will require crossing a broken yellow line (step 7304). If passing will not require crossing a broken yellow line, the traffic rule enforcement module 205 commands the vehicle to pass the other vehicle (step 7305). However, if passing requires crossing a broken yellow line, the system 100 determines whether there is enough clearing (distance) to pass the other vehicle (step 7306). If there is enough clearing to pass the other vehicle, the traffic rule enforcement module 205 commands the vehicle to pass the other vehicle (step 7305). However, if there is not enough clearing to pass the other vehicle, the traffic rule enforcement module 205 prevents the vehicle from passing (step 7307).

Figure 74:
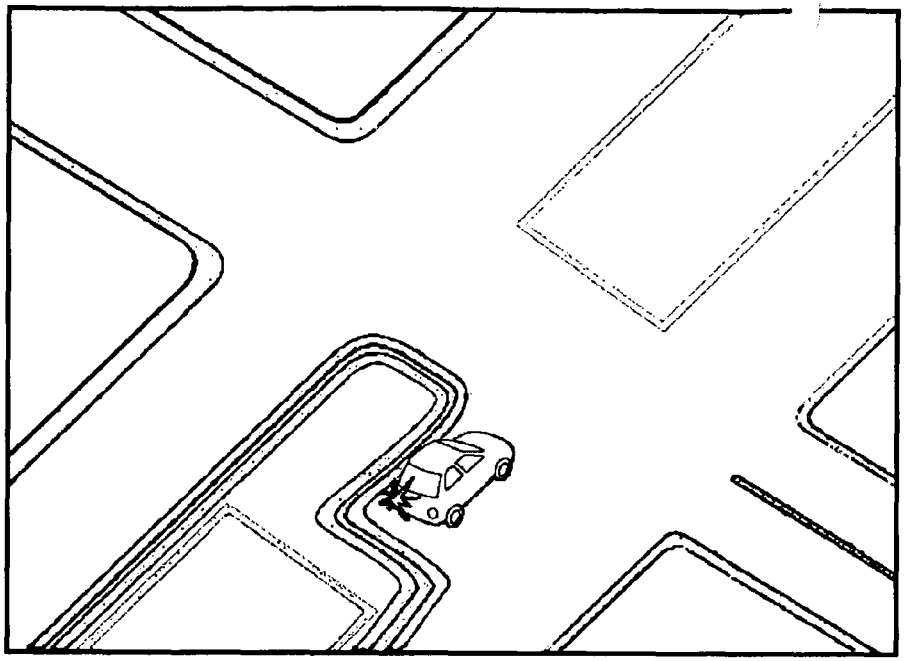
FIG. 74 shows a situation in which the vehicle is on a road with double yellow lines.

FIG. 74 shows a situation in which the vehicle is on a road with double yellow lines. In this situation, the system 100 will recognize the double yellow lines, and treat them as a barrier, preventing the vehicle from crossing them.

Figure 75:
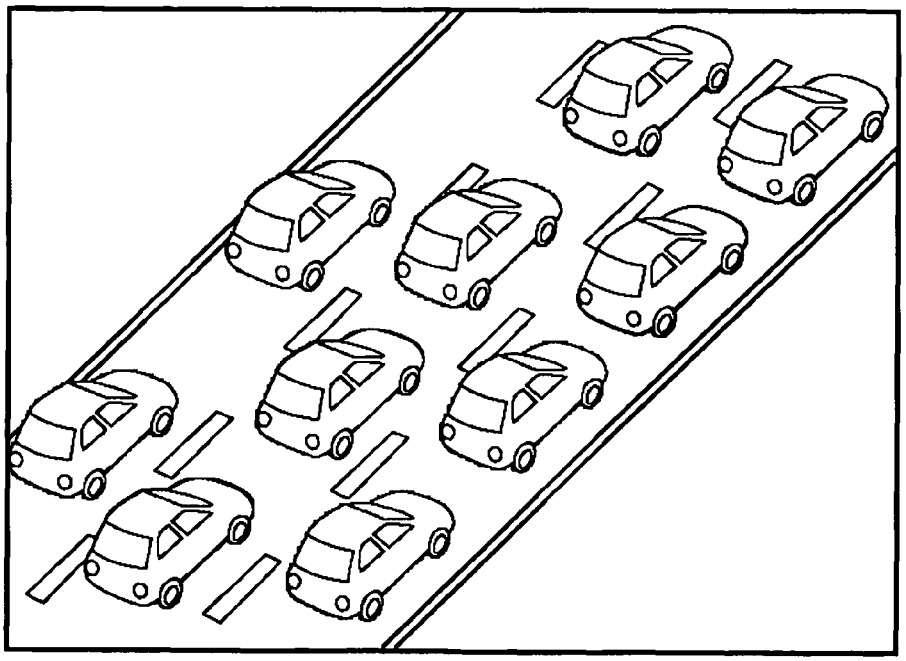
FIG. 75 shows a situation in which the vehicle is driving on a road with multiple lanes.
Figure 76:
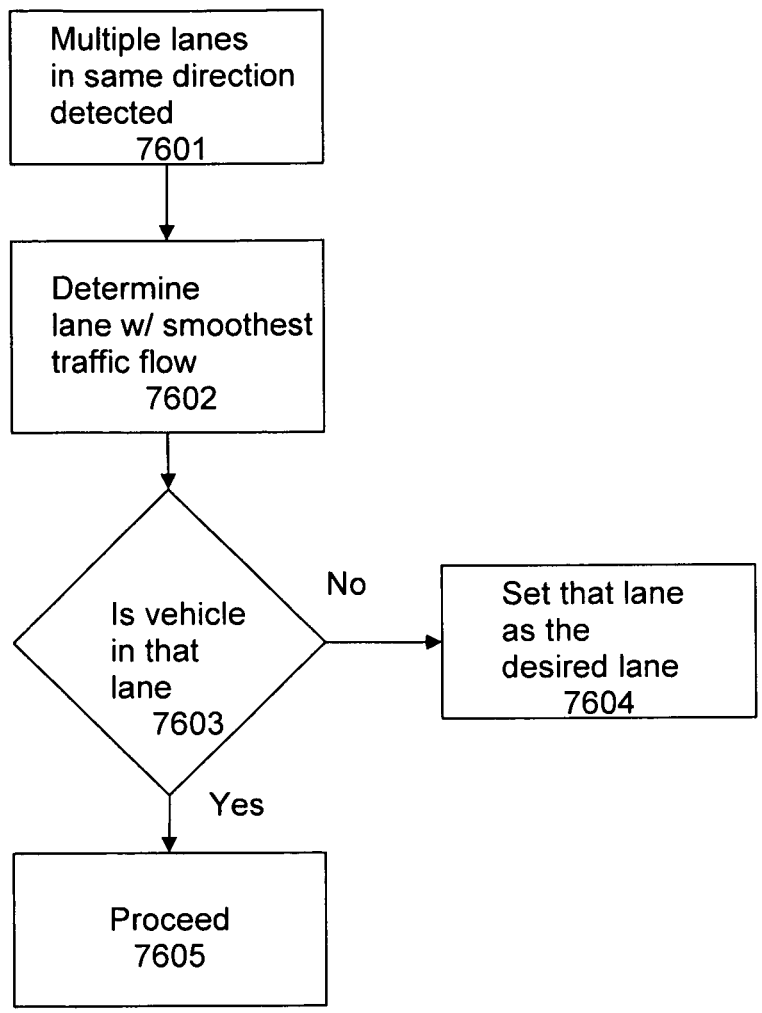
FIG. 76 shows an exemplary process performed by the robotic driving system in the situation shown in FIG. 75.

FIG. 75 shows a situation in which the vehicle is driving on a road with multiple lanes. In this situation, the system 100 will recognize that the road has multiple lanes, and will control the vehicle to drive in the lane with the smoothest flow of traffic. This behavior may be accomplished, for example, by the process shown in FIG. 76. First, the system 100 detects that the road contains multiples lanes in the same direction (step 7601). Then, the system 100 determines, using the moving obstacle detection and prediction module 202 for example, which lane has the smoothest traffic flow (step 7602). The system 100 determines whether the vehicle is in the lane with the smoothest traffic flow (step 7603). If the vehicle is not in the lane with the smoothest traffic flow, the system 100 sets that lane as being a desired lane and controls the vehicle to move into the desired lane (step 7604). Otherwise, the system 100 controls the vehicle to proceed as before (step 7605).

Figure 77:
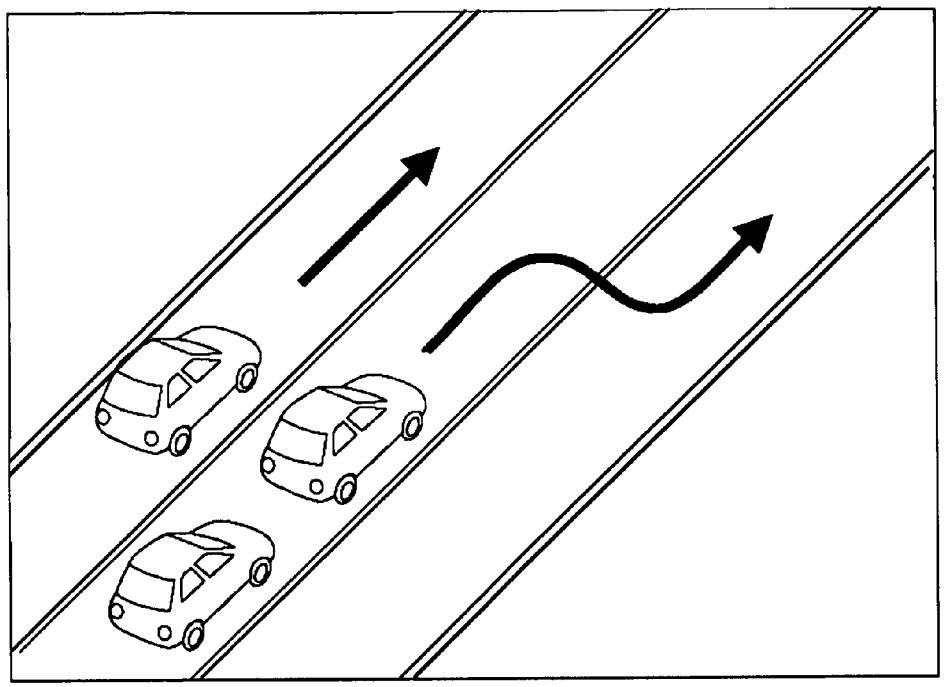
FIG. 77 shows a situation in which the vehicle moves into a right lane.
Figure 78:
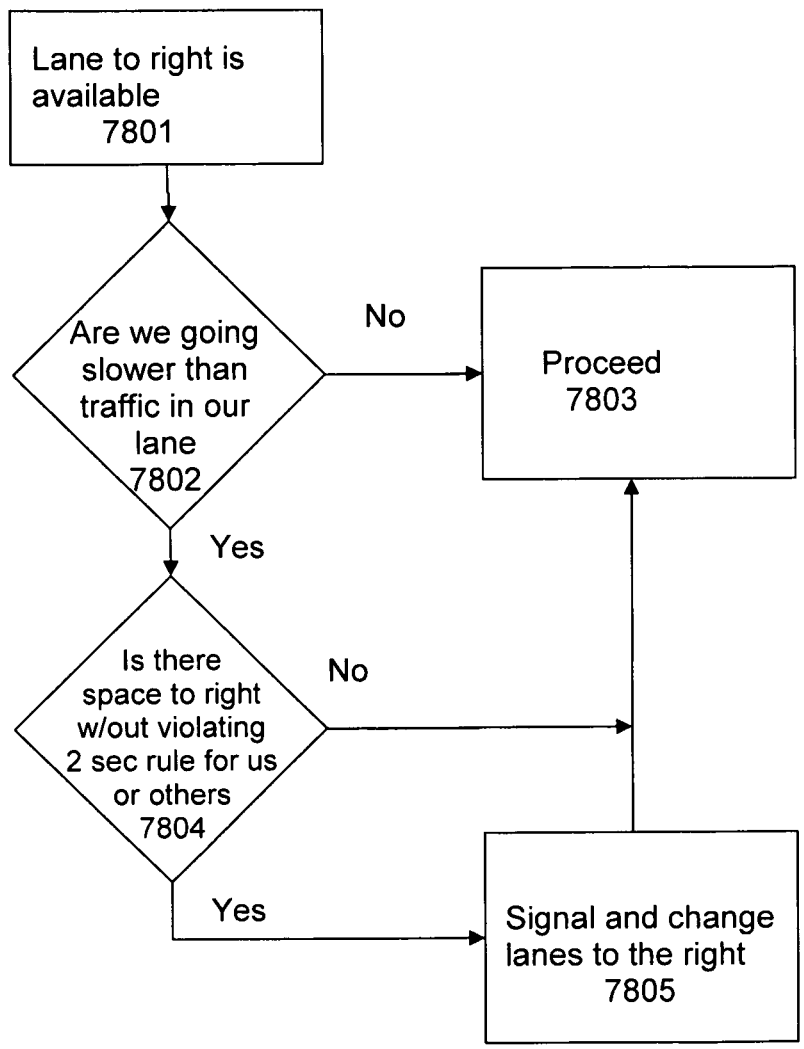
FIG. 78 shows an exemplary process performed by the robotic driving system in the situation shown in FIG. 77.

The system 100 will recognize lanes, and if the vehicle is driving slower than other vehicles driving in its lane, the vehicle will move to a right lane, as shown in FIG. 77. This may be accomplished, for example, by the process shown in FIG. 78. First, the system 100 determines that a lane to the right of the vehicle's lane is available (step 7801). The system 100 determines whether the vehicle is driving slower than traffic in its lane (step 7802). If the vehicle is not driving slower than traffic in its lane, the vehicle proceeds as before (step 7803). However, if the vehicle is driving slower than traffic in its lane, the system 100 determines whether the vehicle may safely move into the right lane (step 7804). For example, the system 100 may determine whether there would be a two-second space between the vehicle and other vehicles in the right lane if the vehicle were to move into the right lane. If the vehicle cannot safely move into the right lane, the vehicle proceeds as before (step 7803). However, if the vehicle can safely move into the right lane, the traffic rule enforcement module 205 commands the vehicle to signal and move into the right lane (step 7805).

Figure 79:
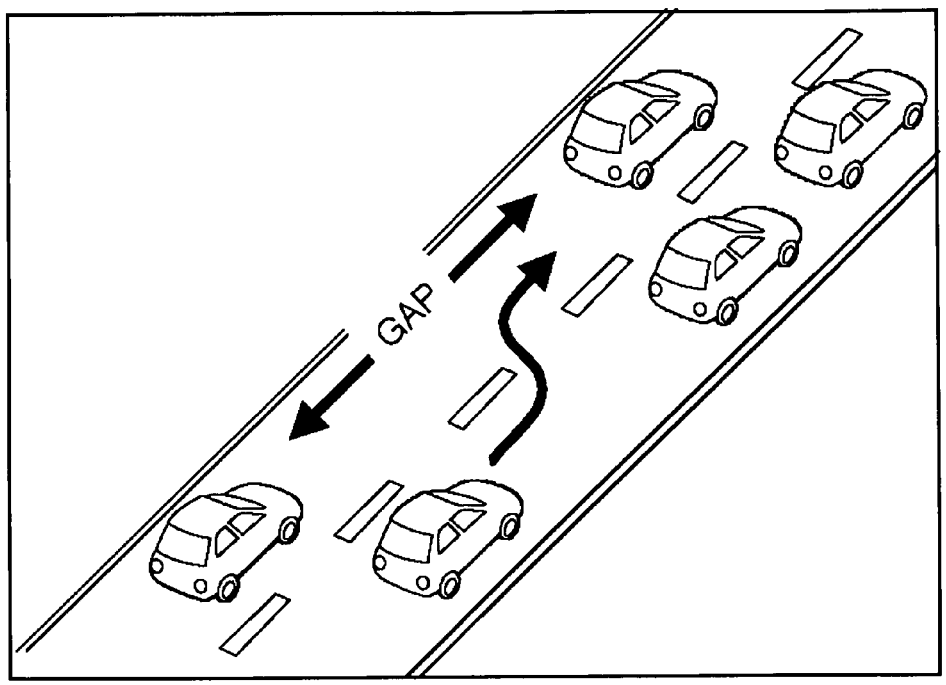
FIG. 79 shows a situation in which the vehicle changes lanes.
Figure 80:
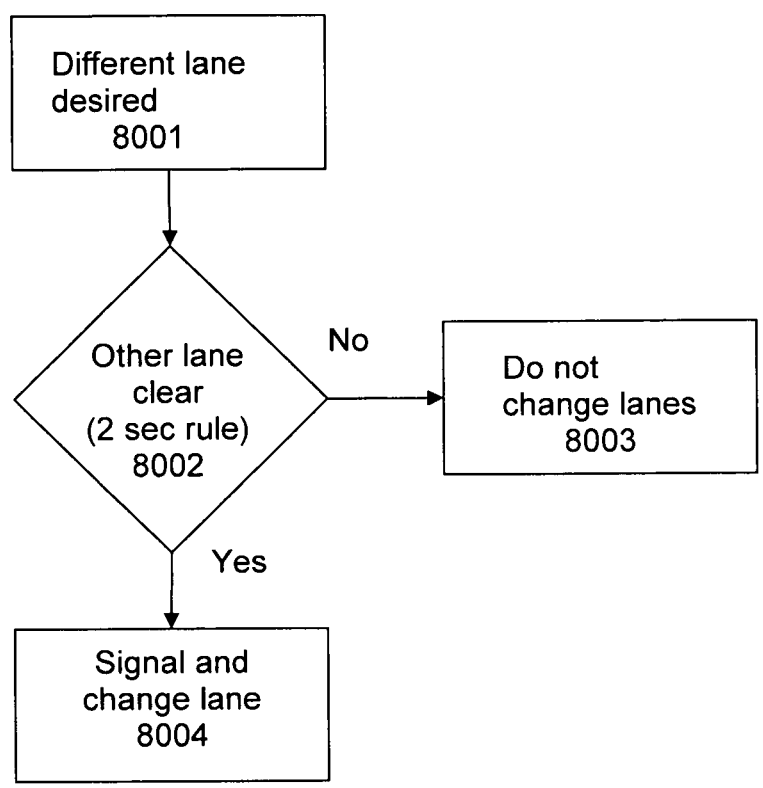
FIG. 80 shows an exemplary process performed by the robotic driving system in the situation shown in FIG. 79.

If the vehicle should change lanes, the system 100 will command the vehicle to change lanes only if the other lane is clear, as shown in FIG. 79. This behavior may be accomplished, for example, by the process shown in FIG. 80. First, the system 100 determines that the vehicle should change lanes (step 8001). The system 100 then determines whether the other lane is clear (step 8002). For example, the system 100 may determine whether there would be a two-second space between the vehicle and other vehicles in the other lane if the vehicle were to move into the other lane. If the system 100 determines that the other lane is not clear, the traffic rule enforcement module 205 prevents the vehicles from changing lanes (step 8003). However, if the other lane is clear, the traffic rule enforcement module 205 commands the vehicle to signal and change lanes (step 8004).

Figure 81:
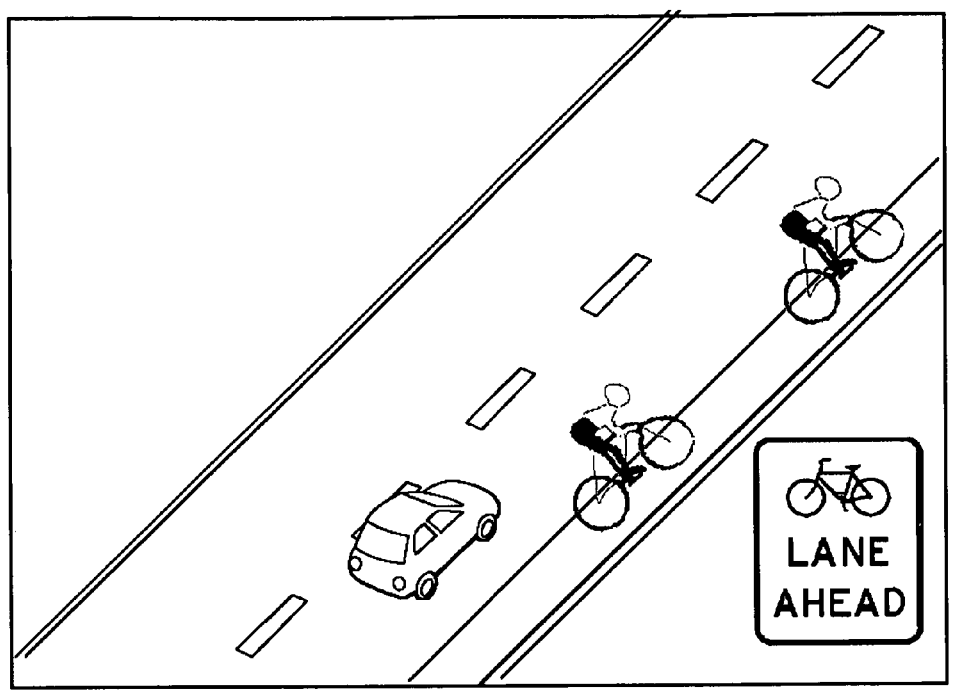
FIG. 81 shows a situation in which the vehicle is driving on a road with a bicycle lane.
Figure 82:
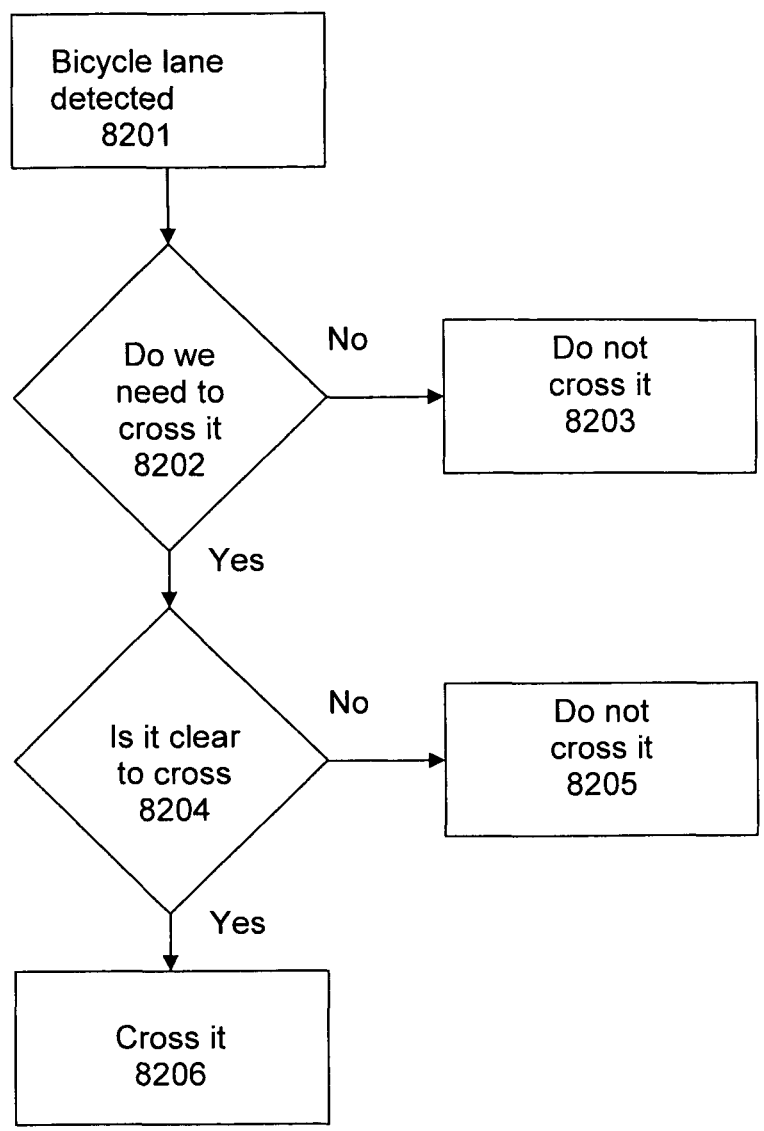
FIG. 82 shows an exemplary process performed by the robotic driving system in the situation shown in FIG. 81.

FIG. 81 shows a situation in which the vehicle is driving on a road with a bicycle lane. In this situation, the system 100 will recognize the bicycle lane, and avoid driving on it, except for when crossing it. This behavior may be accomplished, for example, by the process shown in FIG. 82. First, the system 100 detects a bicycle lane (step 8201). The system 100 determines whether the vehicle's planned path crosses the bicycle lane (step 8202). If the vehicle's path does not cross the bicycle lane, the traffic rule enforcement module 205 prevents the vehicle from driving on the bicycle lane (step 8203). However, if the vehicle's path will cross the bicycle lane, the moving obstacle detection and prediction module 202 determines whether the bicycle lane is clear (step 8204). If the bicycle lane is not clear, the traffic rule enforcement module 205 prevents the vehicle from crossing it (step 8205). However, if the bicycle lane is clear, the traffic rule enforcement module 205 allows the vehicle to cross it as planned (step 8206).

Figure 83:
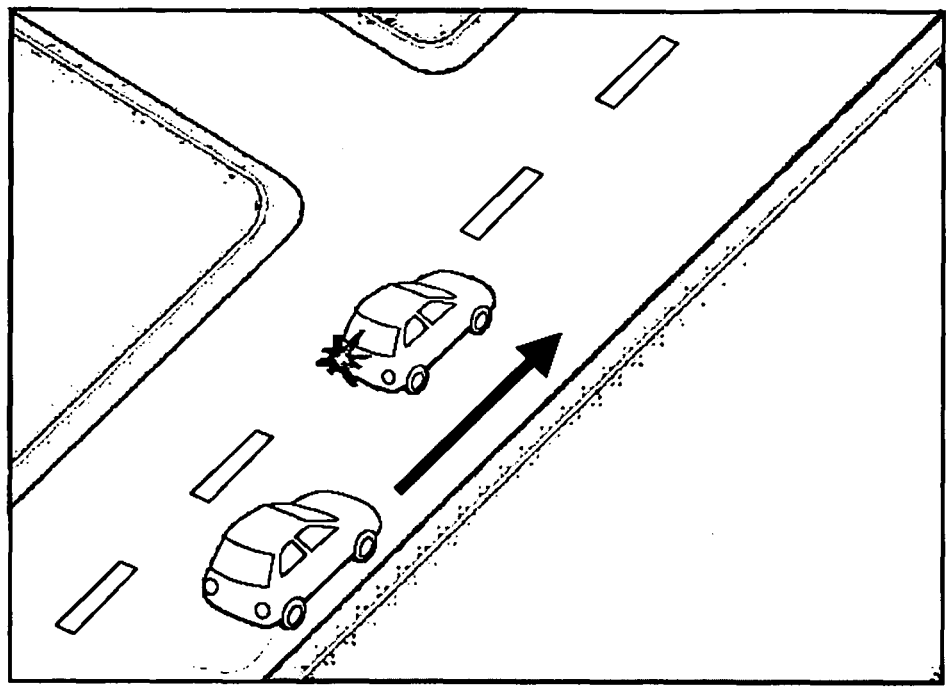
FIG. 83 shows a situation in which the vehicle passes another vehicle on the right.
Figure 84:
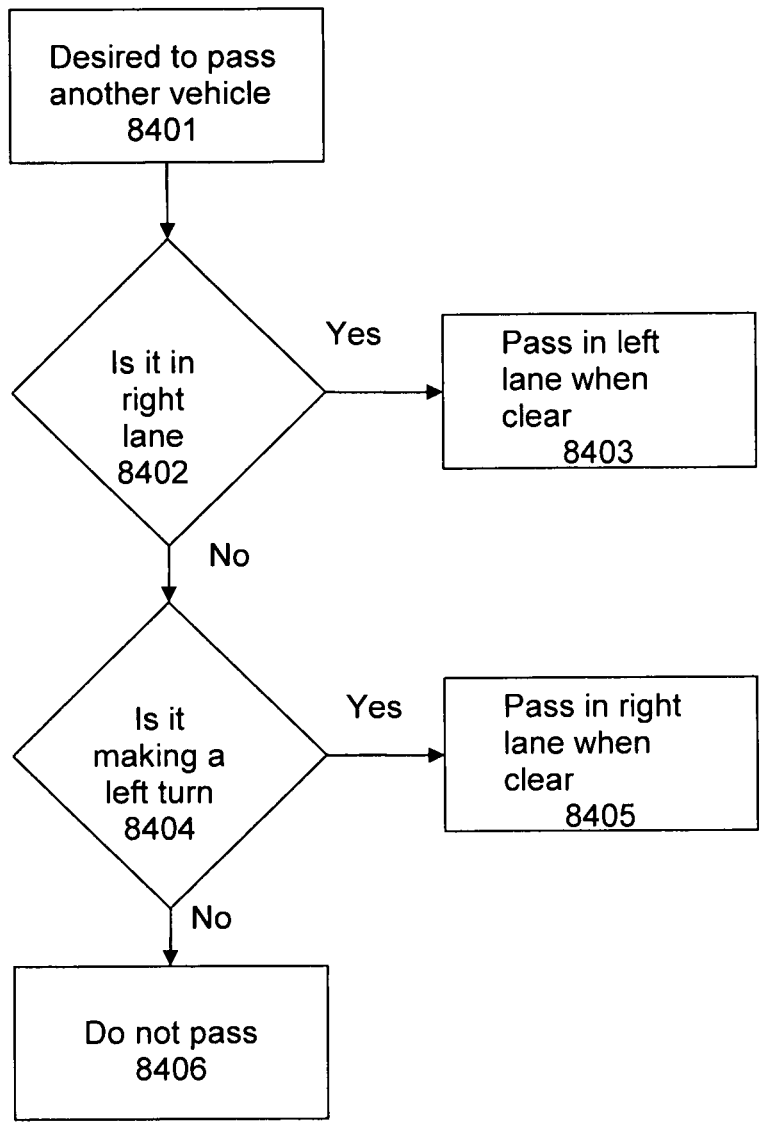
FIG. 84 shows an exemplary process performed by the robotic driving system in the situation shown in FIG. 83.

FIG. 83 shows a situation in which the vehicle passes another vehicle on the right. The system 100 controls the vehicle to always pass another vehicle on the left unless there are two or more traffic lanes in the vehicle's direction of travel, the other vehicle is making a left turn, and there is enough space to pass the other vehicle on the right while still staying on the road. This behavior may be accomplished, for example, by the process shown in FIG. 84. First, the system 100 determines that the vehicle should pass another vehicle (step 8401). The system 100 determines whether the other vehicle is in the right lane (step 8402). If the other vehicle is in the right lane, the traffic rule enforcement module 205 commands the vehicle to pass the other vehicle in the left lane when clear (step 8403). However, if the other vehicle is not in the right lane, the system 100 determines whether the other vehicle is making a left turn (step 8404). If the other vehicle is making a left turn, the traffic rule enforcement module 205 commands the vehicle to pass the other vehicle in the right lane when clear (step 8405). However, if the other vehicle is not making a left turn, the traffic rule enforcement module 205 prevents the vehicle from passing the other vehicle (step 8406).

The system 100 is also capable of controlling the vehicle to follow traffic rules relating to turning. Information relating to the number of lanes, the presence of turn lanes, road and lane markings including turn arrows, the presence of traffic signals including turn arrows, the presence and speed of oncoming traffic, the presence of pedestrians and the like, may be determined using, for example, the sensors 103, stored data, and/or location information. Examples of situations the system 100 may encounter relating to turning, and processes the system 100 may perform in these situations are described below with reference to FIGS. 85-102.

Figure 85:
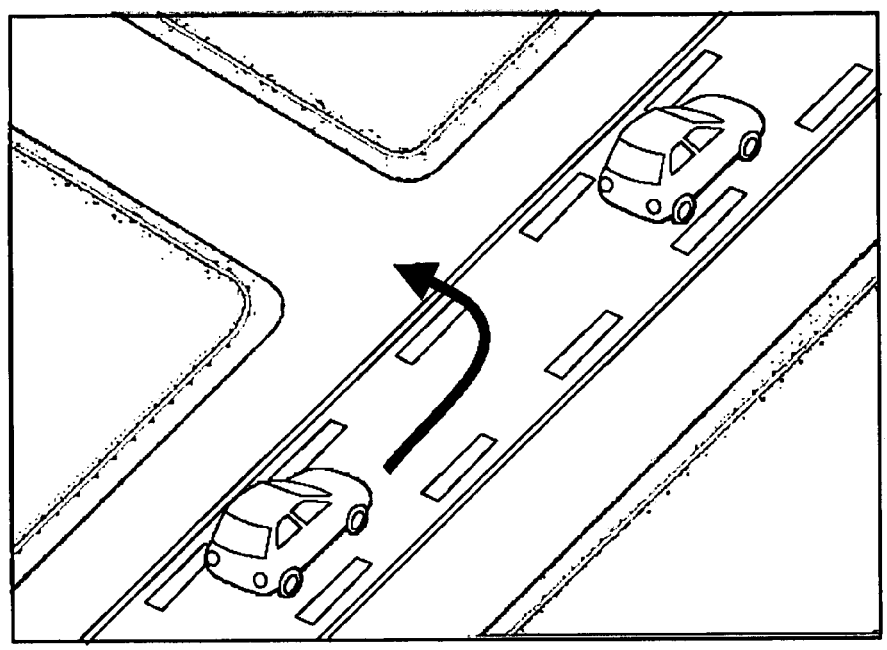
FIG. 85 shows a situation in which the vehicle is driving on a road including a center turn lane.
Figure 86:
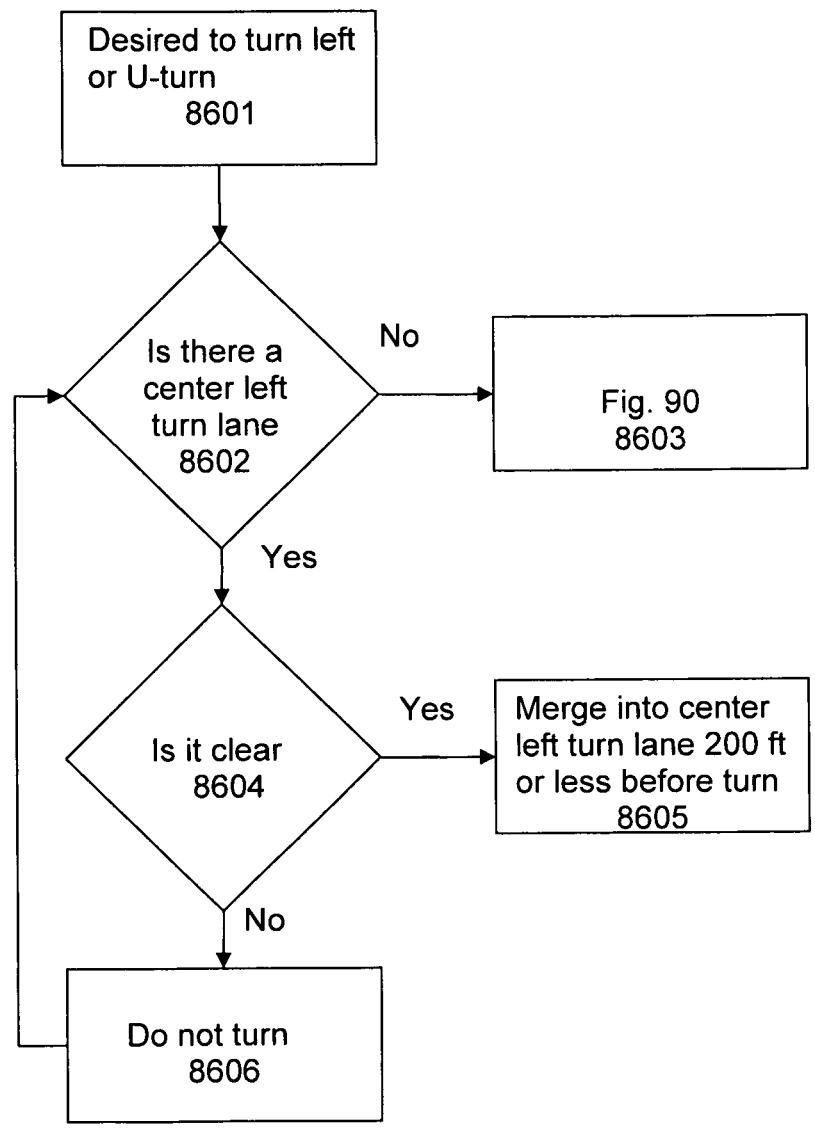
FIG. 86 shows an exemplary process performed by the robotic driving system in the situation shown in FIG. 85.

FIG. 85 shows a situation in which the vehicle is driving on a road including a center turn lane. In this situation, the system 100 will recognize the center turn lane, and will control the vehicle to use the center turn lane when turning left or making a U-turn. This behavior may be accomplished, for example, by the process shown in FIG. 86. First, the system 100 determines that the vehicle will being turning left or making a U-turn (step 8601). The system 100 then determines whether there is a center turn lane (step 8602). If there is no center turn lane, the system 100 controls the vehicle according to the process shown in FIG. 90, to be discussed below. However, if there is a center turn lane, the moving obstacle detection and prediction module 202 determines whether the center turn lane is clear (step 8604). If the center turn lane is clear, the traffic rule enforcement module 205 commands the vehicle to move into the center turn lane within a predetermined distance from a point where the vehicle will be turning (such as, for example, 200 ft. or less) (step 8605). However, if the center turn lane is not clear, the traffic rule enforcement module 205 prevents the vehicle from moving into the center turn lane until it is clear (step 8606)

Figure 87:
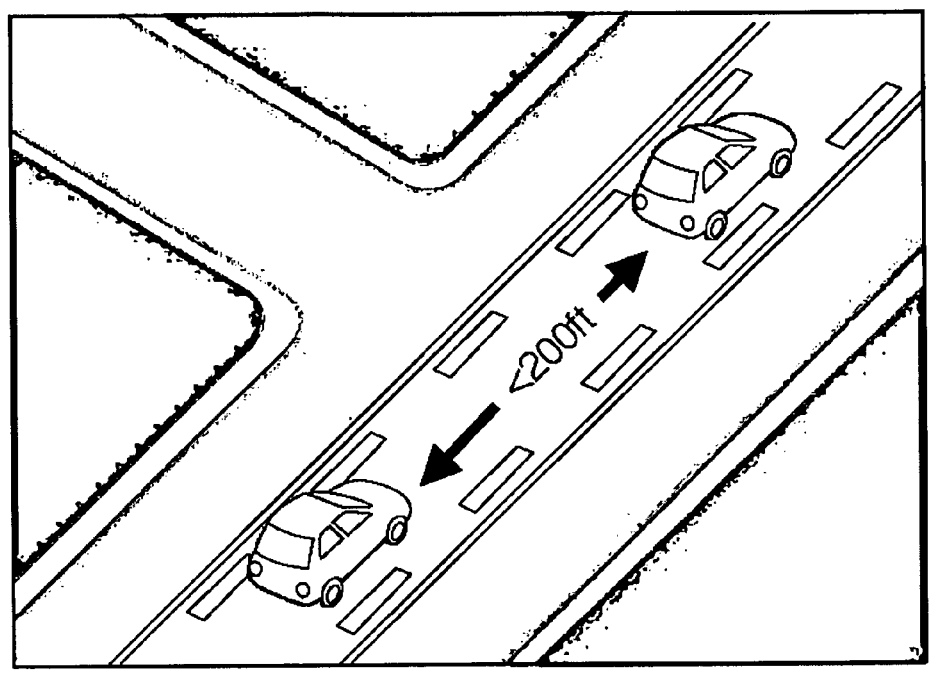
FIG. 87 shows a situation in which the vehicle is in a center turn lane.
Figure 88:
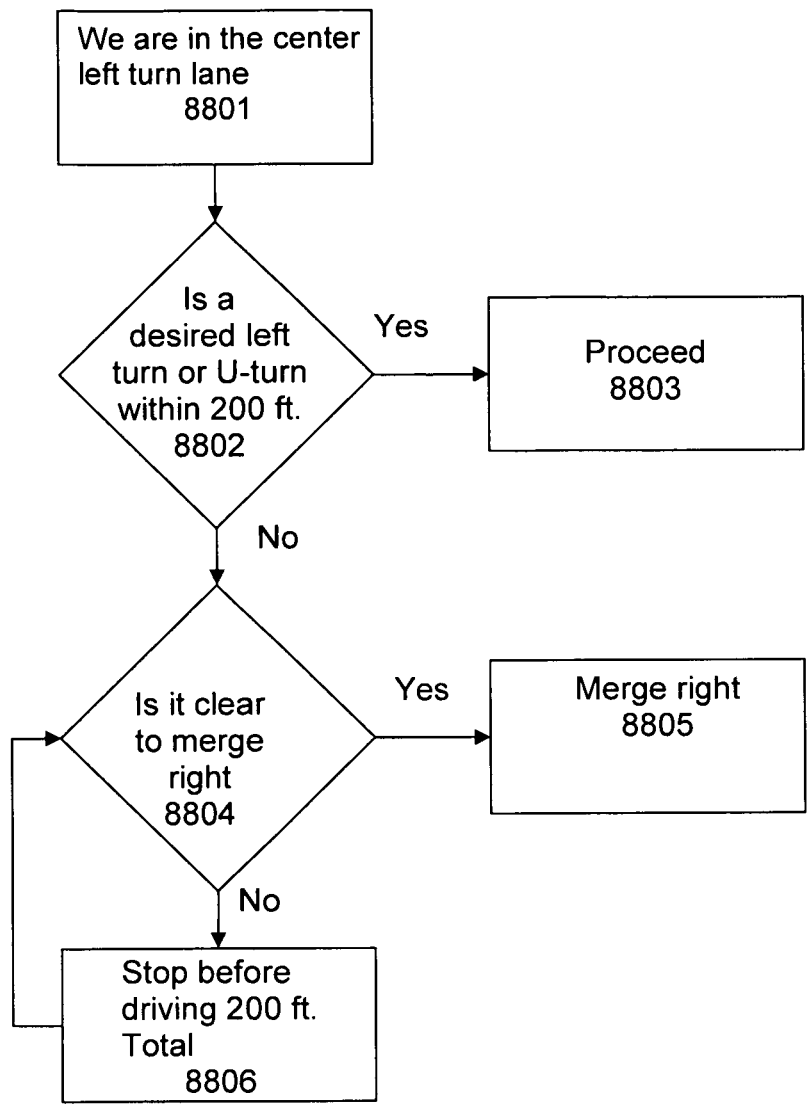
FIG. 88 shows an exemplary process performed by the robotic driving system in the situation shown in FIG. 87.

The system 100 will recognize when the vehicle is in a center turn lane, and will prevent the vehicle from traveling more than a predetermined distance in the center turn lane (such as 200 ft.), as shown in FIG. 87. This behavior may be accomplished, for example, by the process shown in FIG. 88. First, the system 100 determines that the vehicle is in a center turn lane (step 8801). The system 100 determines whether the vehicle will be turning left or making a U-turn within a predetermined distance (such as 200 ft.) (step 8802). If the vehicle will be turning left or making a U-turn within the predetermined distance, the traffic rule enforcement module 205 allows the vehicle to continue driving in the center turn lane (step 8803). However, if the vehicle will not be turning left or making a U-turn within the predetermined distance, the system 100 determines whether it is clear for the vehicle to move into a lane to the right (step 8804). If it is clear for the vehicle to move into the lane to the right, the traffic rule enforcement module 205 commands the vehicle to move to the right (step 8805). However, if it is not clear for the vehicle to move to the right, the traffic rule enforcement module 205 commands the vehicle to stop before driving the predetermined distance (step 8806).

Figure 89:
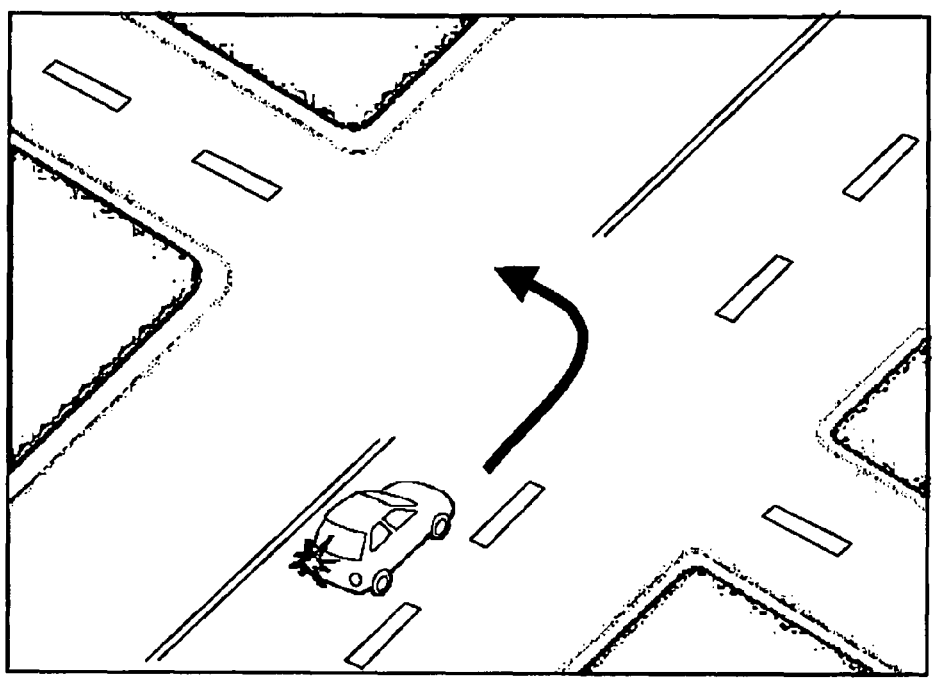
FIG. 89 shows a situation in which the vehicle is making a left turn without a center turn lane.
Figure 90:
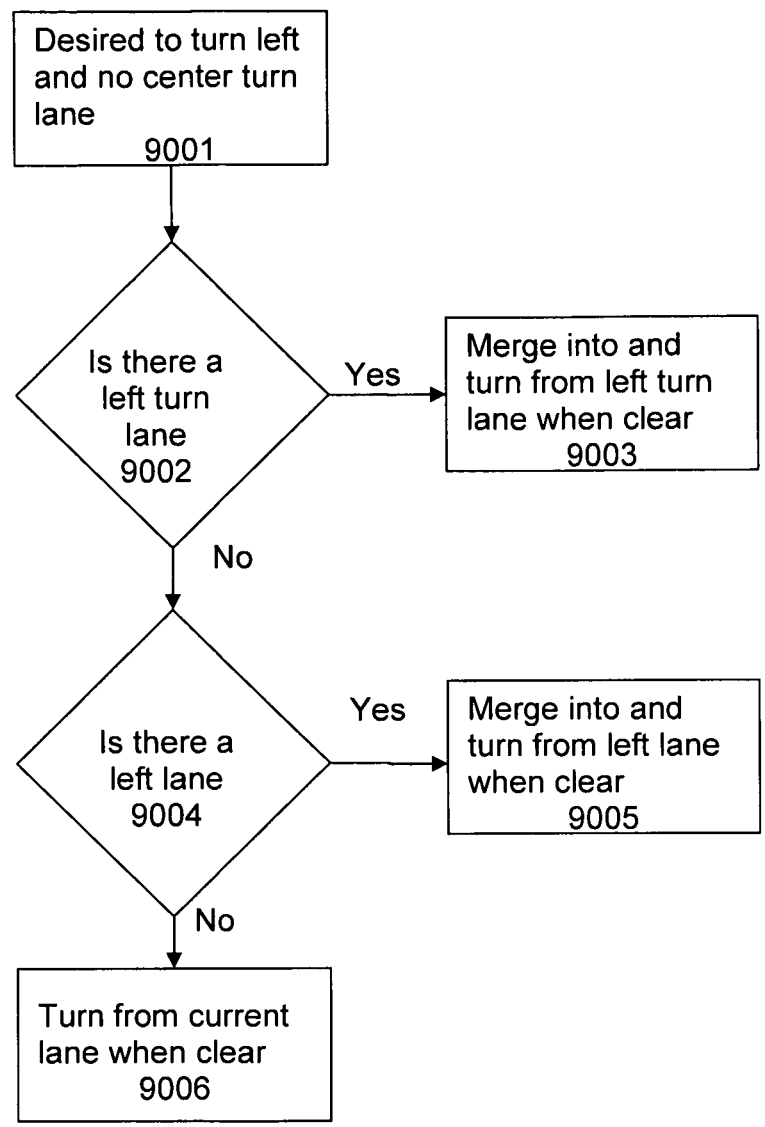
FIG. 90 shows an exemplary process performed by the robotic driving system in the situation shown in FIG. 89.

FIG. 89 shows a situation in which the vehicle is making a left turn, and the road does not contain a center turn lane. In this situation, the system 100 will control the vehicle to drive in the left lane, or left turning lane if one is present. This behavior may be accomplished, for example, by the process shown in FIG. 90. First, the system 100 determines that the vehicle will be turning left, and that the road does not contain a center turn lane (step 9001). The system 100 determines whether there is a dedicated left turn lane (step 9002). If there is a dedicated left turn lane, the traffic rule enforcement module 205 commands the vehicle to move into the left turn lane, and turn when clear (step 9003). However, if there is not a dedicated left turn lane, the system 100 determines whether there is a left lane (step 9004). If there is a left lane, the traffic rule enforcement module 205 commands the vehicle to move into the left lane, and turn when clear (step 9005). However, if there is not a left lane, the traffic rule enforcement module 205 commands the vehicle to turn from its current lane when clear (step 9006).

Figure 91:
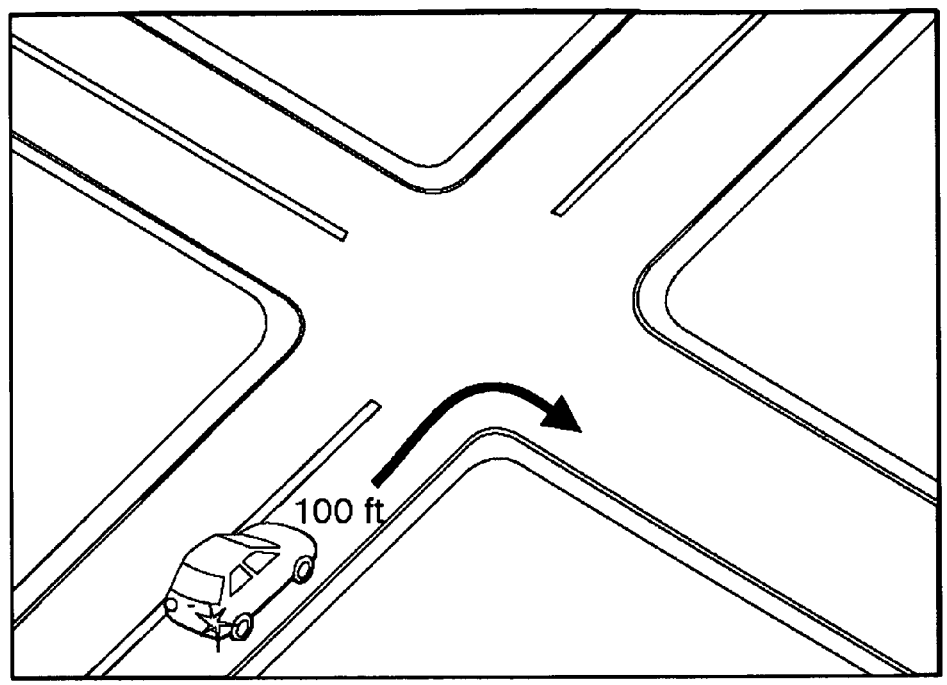
FIG. 91 shows a situation in which the vehicle turns on its turn signal.
Figure 92:
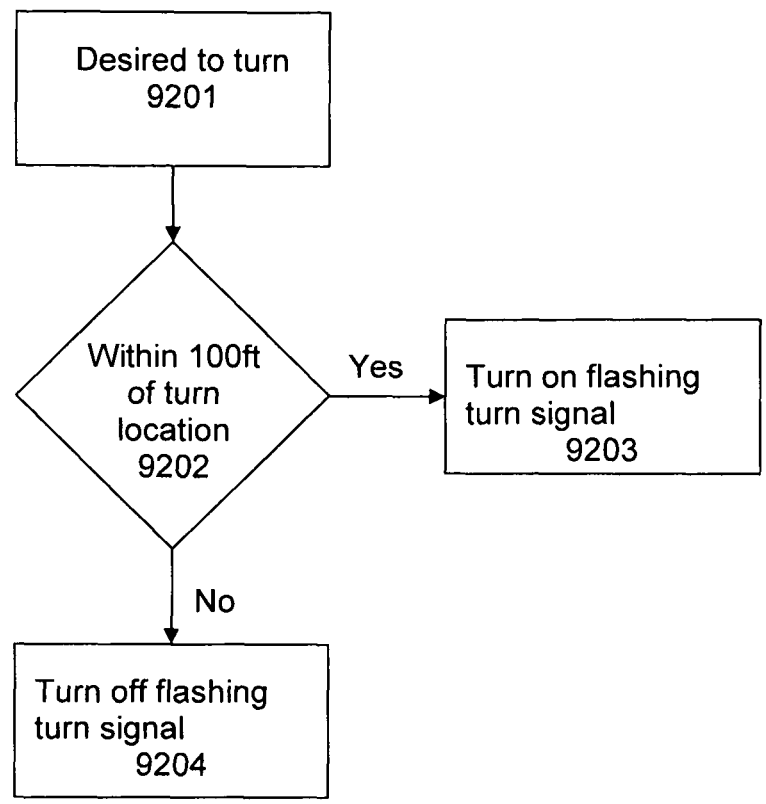
FIG. 92 shows an exemplary process performed by the robotic driving system in the situation shown in FIG. 91.

The system 100 will control the vehicle to turn on its turn signal a predetermined distance (such as, for example, 100 ft.) before a turn, as shown in FIG. 91. This may be accomplished, for example, by the process shown in FIG. 92. First, the system 100 determines that the vehicle will be making a turn (step 9201). The system 100 then determines whether the vehicle is within a predetermined distance (such as 100 ft.) from the turning location (step 9202). When the vehicle is within the predetermined distance from the turning location, the traffic rule enforcement module 205 instructs the vehicle to turn on its turn signal (step 9203). If the vehicle is not within the predetermined distance from the turning location, the turn signal remains off (step 9204).

Figure 93:
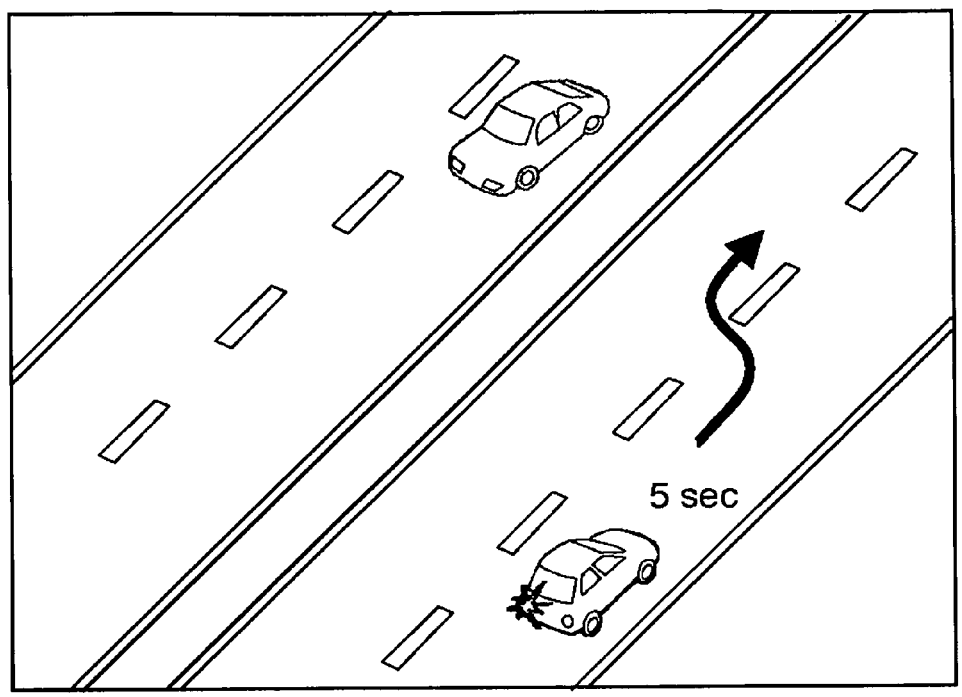
FIG. 93 shows a situation in which the vehicle is changing lanes on a multi-lane road.
Figure 94:
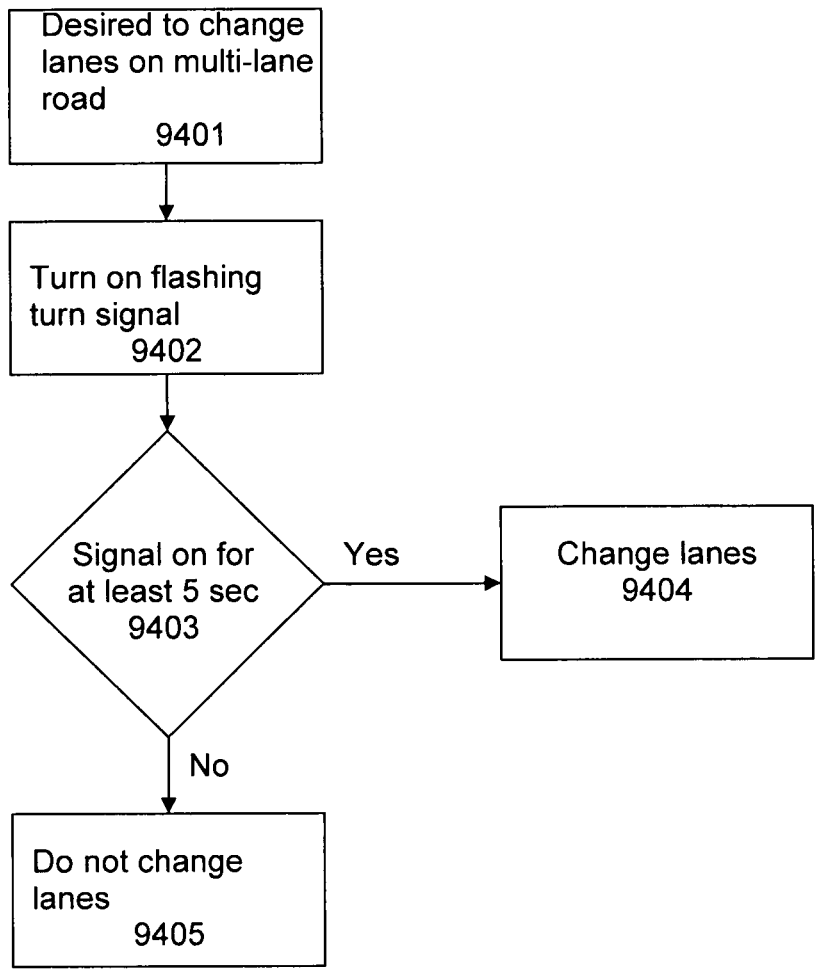
FIG. 94 shows an exemplary process performed by the robotic driving system in the situation shown in FIG. 93.

FIG. 93 shows a situation in which the vehicle changes lanes on a multi-lane road. In this situation, the system 100 will control the vehicle to turn on its turn signal a predetermined amount of time (e.g., 5 seconds) before the vehicle changes lanes. This behavior may be accomplished, for example, by the process shown in FIG. 94. First, the system 100 determines that the vehicle will be changing lanes (step 9401). Then, the traffic rule enforcement module 205 commands the vehicle to turn on its turn signal (step 9402). The system 100 determines whether the turn signal has been on for a predetermined amount of time (e.g., 5 seconds) (step 9403). When the turn signal has been on for the predetermined amount of time, the traffic rule enforcement module 205 commands the vehicle to change lanes (step 9404). If the turn signal has not been on for the predetermined amount of time, the traffic rule enforcement module 205 prevents the vehicle from changing lanes (step 9405).

Figure 95:
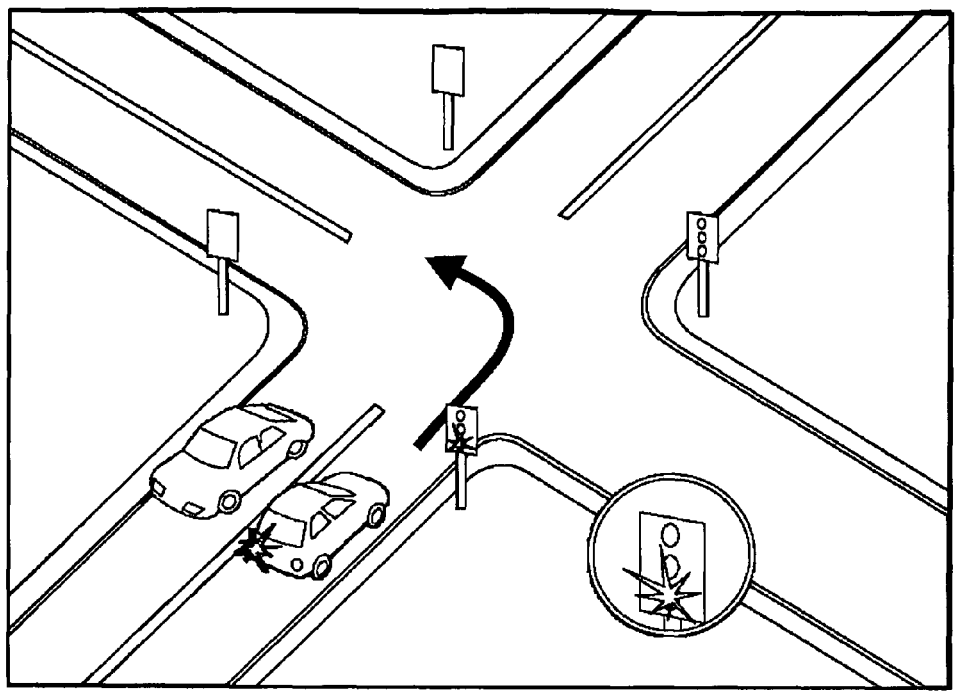
FIG. 95 shows a situation in which the vehicle turns left on a green light.
Figure 96:
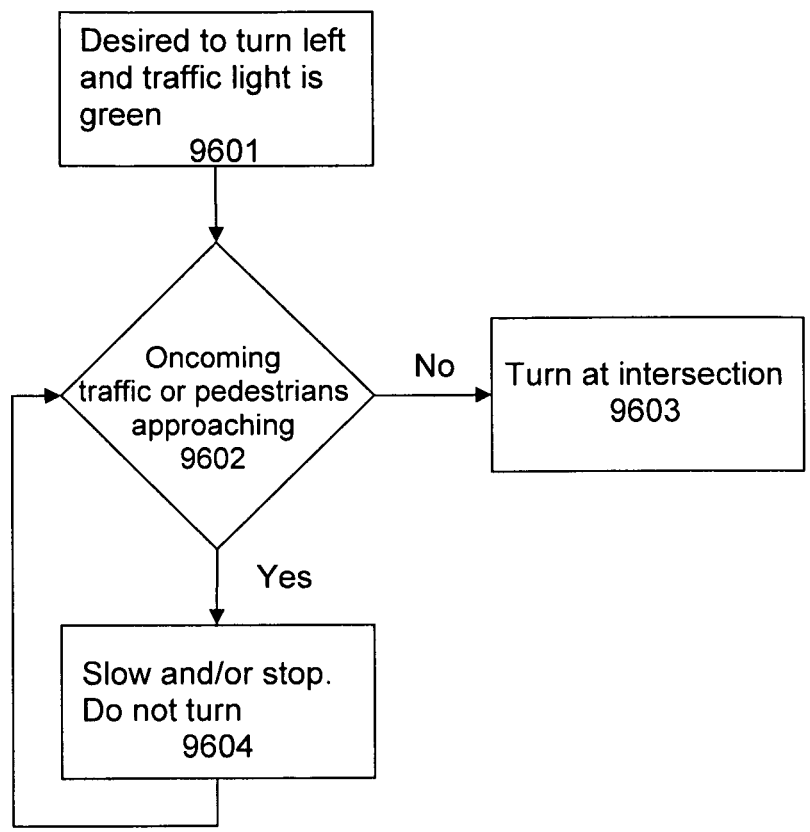
FIG. 96 shows an exemplary process performed by the robotic driving system in the situation shown in FIG. 95.

FIG. 95 shows a situation in which the vehicle is turning left on a green light. In this situation, the system 100 will recognize the green light and control the vehicle to turn left if no pedestrian is crossing and no oncoming traffic is approaching. This behavior may be accomplished, for example, by the process shown in FIG. 96. First, the system 100 recognizes a green traffic light and determines that the vehicle will be making a left turn (step 9601). The system 100 then determines whether a pedestrian is crossing or whether oncoming traffic is approaching (step 9602). If no pedestrian is crossing and no oncoming traffic is approaching, the traffic rule enforcement module 205 commands the vehicle to turn at the intersection (step 9603). However, if a pedestrian is crossing or oncoming traffic is approaching, the traffic rule enforcement module 205 commands the vehicle to slow down or stop (step 9604) and wait until no pedestrian is crossing and no oncoming traffic is approaching before turning.

Figure 97:
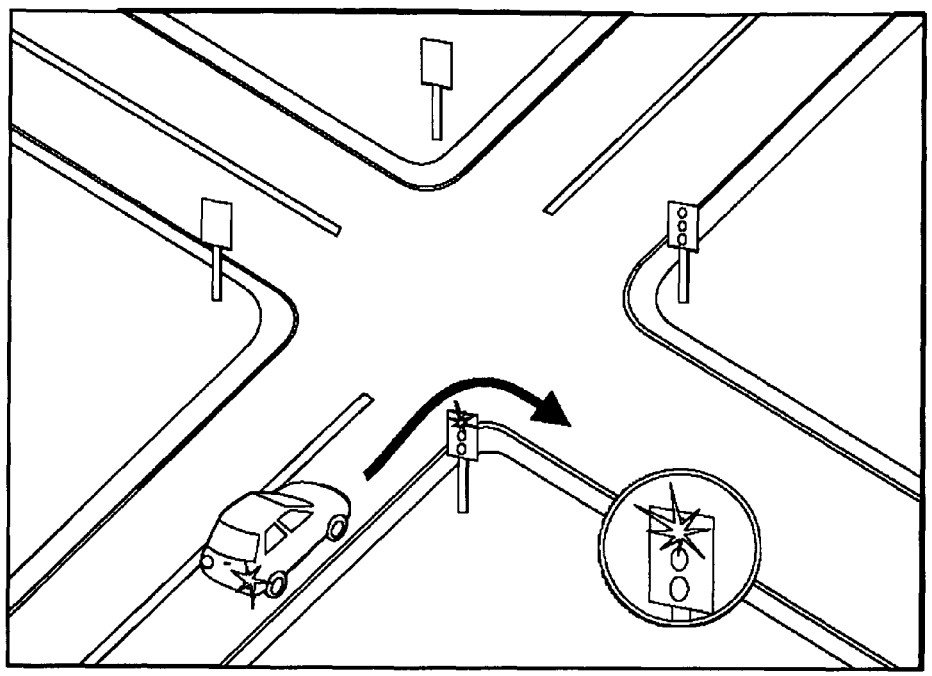
FIG. 97 shows a situation in which the vehicle makes a right turn at a red light.
Figure 98:
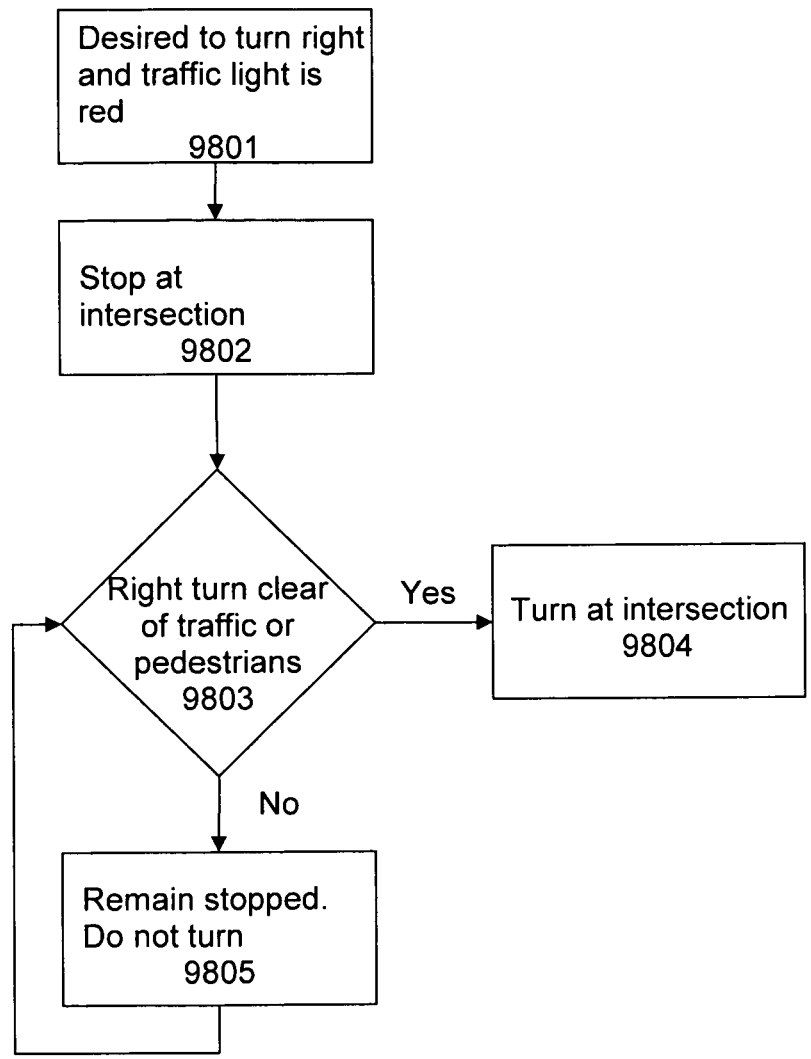
FIG. 98 shows an exemplary process performed by the robotic driving system in the situation shown in FIG. 97.

FIG. 97 shows a situation in which the vehicle is making a right turn at a red light. In this situation, the system 100 will recognize the red light, and will control the vehicle to yield to pedestrians and other traffic before turning. This behavior may be accomplished, for example, by the process shown in FIG. 98. First, the system 100 recognizes a red traffic light and determines that the vehicle will be turning right (step 9801). Then, the traffic rule enforcement module 205 commands the vehicle to come to a stop at the intersection (step 9802). The moving obstacle detection and prediction module 202 then determines whether the lane the vehicle will turn into is clear, and whether a pedestrian is crossing (step 9803). If the lane is clear and no pedestrian is crossing, the traffic rule enforcement module 205 commands the vehicle to make the right turn at the intersection (step 9804). However, if the lane is not clear or if a pedestrian is crossing, the traffic rule enforcement module 205 commands the vehicle to wait until the lane is clear (step 9805).

Figure 99:
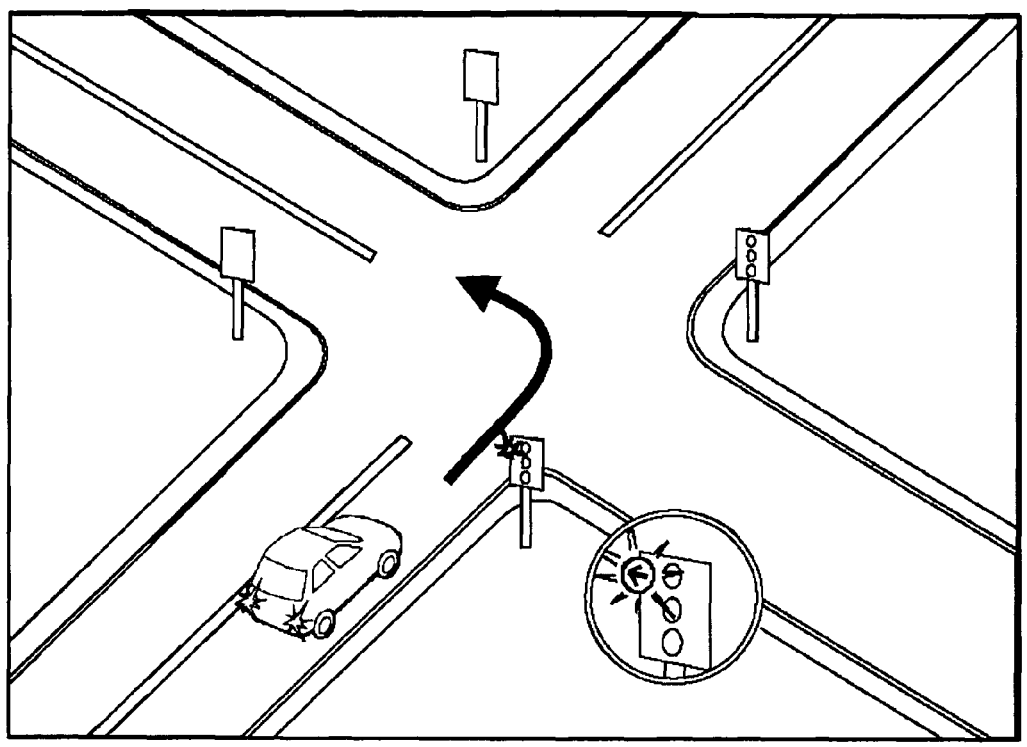
FIG. 99 shows a situation in which the vehicle turns at an intersection with a red turn arrow.
Figure 100:
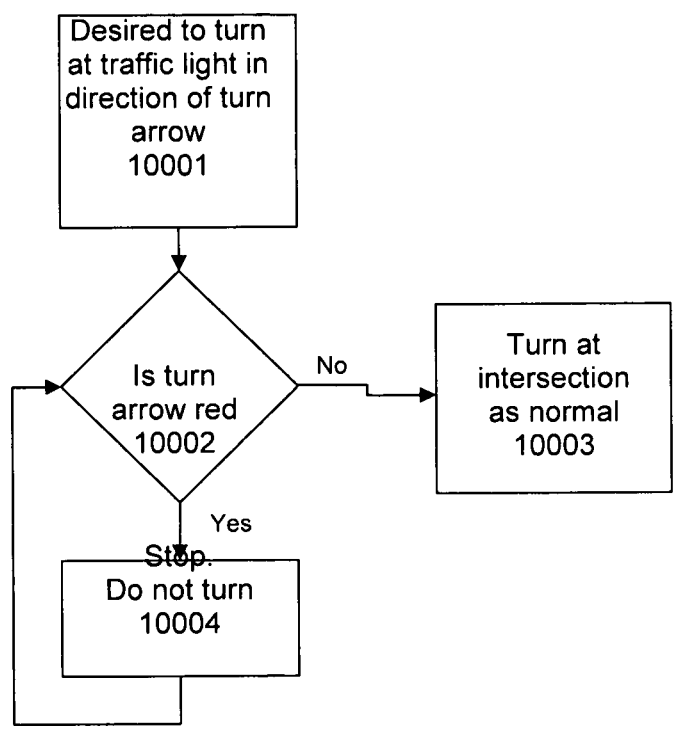
FIG. 100 shows an exemplary process performed by the robotic driving system in the situation shown in FIG. 99.

FIG. 99 shows a situation in which the vehicle will be making a turn at an intersection where there is a red turn arrow. In this situation, the system 100 recognizes the red turn arrow and its direction. If the vehicle will be making a turn in the direction of the red turn arrow, the system 100 controls the vehicle to wait until the red turn arrow changes before turning. This behavior may be accomplished, for example, by the process shown in FIG. 100. First, the system 100 detects a traffic light with a turn arrow, and determines that the vehicle will be turning in the direction of the turn arrow (step 10001). Then, the static obstacle detection module 203 determines whether the turn arrow is red (step 10002). If the turn arrow is not red, the traffic rule enforcement module 205 commands the vehicle to turn at the intersection (step 10003). However, if the turn arrow is red, the traffic rule enforcement module 205 commands the vehicle to stop (step 10004) and wait until the turn arrow is green before turning.

Figure 101:
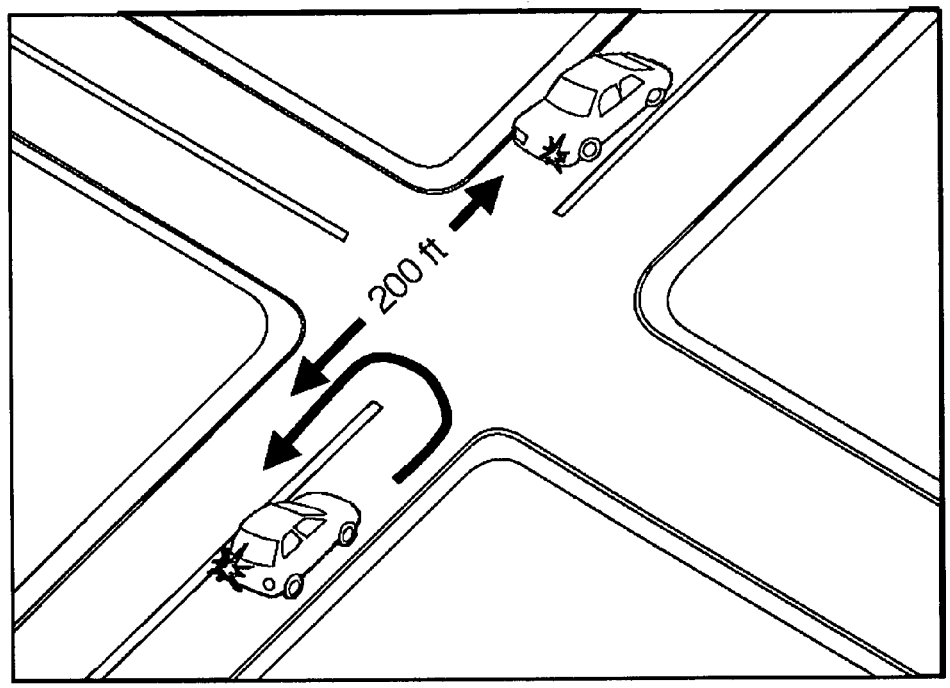
FIG. 101 shows a situation in which the vehicle makes a U-turn.
Figure 102:
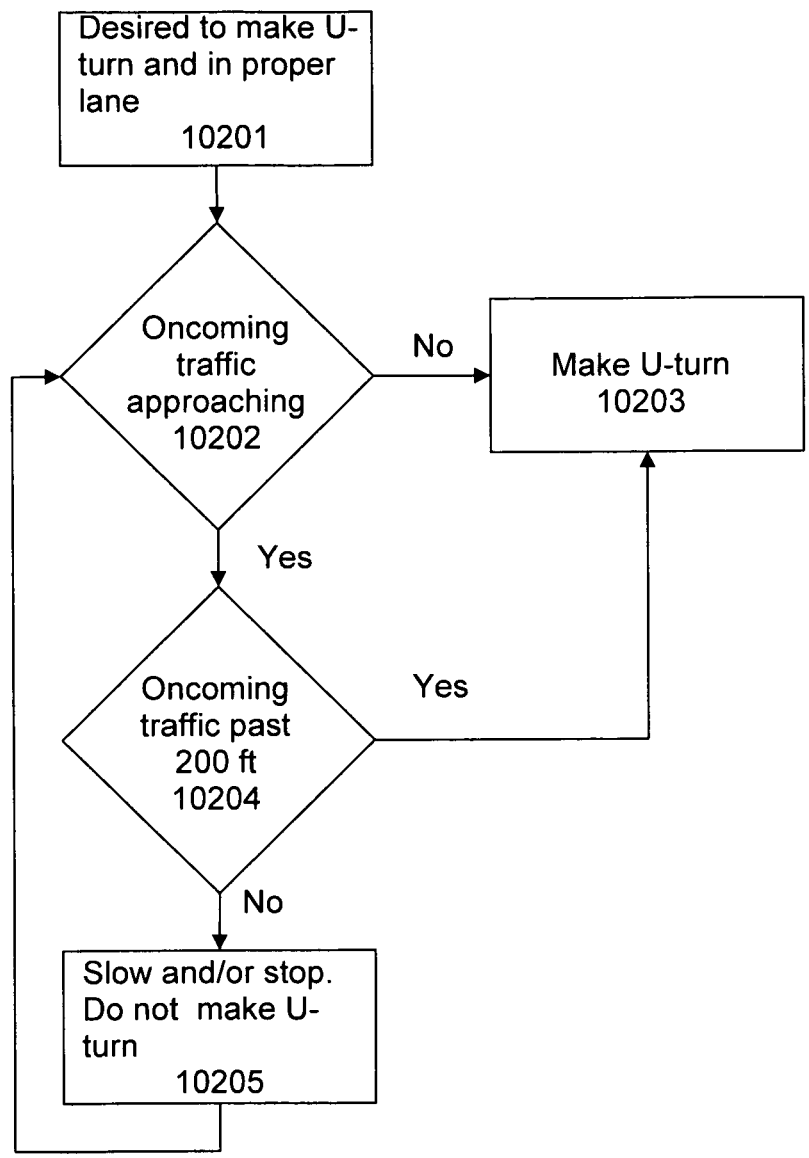
FIG. 102 shows an exemplary process performed by the robotic driving system in the situation shown in FIG. 101.

FIG. 101 shows a situation in which the vehicle is making a U-turn. In this situation, the system 100 recognizes oncoming traffic, and prevents the vehicle from making the U-turn if the oncoming traffic is within a predetermined distance from the vehicle (such as, for example, 200 ft.). This behavior may be accomplished by the process shown in FIG. 102. First, the system 101 determines that the vehicle will be making a U-turn, and is in the proper lane for making the U-turn (step 10201). Then, the moving obstacle detection and prediction module 202 determines whether oncoming traffic is approaching (step 10202). If there is no oncoming traffic, the traffic rule enforcement module 205 commands the vehicle to make the U-turn (step 10203). However, if oncoming traffic is approaching, the moving obstacle detection and prediction module 202 determines whether the oncoming traffic is within a predetermined distance (such as, for example, 200 ft.) from the vehicle (step 10204). If the oncoming traffic is farther than the predetermined distance from the vehicle, the traffic rule enforcement module 205 commands the vehicle to make the U-turn (step 10203). However, if the oncoming traffic is within the predetermined distance from the vehicle, the traffic rule enforcement module 205 commands the vehicle to slow down or stop (step 10205), and the moving obstacle detection and prediction module 202 continues to monitor oncoming traffic until it is determined that it is safe to make the U-turn (step 10202).

The system 100 is also capable of controlling the vehicle to follow traffic rules relating to parking. When the vehicle parks, the system 100 may control the position of the wheels to promote safety, depending on whether a curb is present and the street is inclined. Information relating to the number of lanes of the street, the inclination of the street, curb marking and the like may be determined using, for example, the sensors 103, stored data and/or location information. Examples of situations the system 100 may encounter relating to parking, and processes the system 100 may perform in these situations are described below with reference to FIGS. 103-105.

The system 100 will recognize whether a road is level, uphill or downhill. When the vehicle is parking, the system 100 will control the vehicle to point the wheels so that if the vehicle rolls downhill, its wheels will catch the curb. If the road is level or if there is no curb, the system 100 will control the vehicle to point the wheels to the right when the vehicle is parked on the right hand side of the road, and to point the wheels to the left when the vehicle is parked on the left hand side of the road. For example, the processing system 104 may include a memory which stores a table listing rules for parking, such as the table shown in FIG. 103. When the vehicle is parking, the system 100 may refer to such table to control the wheels accordingly.

Figure 104:
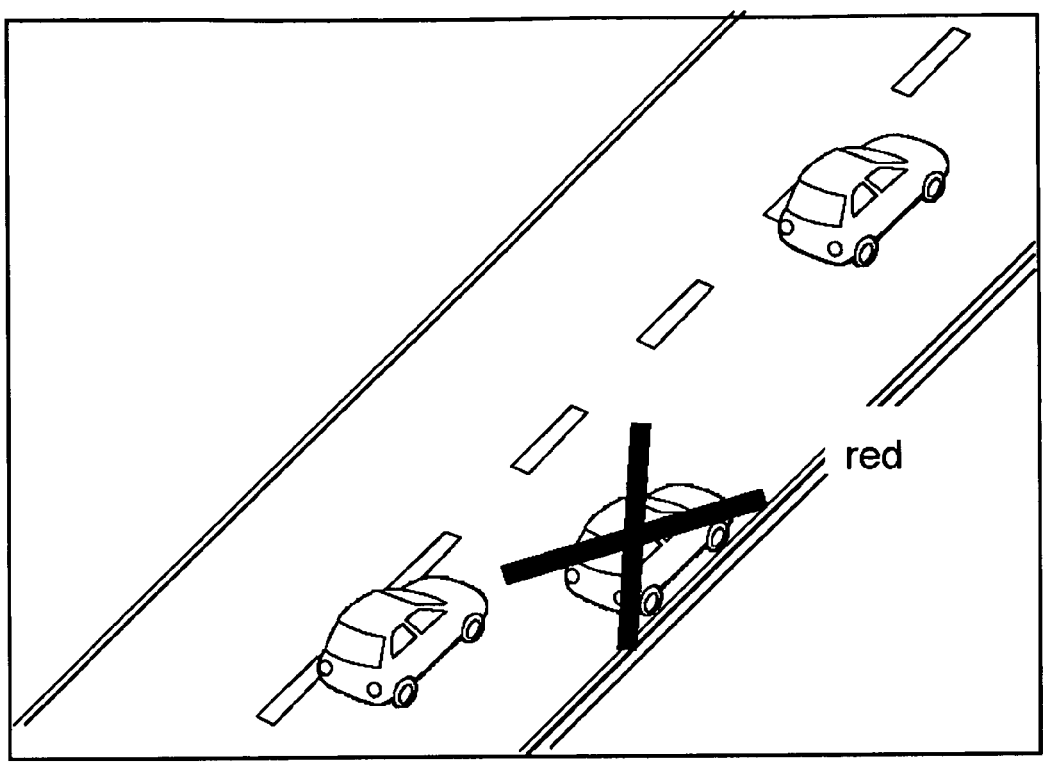
FIG. 104 shows a situation in which the vehicle parks along a red curb.
Figure 105:
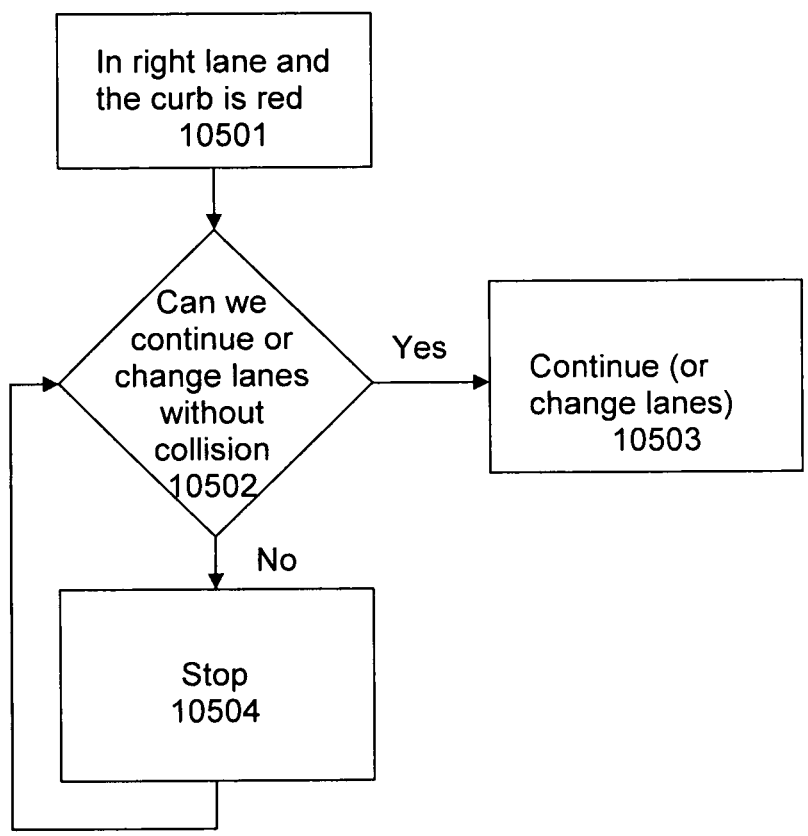
FIG. 105 shows an exemplary process performed by the robotic driving system to avoid the situation shown in FIG. 104.

FIG. 104 shows a situation which the system 100 will prevent. Namely, the system 100 will recognize the presence of a yellow or red curb, and prevent the vehicle from parking, standing or stopping alongside the yellow or red curb. This behavior may be accomplished, for example, by the process shown in FIG. 105. First, the system 100 recognizes that the vehicle is in the right lane and that the curb is yellow or red (step 10501). The system 100 then determines whether the vehicle can continue driving in the right lane or can change lanes without a collision (step 10502). If the vehicle can continue driving in the right lane or can change lanes without a collision, the traffic rule enforcement module 205 commands the vehicle to continue driving in the right lane, or to change lanes, depending on the situation (step 10503). However, if the vehicle can neither continue driving in the right lane nor change lanes without causing a collision, the traffic rule enforcement module 205 commands the vehicle to stop (step 10504). The system 100 then continues to monitor its surroundings (step 10502).

The foregoing embodiments and advantages are merely exemplary and are not to be construed as limiting the present invention. The description of the present invention is intended to be illustrative and not to limit the scope of the claims. Many alternatives, modifications, and variations will be apparent to those skilled in the art.

In accordance with various embodiments of the present disclosure, the methods described herein may be implemented by software programs executable by a processor. The present disclosure contemplates a computer-readable medium that includes instructions or receives and executes instructions responsive to a propagated signal. The term "computer-readable medium" shall include any medium that is capable of storing, encoding, or carrying a set of instructions for execution by a processor to perform any one or more of the methods or operations disclosed herein.

In a particular non-limiting, exemplary embodiment, the computer-readable medium can include a solid-state memory such as, but not limited to, a memory card or other package that houses one or more non-volatile read-only memories. Further, the computer-readable medium may be a random access memory or other volatile re-writable memory. Accordingly, the disclosure is considered to include any combination of computer-readable mediums, distribution mediums, other equivalents, and successor media, in which data or instructions may be stored.

The illustrations of the embodiments described herein are intended to provide a general understanding of the structure of the various embodiments. The illustrations are not intended to serve as a complete description of all of the elements and features of the apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purposes may be substituted for or added to the specific embodiments shown. This disclosure is intended to cover any and all subsequent adaptations or variations of various embodiments. Combinations of the above embodiments, and other related embodiments not specifically described herein, will be apparent to those of skill in the art upon reviewing the description.

The above disclosed subject matter is to be considered illustrative and not restrictive. The appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

Although the invention has been described with reference to an exemplary embodiment, it is understood that the words that have been used are words of description and illustration, rather than words of limitation. As the present invention may be embodied in several forms without departing from the spirit or essential characteristics thereof, it should also be understood that the above-described embodiment is not limited by any of the details of the foregoing description, unless otherwise specified. Rather, the above-described embodiment should be construed broadly within the spirit and scope of the present invention as defined in the appended claims. Therefore, changes may be made within the metes and bounds of the appended claims, as presently stated and as amended, without departing from the scope and spirit of the invention in its aspects.

What is claimed is:

1. A system that enables a vehicle to follow a traffic rule while traveling in a road network, comprising:

a database that stores data relating to at least one feature of the road network;

a location detector that detects a location of the vehicle relative to the road network;

a plurality of sensors, including at least one sensor that senses at least one object in a vicinity of the vehicle; and a processing system that controls the vehicle to autonomously obey at least one traffic rule, or provides a notification to a driver of the vehicle to enable the driver to obey at least one traffic rule, based on the detected location of the vehicle, data retrieved from the database relating to at least one feature of the road network, and data relating to at least one object sensed by the sensors, wherein the object sensed is an obstruction, the processing system includes a memory which stores a plurality of lookup tables, each of the lookup tables receive different data from a corresponding and different one of the plurality of sensors representing a corresponding condition local to the vehicle, where at least one corresponding condition represents data of the obstruction, and outputs a maximum safe speed, for each lookup table, based on the received data from each of the different sensors, the plurality of lookup tables comprises at least one of a vehicle congestion speed lookup table, a weather condition lookup table, and a road condition lookup table; and the processing system selects the minimum of all of the maximum safe speeds outputted by the lookup tables, and controls the vehicle speed not to exceed the selected minimum speed and to avoid the obstruction based upon data from the lookup tables and the sensed distance of the vehicle from the obstruction.

2. The system according to claim 1, wherein the at least one traffic rule comprises a traffic rule relating to a right of way.

3. The system according to claim 1, wherein the at least one traffic rule comprises a traffic rule relating to at least one of a traffic light and a road sign.

4. The system according to claim 1, wherein the at least one traffic rule comprises a traffic rule relating to at least one of a dangerous intersection and an alley.

5. The system according to claim 1, wherein the at least one traffic rule comprises a traffic rule relating to a pedestrian or an animal.

6. The system according to claim 1, wherein the at least one traffic rule comprises a traffic rule relating to a traffic lane.

7. The system according to claim 1, wherein the at least one traffic rule comprises a traffic rule relating to turning.

8. The system according to claim 1, wherein the at least one traffic rule comprises a traffic rule relating to parking.

9. The system according to claim 1, wherein the data retrieved from the database relates to the detected location of the vehicle and comprises at least one of a location of a potential pedestrian crossing, a sidewalk, a road, a driveway, an alley, a stop sign, a yield sign, an intersection, a roundabout, a traffic signal, a traffic lane, and a railroad crossing.

10. The system according to claim 1, wherein the sensed object additionally comprises at least one of a sidewalk, a pedestrian crossing light, another vehicle, a bicycle, an intersection, a roundabout, a traffic signal, a road sign, a school bus, a traffic lane, a weather condition, a railroad crossing, an animal, a bicycle lane, a curb, and a slope of a road.

11. The system according to claim 1, wherein the processing system comprises a road planner module, a moving obstacle detection and prediction module, a static obstacle detection module, a street feature retrieve/store module, and a traffic rule enforcement module.

12. The system according to claim 1, wherein the sensors determine a number and speed of other vehicles and provide traffic congestion condition data to the vehicle congestion speed lookup table, and the vehicle congestion speed lookup table outputs a maximum safe speed based on the traffic congestion condition data.

13. The system according to claim 1, wherein the sensors determine a weather condition and provide weather condition data to the weather condition lookup table, and the weather condition lookup table outputs a maximum safe speed based on the weather condition data.

14. The system according to claim 1, wherein the sensors determine a road condition and provide road condition data to the road condition lookup table, and the road condition lookup table outputs a maximum safe speed based on the road condition data.

15. The system according to claim 1, wherein the obstruction comprises a pedestrian.

16. The system according to claim 15, wherein the processing system controls the vehicle to avoid an intersection between the vehicle and the pedestrian.

17. The system according to claim 1, wherein the processing system determines a stopping distance to avoid the obstruction.

18. The system according to claim 1, the plurality of sensors being configured to detect at least one feature of the road and the processing system being configured to change a speed or direction of the vehicle based on the detected feature of the road.

19. The system according to claim 1, wherein the processing system is configured to control the vehicle, based at least upon the received data, to determine an appropriate stopping distance of the vehicle.

20. The system according to claim 1, wherein the processing system is configured to control the vehicle to maintain a minimum speed, based at least upon the data relating to at least one feature of the road network.

21. The system according to claim 1, the at least one feature of the road network comprises a road surface quality in the vicinity of the vehicle.

22. The system according to claim 1, the at least one feature of the road network comprises a curvature of the road in the vicinity of the vehicle.

23. The system according to claim 1, wherein, when the minimum of all of the maximum safe speeds selected by the processing system is a speed less than the current speed of the vehicle, the processing system determines a location at which to begin slowing down the vehicle so that the vehicle does not exceed the selected minimum speed upon reaching the obstruction.

24. The system according to claim 7, wherein the processing system activates a turn signal of the vehicle when the at least one traffic rule relates to turning.

25. A system according to claim 1, wherein, when the object sensed in the vicinity of the vehicle comprises another vehicle or a pedestrian, the processing system controls at least one of the speed and direction of the vehicle to avoid a collision with the another vehicle or with the pedestrian.

26. A method of enabling a vehicle to follow a traffic rule when traveling in a road network, comprising:
    detecting, by a location detector, a location of the vehicle relative to the road network;
    retrieving data from a database relating to at least one feature of the road network;
    sensing, by at least one sensor of a plurality of sensors, at least one object in a vicinity of the vehicle;
    controlling the vehicle, by a processing system, to autonomously obey at least one traffic rule, or provide a notification to a driver of the vehicle to enable the driver to obey at least one traffic rule, based on the detected location of the vehicle, the retrieved data relating to at least one feature of the road network, and data relating to the at least one sensed object, where the sensed object is an obstruction;
    providing, from each of the sensors, different data representing a corresponding condition local to the vehicle to each of a plurality of lookup tables stored in a memory of the processing system, where at least one corresponding condition represents data of the obstruction;
    outputting, from each of the lookup tables, a maximum safe speed based on the data provided from each of the corresponding sensors, the plurality of lookup tables comprises at least one of a vehicle congestion speed lookup table, a weather condition lookup table, and a road condition lookup table;
    selecting, by the processing system, the minimum of all of the maximum safe speeds outputted by the lookup tables; and
    controlling the vehicle not to exceed the selected minimum speed, by the processing system and to avoid the obstruction based upon data from the lookup tables and the sensed distance of the vehicle from the obstruction.

27. The method according to claim 26, wherein the at least one traffic rule comprises a traffic rule relating to at least one of a right of way, roundabouts, mountain roads, traffic lights, road signs, dangerous intersections, alleys, railroads, pedestrians, animals, traffic lanes, turning and parking.

28. A non-transitory computer-readable medium which stores a program of instructions for execution by a computer to enable a vehicle to follow a traffic rule when traveling in a road network, comprising:
retrieving data relating to at least one feature of the road network from a database; and
controlling the vehicle to autonomously obey at least one traffic rule, or providing a notification to a driver of the vehicle to enable the driver to obey at least one traffic rule, based on a location of the vehicle, the retrieved data relating to at least one feature of the road network, and data relating to at least one object sensed in a vicinity of the vehicle,
wherein the at least one object sensed is an obstruction,
the controlling provides different data representing a corresponding condition local to the vehicle to each of a plurality of lookup tables, where at least one corresponding condition represents data of the obstruction, retrieves from each of the lookup tables a maximum safe speed based on the provided data from each of the sensors, from each of the different sensors, the plurality of lookup tables comprises at least one of a vehicle congestion speed lookup table, a weather condition lookup table, and a road condition lookup table selects the minimum of all of the maximum safe speeds outputted by the lookup tables, and controls the vehicle not to exceed the selected minimum speed and to avoid the obstruction based upon data from the lookup tables and the sensed distance of the vehicle from the obstruction.

29. The computer-readable medium according to claim 28, wherein the at least one traffic rule comprises a traffic rule relating to at least one of a right of way, a roundabout, a mountain road, a traffic light, a road sign, a dangerous intersection, an alley, a railroad crossing, a pedestrian, an animal, a traffic lane, turning and parking.

30. The computer-readable medium according to claim 28, wherein the data retrieved from the database relates to a detected location of the vehicle and comprises at least one of a location of a potential pedestrian crossing, a sidewalk, a road, a driveway, an alley, a stop sign, a yield sign, an intersection, a roundabout, a traffic signal, a traffic lane and a railroad crossing.

31. The computer-readable medium according to claim 28, wherein the sensed object additionally comprises at least one of a sidewalk, a pedestrian crossing light, a vehicle, a bicycle, an intersection, a roundabout, a traffic signal, a road sign, a school bus, a traffic lane, a weather condition, a railroad crossing, an animal, a bicycle lane, a curb and a slope of a road.

* * * * *